(12) United States Patent
Amour

(10) Patent No.: US 7,537,521 B2
(45) Date of Patent: *May 26, 2009

(54) SYSTEMS AND METHODS FOR PROVIDING GAMING ACTIVITIES

(75) Inventor: Marc Amour, Ultimo (AU)

(73) Assignee: G5 Enterprises Pty Ltd., Ultimo (AU)

( * ) Notice: Subject to any disclaimer, the term of this patent is extended or adjusted under 35 U.S.C. 154(b) by 144 days.

This patent is subject to a terminal disclaimer.

(21) Appl. No.: 11/756,810

(22) Filed: Jun. 1, 2007

(65) Prior Publication Data

US 2007/0293305 A1    Dec. 20, 2007

(30) Foreign Application Priority Data

| Jun. 2, 2006 | (AU) | ................. | 2006903031 |
| Oct. 13, 2006 | (AU) | ................. | 2006100876 |
| Oct. 13, 2006 | (AU) | ................. | 2006100877 |
| Oct. 13, 2006 | (AU) | ................. | 2006100878 |
| Nov. 24, 2006 | (AU) | ................. | 2006906599 |
| Nov. 24, 2006 | (AU) | ................. | 2006906600 |
| Feb. 23, 2007 | (AU) | ................. | 2007100144 |
| Feb. 23, 2007 | (AU) | ................. | 2007900946 |
| May 22, 2007 | (AU) | ................. | 2007100414 |
| May 22, 2007 | (AU) | ................. | 2007902728 |

(51) Int. Cl.
*A63F 3/06* (2006.01)
*A63F 3/08* (2006.01)

(52) U.S. Cl. ................ 463/25; 463/17; 463/26; 705/16

(58) Field of Classification Search .......... 463/25, 463/29; 705/16
See application file for complete search history.

(56) References Cited

U.S. PATENT DOCUMENTS

| 4,494,197 A | 1/1985 | Troy et al. |
| 4,689,742 A | 8/1987 | Troy et al. |
| 4,875,686 A | 10/1989 | Timms |
| 4,926,327 A | 5/1990 | Sidley |

(Continued)

FOREIGN PATENT DOCUMENTS

JP    2005050281    2/2005

(Continued)

OTHER PUBLICATIONS

International Search Report (ISR) for PCT/AU2007/000774.

(Continued)

*Primary Examiner*—John M Hotaling, II
*Assistant Examiner*—Masud Ahmed
(74) *Attorney, Agent, or Firm*—Katten Muchin Rosenman LLP

(57) ABSTRACT

Described herein are various systems and methods for providing gaming activities, these particularly relating to gaming activities where a plurality of players provide respective entry fees. Traditional gaming activities necessarily involve the player putting his or her entry fee at risk. The present invention, at least in some of its preferred forms, modifies the traditional approaches of operating such gaming activities so that the player's entry fee is not necessarily placed entirely at risk. Indeed, in some embodiments a player is provided with an option to participate on the basis that his or her entry fee is wholly refundable while retaining the opportunity to win prizes, potentially alongside more risky though still modified participation by other players.

80 Claims, 16 Drawing Sheets

U.S. PATENT DOCUMENTS

| | | | |
|---|---|---|---|
| 5,083,782 | A | 1/1992 | Nilssen |
| 5,709,603 | A | 1/1998 | Kaye |
| 6,077,163 | A | 6/2000 | Walker et al. |
| 6,086,477 | A * | 7/2000 | Walker et al. ............... 463/17 |
| 6,104,815 | A | 8/2000 | Alcorn et al. |
| 6,107,932 | A | 8/2000 | Walker et al. |
| 6,113,493 | A | 9/2000 | Walker et al. |
| 6,254,482 | B1 | 7/2001 | Walker et al. |
| 6,267,669 | B1 | 7/2001 | Luciano, Jr. et al. |
| 6,443,843 | B1 * | 9/2002 | Walker et al. ............... 463/42 |
| 6,650,952 | B1 | 11/2003 | Garcia et al. |
| 6,773,350 | B2 | 8/2004 | Yoshimi et al. |
| 6,869,362 | B2 | 3/2005 | Walker et al. |
| 7,028,907 | B2 | 4/2006 | Collins |
| 7,052,394 | B2 | 5/2006 | Walker et al. |
| 7,086,947 | B2 | 8/2006 | Walker et al. |
| 7,140,964 | B2 | 11/2006 | Walker et al. |
| RE39,644 | E | 5/2007 | Alcorn et al. |
| 7,210,998 | B2 | 5/2007 | Kazaoka et al. |
| 2001/0012797 | A1 | 8/2001 | Walker et al. |
| 2001/0036864 | A1 | 11/2001 | Melas |
| 2001/0051540 | A1 | 12/2001 | Hindman et al. |
| 2002/0037767 | A1 | 3/2002 | Ebin |
| 2002/0065566 | A1 | 5/2002 | Aronson et al. |
| 2002/0087447 | A1 | 7/2002 | McDonald et al. |
| 2002/0147040 | A1 | 10/2002 | Walker et al. |
| 2002/0198052 | A1 | 12/2002 | Soltys et al. |
| 2003/0003988 | A1 | 1/2003 | Walker et al. |
| 2003/0032476 | A1 | 2/2003 | Walker et al. |
| 2003/0054888 | A1 | 3/2003 | Walker et al. |
| 2003/0055727 | A1 | 3/2003 | Walker et al. |
| 2003/0087683 | A1 | 5/2003 | Gatto et al. |
| 2003/0104857 | A1 | 6/2003 | Jenkins |
| 2003/0119585 | A1 | 6/2003 | Walker et al. |
| 2003/0125108 | A1 | 7/2003 | Groz |
| 2003/0157976 | A1 | 8/2003 | Simon et al. |
| 2003/0220138 | A1 | 11/2003 | Walker et al. |
| 2004/0053693 | A1 * | 3/2004 | An ............................ 463/40 |
| 2004/0147308 | A1 | 7/2004 | Walker et al. |
| 2004/0210507 | A1 | 10/2004 | Asher et al. |
| 2004/0235542 | A1 | 11/2004 | Stronach et al. |
| 2004/0248637 | A1 | 12/2004 | Liebenberg et al. |
| 2005/0003893 | A1 | 1/2005 | Hogwood et al. |
| 2005/0059495 | A1 | 3/2005 | Horowitz et al. |
| 2005/0101376 | A1 | 5/2005 | Walker et al. |
| 2005/0131789 | A1 | 6/2005 | Mintz |
| 2005/0164793 | A1 | 7/2005 | Merimovich et al. |
| 2005/0171878 | A1 | 8/2005 | Pennock |
| 2005/0179206 | A1 | 8/2005 | Cogert |
| 2005/0181876 | A1 | 8/2005 | Vlazny et al. |
| 2005/0202873 | A1 | 9/2005 | Asher et al. |
| 2005/0202874 | A1 | 9/2005 | Asher et al. |
| 2005/0227756 | A1 | 10/2005 | Kane et al. |
| 2006/0035712 | A1 | 2/2006 | Eastman et al. |
| 2006/0046840 | A1 | 3/2006 | Walker et al. |
| 2006/0105839 | A1 | 5/2006 | Graeve et al. |
| 2006/0155628 | A1 | 7/2006 | Horowitz |
| 2006/0160620 | A1 | 7/2006 | Matthews et al. |
| 2006/0211493 | A1 | 9/2006 | Walker et al. |
| 2006/0217191 | A1 | 9/2006 | Walker et al. |
| 2006/0217192 | A1 | 9/2006 | Walker et al. |
| 2006/0229126 | A1 | 10/2006 | Walker et al. |
| 2006/0258422 | A1 | 11/2006 | Walker et al. |
| 2006/0287094 | A1 | 12/2006 | Mahaffey et al. |
| 2007/0004511 | A1 | 1/2007 | Walker et al. |
| 2007/0015564 | A1 | 1/2007 | Walker et al. |
| 2007/0087804 | A1 | 4/2007 | Knowles et al. |
| 2007/0135210 | A1 | 6/2007 | Walker et al. |
| 2007/0156464 | A1 | 7/2007 | Walker et al. |
| 2007/0156465 | A1 | 7/2007 | Walker et al. |
| 2007/0156466 | A1 | 7/2007 | Walker et al. |
| 2007/0203971 | A1 | 8/2007 | Walker et al. |
| 2007/0276705 | A1 | 11/2007 | Walker et al. |
| 2008/0039189 | A1 * | 2/2008 | Walker et al. ............... 463/25 |

FOREIGN PATENT DOCUMENTS

| | | |
|---|---|---|
| KR | 20020026339 | 4/2002 |
| WO | 0247010 | 6/2002 |
| WO | 2005086778 | 9/2005 |
| WO | 2006020692 | 2/2006 |

OTHER PUBLICATIONS

Ridge, "Innovations in savings schemes: The bonus bonds trust in New Zealand," Financial Services Review (1998).

National Savings and Investments, Premium Bonds—How they Work, http://www.nsandi.com.

Prize Bonds, Frequently Asked Questions, http://www.prizebonds.ie.

Bonus Bonds, Frequently Asked Questions, http://www.bonusbonds.co.nz.

National Bonds, Frequently Asked Questions, http://www.nationalbonds.ae/howitworks.htm.

* cited by examiner

SYSTEMS AND METHODS FOR PROVIDING GAMING ACTIVITIES

FIELD OF THE INVENTION

The present invention relates to systems and methods for providing gaming activities. Some embodiments provide hardware and software components for the implementation of such systems and methods. The term "gaming" is intended to be interpreted in the broadest sense, as encompassing the fields of gambling, gaming, wagering, betting, lotteries and games or competitions of skill and/or knowledge and/or chance.

BACKGROUND TO THE INVENTION

The following discussion of the prior art is intended to place the invention in an appropriate context and to allow the unique characteristics and advantages of it to be more fully understood. However, any discussion of the prior art throughout the specification should in no way be considered as an express or implied admission that such prior art is widely known or forms part of common general knowledge in the field.

Numerous gaming activities are known and have been implemented in a variety of different forms. One broad category of gaming activity is commonly referred to as "pari-mutuel" gaming (also known by terms such as "para-mutual", "paramutual" and "parimutuel"). In this form, it is typical for the entry fees provided by players in relation to a gaming activity to be combined into a pool, the operator's commissions, fees and charges deducted from the pool, and for the residual amount to define a prize pool for distribution among the winners of the gaming activity, according to predetermined criteria. Lotteries, totalisators and the like fall into this category.

A characteristic feature of pari-mutuel gaming is that the quantum of winnings is not necessarily known in advance, since this will depend upon the number of participants in the gaming activity, and the level of participation of each, which are indeterminate at the outset. Another characteristic feature is that, aside from any ad hoc instances of cross-subsidisation by the gaming operator, the total amount returned to the entrants collectively as prize-money is necessarily less than the total amount received from the entrants collectively as entry fees or bets, due to the fees and charges of the operator as well as taxes and duties of governments and jurisdictional authorities, being deducted from the prize pool, prior to distribution. These fees and charges are significant, often in the order of 15% to 40% of the total prize pool, which is a particular disadvantage of this form of gaming activity, in so far as the participants are concerned.

Another broad category of gaming activity is "fixed-odds" based, usually referred to as wagering, which is typical of most types of sports betting and bookmaking operations. In this form, the odds of a particular outcome are predetermined by the operator when each bet is placed, so that the quantum of potential winnings for each participant is known at the outset, irrespective of the number of bets subsequently placed by other participants. In this case, the total amount returned to the participants collectively as prize-money is not necessarily less than the total amount received from the entrants collectively as bets, and in that sense, the operator bears some risk. However, the operator endeavours, through judgment and experience, to retain a predetermined margin of profit on average over time, and this would typically be in the order of 8% to 10%.

A further disadvantage with both of these forms, and indeed most other forms of gaming, is that in the absence of a winning outcome, the initial value of the bet or participation fee is lost to each participant and fundamentally, the odds are statistically weighted against the players.

Against this backdrop, it is well-known that some personality types fall victim to gaming at significant personal and wider social cost. Others are reluctant to participate in such activities at all, either as a matter of principle or due to inherent aversion to risk, and thereby miss the entertainment value and the opportunity to participate in the upside of winning outcomes.

SUMMARY OF THE INVENTION

It is an object of the present invention to overcome or ameliorate one or more of the disadvantages of the prior art, or at least to provide a useful alternative.

According to a first aspect of the invention, there is provided a method for providing a gaming activity wherein a plurality of players provide respective entry fees, the method including the steps of:

defining a plurality of risk profiles, wherein each risk profile defines a proportion of an entry fee that is refundable on the basis of predetermined refund criteria and a complementary proportion of the entry fee that is placed at risk;

receiving, for each player, data indicative of the entry fee provided by that player and a risk profile selected by that player; and allocating to each player, on the basis of the entry fee provided by that player and the risk profile selected by that player, one or more entries in relation to the gaming activity.

One embodiment provides a method wherein the plurality of risk profiles includes a risk profile for which 100% of the entry fee is refundable.

One embodiment provides a method wherein the plurality of risk profiles includes a risk profile for which 100% of the entry fee is placed at risk.

One embodiment provides a method wherein the plurality of risk profiles includes at least one risk profile for which X % of the entry fee is refundable and Y % of the entry fee is placed at risk, wherein X+Y=100 and wherein 0<X<100.

One embodiment provides a method wherein the plurality of risk profiles includes a plurality of risk profiles for which X % of the entry fee is refundable and Y % of the entry fee is placed at risk, wherein X+Y=100 and wherein 0<X<100.

One embodiment provides a method wherein at least one risk profile is defined in response to data indicative of a player's selective designation of a proportion of an entry fee that is to be refundable and/or a complementary proportion of the entry fee that is to be placed at risk.

One embodiment provides a method wherein the risk profile selected by a given player affects the relative probability of that player winning a prize in relation to the gaming activity in exchange for the entry fee provided.

One embodiment provides a method wherein the risk profile selected by a given player affects the number of entries allocated to that player in exchange for the entry fee provided.

One embodiment provides a method wherein, for a first risk profile, a given player is allocated a predetermined number of entries in exchange for a predetermined entry fee, and, for a second risk profile, a given player is allocated an increased number of entries for the same predetermined entry fee, wherein the first risk profile defines a greater proportion of the entry fee that is refundable compared with the second risk profile.

One embodiment provides a method wherein the number of entries allocated to a given player is related to a contribution made by or on behalf of that player to a prize pool.

One embodiment provides a method wherein the number of entries allocated to a given player is determined according to the formula:

$$E_{player} = kA + B$$

wherein Eplayer is the number of entries allocated to a particular player in exchange for the entry fee provided by that player, A is a parameter related to the contribution made by or on behalf of that player to the prize pool, B is an adjustment factor, and k is a proportionality factor selected such that the allocation of entries follows a predetermined risk/chance favouritism protocol.

One embodiment provides a method wherein $0.01 \leq k \leq 100$.

One embodiment provides a method wherein $1 \leq k \leq 100$.

One embodiment provides a method wherein $k \geq 1$.

One embodiment provides a method wherein $k \approx 1$.

One embodiment provides a method wherein the risk profile selected by a given player affects the quantum of entry fee in exchange for which a predetermined number of entries is allocated.

One embodiment provides a method wherein, for a first risk profile, a given player is allocated a predetermined number of entries in exchange for a predetermined entry fee, and, for a second risk profile, a given player is allocated the same predetermined number of entries for less than the predetermined entry fee, wherein the first risk profile defines a greater proportion of the entry fee that is refundable compared with the second risk profile.

One embodiment provides a method wherein the risk profile selected by a given player affects one or more characteristics of a prize winnable by that player in exchange for the entry fee provided.

One embodiment provides a method wherein, for a first risk profile, a given player is able to win a prize having a first value in exchange for a predetermined entry fee, and, for a second risk profile, a given player is able to win a prize having a second value in exchange for the same predetermined entry fee, wherein the second value is greater than the first value, and wherein the first risk profile defines a greater proportion of the entry fee that is refundable compared with the second risk profile.

One embodiment provides a method including the steps of:

identifying one or more winning entries for the gaming activity;

awarding prizes to the players to whom winning entries were allocated in accordance with a predetermined prize distribution protocol; and for each player who selected a risk profile for which a non-zero proportion of the entry fee is refundable, refunding the refundable proportion of the entry fee.

One embodiment provides a method wherein awarding the prizes includes making the prizes available for collection by or on behalf to the players to whom winning entries were allocated.

One embodiment provides a method wherein, for a given player, refunding the refundable proportion of the entry fee includes making the refundable proportion of the entry fee available for collection by or on behalf of that players.

One embodiment provides a method wherein the step of refunding the refundable proportion of the entry fee includes, for at least one player:

defining the refundable portion of the entry fee as at least part of a subsequent entry fee in relation to a subsequent gaming activity; and allocating to the at least one player one or more entries in relation to the subsequent gaming activity in exchange for the subsequent entry fee.

One embodiment provides a method wherein the step of refunding the refundable proportion of the entry fee includes, for at least one player:

defining the refundable portion of the entry fee as a subsequent entry fee in relation to a subsequent gaming activity;

allocating to the at least one player one or more entries in relation to the subsequent gaming activity in exchange for the subsequent entry fee.

One embodiment provides a method wherein the subsequent gaming activity is a gaming activity provided by a method according to an embodiment described above.

One embodiment provides a method including the steps of:

identifying, for each entry fee, a total contribution amount corresponding to that entry fee, the total contribution amount including:

i. a primary contribution amount comprising the proportion of the entry fee that is placed at risk, less any predefined deductions; and ii. a supplementary contribution amount;

combining the total contribution amounts of the respective entry fees to form a prize pool;

identifying one or more winning entries;

distributing the prize pool among the players to whom winning entries were allocated in accordance with a predetermined prize distribution protocol.

One embodiment provides a method wherein, for a given entry fee, the supplementary contribution amount corresponds to an amount derived from one or more sources selected from a group comprising:

an investment return derived by subjecting at least a proportion of that entry fee to an investment procedure for a period of time;

an operator contribution; and a third-party contribution.

One embodiment provides a method wherein, for a given entry fee, the supplementary contribution amount corresponds to an amount derived from an investment return derived by subjecting at least a proportion of that entry fee to an investment procedure for a period of time.

One embodiment provides a method including the steps of:

identifying one or more winning entries for the gaming activity;

providing a prize pool for distribution in accordance with a predetermined prize distribution protocol amongst the players to whom winning entries were allocated;

identifying an undistributed portion of the prize pool;

investing at least a proportion of the undistributed portion of the prize pool to generate an investment return;

adding an amount corresponding to at least a proportion of the investment return to a subsequent prize pool in relation to a subsequent gaming activity.

One embodiment provides a method wherein the subsequent gaming activity is a gaming activity provided by a method according to an embodiment described above.

One embodiment provides a method wherein the step of allocating to each player one or more entries includes, for a given player:

for the proportion of the entry fee that is placed at risk, allocating to the player a primary entry, whereby in the case that the primary entry is identified as a winning entry a primary prize is awarded to the player;

for the proportion of the entry fee that is refundable, allocating to the player one or more secondary entries, whereby in the case that one of the secondary entries is identified as a winning entry a secondary prize is awarded to the player.

One embodiment provides a method wherein the primary entry has an associated payout ratio, and the primary prize is awarded to the player based on the proportion of the entry fee that is placed at risk and the payout ratio.

One embodiment provides a method wherein, in the case that the primary entry is identified as a winning entry, the secondary entry is not identified as a winning entry.

One embodiment provides a method wherein, in the case that the primary entry is not identified as a winning entry, the secondary entry is identified as a winning entry, such that a given player for whom a non-zero proportion of the entry fee is refundable wins one of the primary prize or the secondary prize.

One embodiment provides a method including the steps of:
deriving supplementary income;
adding an amount corresponding to at least a proportion of the supplementary income to a secondary prize pool;
refunding to each player the proportion of the entry fee that is refundable;
distributing the secondary prize pool, in accordance with a predetermined prize distribution protocol, amongst the players to whom winning secondary entries were allocated.

One embodiment provides a method wherein deriving supplementary income includes subjecting at least a proportion of the entry fees to an investment procedure to generate supplementary income in the form of an investment return.

A second aspect of the invention provides a method for providing a gaming activity wherein a plurality of players provide respective entry fees, the method including the steps of:
defining a risk profile, the risk profile defining a non-zero proportion of an entry fee that is refundable on the basis of predetermined refund criteria and a complementary proportion of the entry fee that is placed at risk;
receiving, for each player, data indicative of the entry fee provided by that player; and
allocating to each player, on the basis of the entry fee provided by that player and the risk profile, one or more entries in relation to the gaming activity.

One embodiment provides a method wherein, for the risk profile, X % of the entry fee is refundable and Y % of the entry fee is placed at risk, wherein X+Y=100 and wherein 0<X<100.

One embodiment provides a method including the steps of:
identifying one or more winning entries for the gaming activity;
awarding prizes to the players to whom winning entries were allocated in accordance with a predetermined prize distribution protocol; and
for each player who selected a risk profile for which a non-zero proportion of the entry fee is refundable, refunding the refundable proportion of the entry fee.

One embodiment provides a method wherein the step of refunding the refundable proportion of the entry fee includes, for at least one player:
defining the refundable portion of the entry fee as at least part of a subsequent entry fee in relation to a subsequent gaming activity;
allocating to the at least one player one or more entries in relation to the subsequent gaming activity in exchange for the subsequent entry fee.

One embodiment provides a method wherein the step of refunding the refundable proportion of the entry fee includes, for at least one player:
defining the refundable portion of the entry fee as a subsequent entry fee in relation to a subsequent gaming activity;
allocating to the at least one player one or more entries in relation to the subsequent gaming activity in exchange for the subsequent entry fee.

One embodiment provides a method wherein the subsequent gaming activity is a gaming activity provided by a method according to an embodiment described above.

One embodiment provides a method including the steps of:
identifying, for each entry fee, a total contribution amount corresponding to that entry fee, the total contribution amount including:
i. a primary contribution amount comprising the proportion of the entry fee that is placed at risk, less any predefined deductions; and
ii. a supplementary contribution amount;
combining the total contribution amounts of the respective entry fees to form a prize pool;
identifying one or more winning entries;
distributing the prize pool among the players to whom winning entries were allocated in accordance with a predetermined prize distribution protocol.

One embodiment provides a method wherein, for a given entry fee, the supplementary contribution amount corresponds to an amount derived from one or more sources selected from a group comprising:
an investment return derived by subjecting at least a proportion of that entry fee to an investment procedure for a period of time;
an operator contribution; and
a third-party contribution.

One embodiment provides a method wherein, for a given entry fee, the supplementary contribution amount corresponds to an amount derived from an investment return derived by subjecting at least a proportion of that entry fee to an investment procedure for a period of time.

One embodiment provides a method including the steps of:
identifying one or more winning entries for the gaming activity;
providing a prize pool for distribution in accordance with a predetermined prize distribution protocol amongst the players to whom winning entries were allocated;
identifying an undistributed portion of the prize pool;
investing at least a proportion of the undistributed portion of the prize pool to generate an investment return;
adding an amount having a value corresponding to at least a proportion of the investment return to a subsequent prize pool in relation to a subsequent gaming activity.

One embodiment provides a method wherein the subsequent gaming activity is a gaming activity provided by a method according to a an embodiments described above.

One embodiment provides a method wherein the step of allocating to each player one or more entries includes, for a given player:
for the proportion of the entry fee that is placed at risk, allocating to the player a primary entry, whereby in the case that the primary entry is identified as a winning entry a primary prize is awarded to the player;
for the proportion of the entry fee that is refundable, allocating to the player one or more secondary entries, whereby in the case that one of the secondary entries is identified as a winning entry a secondary prize is awarded to the player.

One embodiment provides a method wherein the primary entry has an associated payout ratio, and the primary prize is awarded to the player based on the proportion of the entry fee that is placed at risk and the payout ratio.

One embodiment provides a method wherein, in the case that the primary entry is identified as a winning entry, the secondary entry is not identified as a winning entry.

One embodiment provides a method wherein, in the case that the primary entry is not identified as a winning entry, the secondary entry is identified as a winning entry, such that a given player for whom a non-zero proportion of the entry fee is refundable wins one of the primary prize or the secondary prize.

One embodiment provides a method including the steps of:
deriving supplementary income;
adding an amount having a value corresponding to at least a proportion of the supplementary income to a secondary prize pool;
refunding to each player the proportion of the entry fee that is refundable;
distributing the secondary prize pool, in accordance with a predetermined prize distribution protocol, amongst the players to whom winning secondary entries were allocated.

One embodiment provides a method wherein deriving supplementary income includes subjecting at least a proportion of the entry fees to an investment procedure to generate supplementary income in the form of an investment return.

A third aspect of the invention provides a system for providing a gaming activity wherein a plurality of players provide respective entry fees, the system including a processor configured to carry out a method of providing a gaming activity according to the first or second aspect.

A fourth aspect of the invention provides a computer-readable carrier medium carrying a set of instructions that when executed by one or more processors cause the one or more processors to carry out a method of providing a gaming activity according to the first or second aspect.

According to a further aspect of the invention, there is provided a method for providing a gaming activity, the method including the steps of:
receiving entry fees from one or more players;
combining the entry fees to provide an entry fee pool;
defining a prize portion of the entry fee pool for addition to a prize pool;
deriving gross supplementary income by virtue of either or both of:
(a) carriage of the funds defining the entry fee pool;
(b) interaction with one or more of the players;
defining net supplementary income by subtracting one or more predefined deductions from the gross supplementary income;
combining the prize portion of the entry fee pool with the net supplementary income to form the prize pool, wherein the prize pool has a value greater than the sum of the entry fees; and
distributing the prize pool among winning players based on a distribution protocol.

In one embodiment the gaming activity is a recurring gaming activity.

In one embodiment deriving gross supplementary income by virtue of carriage of the funds defining the entry fee pool includes subjecting some or all of the entry fee pool to an investment procedure to derive gross investment income.

In one embodiment deriving gross supplementary income by virtue of interaction with one or more of the players includes providing marketing information to one or more of the players, or personal information from one or more of the players, in exchange for gross marketing income from a third party.

In one embodiment deriving gross supplementary income by virtue of interaction with one or more of the players includes providing personal and/or contact information regarding one or more of the players to a third party in exchange for gross marketing income from that third party.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms "comprising", "comprised of", or "which comprises" is an open term that means including at least the elements/features that follow, but not excluding others. Thus, the term "comprising", when used in the claims, should not be interpreted as being limitative to the means or elements or steps listed thereafter. For example, the scope of the expression a device comprising A and B should not be limited to devices consisting only of elements A and B. Any one of the terms "including", "which includes" or "that includes" as used herein is also an open term that also means including at least the elements/features that follow the term, but not excluding others. Thus, "including" is synonymous with and means the same as "comprising".

Similarly, the term "coupled", when used herein, should not be interpreted as being limitative to direct connections only. The terms "coupled" and "connected," along with their derivatives, may be used. The scope of the expression a "device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

The term "complementary" is primarily used herein with reference to relative percentages of two mutually exclusive components or proportions, primarily the proportion of an entry fee that is placed at risk, and the "complementary" proportion that is refundable (or vice versa). In this context, if a given proportion is X %, then the complementary proportion would be 100%–X %. It should also be noted that as used herein, unless the context clearly dictates otherwise, any reference to "a proportion" is intended to encompass the situations where that proportion is 0% or 100%, as well as any intermediate percentage.

BRIEF DESCRIPTION OF THE DRAWINGS

Preferred embodiments of the invention will now be described, by way of example only, with reference to the accompanying drawings in which.

DETAILED DESCRIPTION

Figure 1:
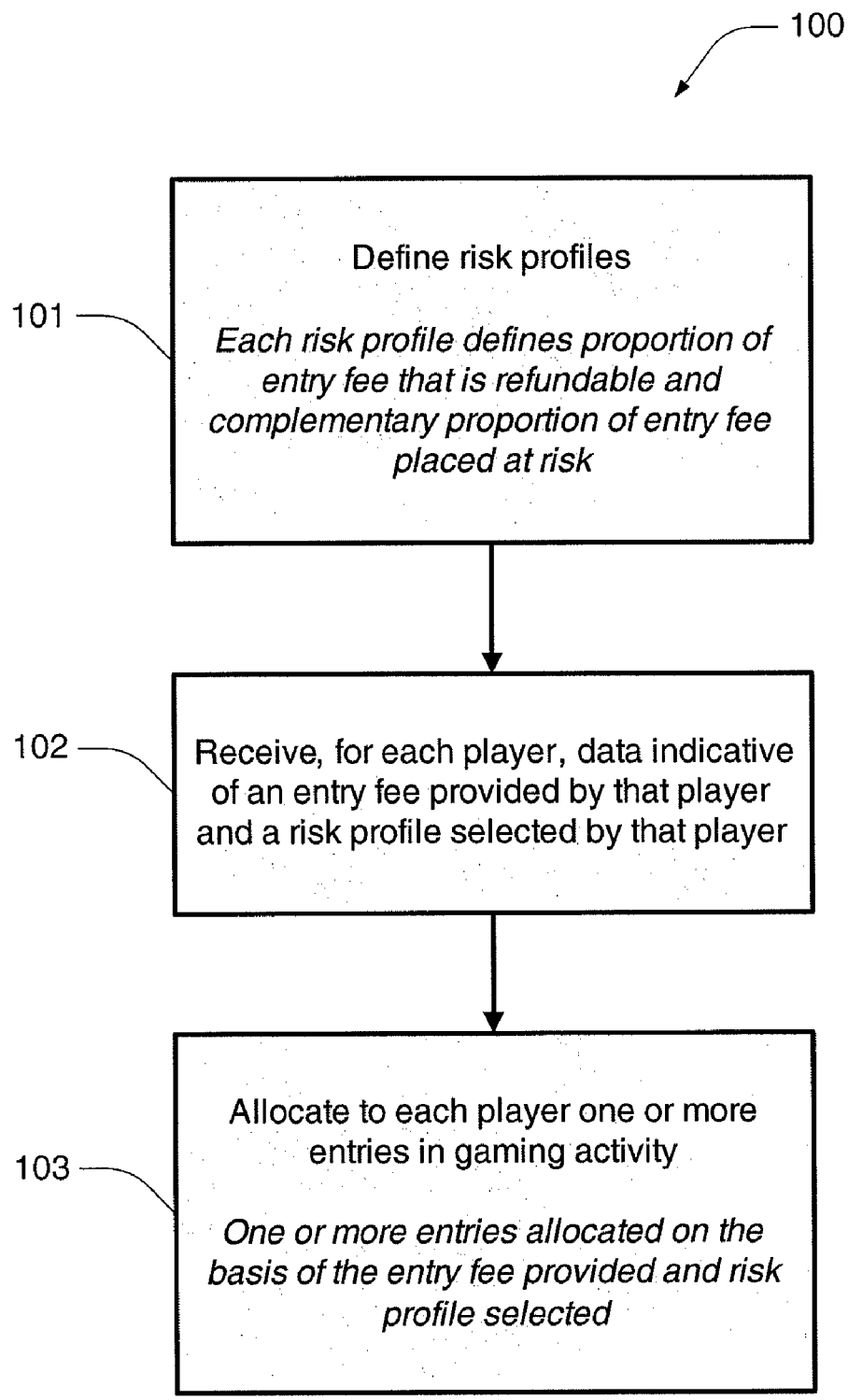
FIG. 1 illustrates a method for providing a gaming activity according to one embodiment.

Described herein are various systems and methods for providing gaming activities, these particularly relating to gaming activities where a plurality of players provide respective entry fees. Traditional gaming activities necessarily involve the player putting his or her entry fee at risk. The present invention, at least in some of its preferred forms, modifies the traditional approaches of operating such gaming activities so that the player's entry fee is not necessarily placed entirely at risk. Indeed, in some embodiments a player is provided with an option to participate on the basis that his or her entry fee is wholly refundable while retaining the opportunity to win prizes, potentially alongside more risky though still modified participation by other players.

In the context of the present disclosure, it is assumed that a gaming activity is an activity where multiple players provide respective entry fees. In exchange for the entry fees, the players are respectively allocated one or more entries. The term "player" as used herein refers to a provider of an entry fee. The term should be construed broadly to include both human players, non-human players, constructs or syndicates defined by a group of two or more human and/or non human players (such as a collaboration between human players), and other legal entities (such as corporations or trusts). In some cases, the player is identified in a computing system by a unique identifier, which might include a purpose-defined identifier, identifier based on personal information, email address, cellular telephone number, or the like.

In the context of the present disclosure, there is discussion of players being "allocated" entries and disclosure of players being "provided" entries. The terms "allocated" and "provided" are regarded as synonymous in this regard. Furthermore, neither of these terms should imply a requirement that a player actually physically receives any entries (although, equally, they may do so), only that the entries are notionally allocated to that player.

Although players are considered to provide respective entry fees, it will be appreciated that in some instances a single player provides multiple entry fees on multiple occasions.

In the present context, the term "entry fee" describes a sum of consideration that constitutes a wholly or partially refundable payment. No specific implications or connotations should be drawn from the use of the word "fee", which is descriptive only. In some embodiments the entry fee is provided in whole or in part as monetary currency. In other embodiments the entry fee is notionally derived—such as where a consumer purchases predefined goods and/or services unrelated to an entry, and an entry fee is notionally determined as a function of the purchase value, or where the player participates in marketing activities (by viewing advertisements or responding to a survey, for instance), and an entry fee is notionally defined on the basis of a benefit the gaming operator or a third party receives by virtue of the player's participation in those marketing activities. That is, by purchasing a certain product, a consumer is deemed to have provided an entry fee, and is correspondingly allocated one or more entries. In the presently considered embodiments, the entry fee is wholly provided for the purpose of participation in a gaming activity.

In some embodiments, the "entry fee" defines only a portion of the sum of consideration provided by a player in exchange for one or more entries. For example, in some embodiments a player provides an entry amount, including an entry fee and an additional component, this additional component being, in some cases, attributable to an operator service charge. In some embodiments, although an entry fee is fully refundable, it is only the entry fee component of an entry amount that is fully refundable, with the additional component being non-refundable. It should also be appreciated that the "entry fee" need not be monetary in nature at all, but could constitute any tradable commodity having a real, virtual, deemed or perceived value.

References to "refunds", "refundable" entry fees, and the like should be understood, unless the context dictates otherwise, to encompass full and partial refunds, as well as gross and net refunds. In some instances, for example, a nominal refund may be subject to taxes, duties, levies or other charges, such that the net refund actually received by a player is less than the nominal or gross refund, irrespective of whether that refund is notionally full or partial. Such variations should not be considered to depart from the substance or scope of the present invention.

As used herein, the terms "gaming" and "gaming activity" should be construed broadly so as to encompass any form of gambling, gaming, or wagering, including but not limited to:

Lotteries and lottery type games. In the context of the Australian market, particular examples include "Lotto", "Oz Lotto", "Powerball", "Art Union Lotteries", and the like. In the context of the US market, particular examples include "Hot Lotto", "Mega Millions", "Powerball", "Paycheck", and "Tri-State".

Traditional draw lotteries, instant lotteries and "scratch" lotteries.

Raffles, or other games where a player is provided with one or more unique tickets carrying respective ticket identifiers, and one or more winners are identified based on the selection of one or more winning ticket identifiers.

"Keno", "Bingo" and "Housie", "Tombola" and "Chinese Raffle" style games where players seek to reconcile their own numbers with numbers drawn from an independent objective source.

Sports betting activities and football pools, whether pari-mutuel or "fixed-odds" based.

Events-based betting activities involving such outcomes as political contests, Royal or noteworthy births, weather outcomes and natural phenomena.

Totalisators.

Sweepstakes for any events such as horse, dog or any other form of racing, sporting contests, political contests and the like.

PC-based and other electronic gaming contests, including online chance-based, skill-based or combination chance/skill-based gaming contests. These include online video games, where outcomes are in part dependant on a player's skill, and in some cases in part dependent on random factors including chance.

Other games or contests of skill and/or knowledge and/or chance.

Chance-based games played on poker and other electronic gaming machines.

Any games of skill and/or chance involving one or more unknown outcomes, whether pari-mutuel or "fixed-odds" based.

It will be appreciated that, in all of these examples, multiple players provide respective entry fees and, in exchange for the entry fees, the players are respectively provided with one or more entries.

The term "pari-mutuel" refers generally to a gaming arrangement whereby prizes are funded in whole or in part by entry fees. This term is intended to be synonymous with "paramutual", "para-mutual", "parimutuel" "mutual betting" and other variants.

A "method for providing a gaming activity" includes substantially any method by which a gaming activity is provided. This includes, but is not limited to, methods performable by administrators of gaming activities, methods performable by vendors of entries in gaming activities, methods performable by players, computer implemented methods performable in relation to the administration of gaming activities and/or sale of entries in such gaming activities, and so on. Likewise, a "system for providing a gaming activity" includes substantially any hardware component or group of hardware components associated with the performance of a method for providing a gaming activity. For example, such systems include information systems maintained or implemented by or on behalf of administrators of gaming activities, vendors of entries in gaming activities, or the players themselves.

As used herein, the term "gaming operator" describes a party or group of parties responsible for the carriage and administration of a gaming activity. That is, a gaming operator is responsible for tasks including, but not limited to defining entry parameters and other predefined terms and conditions for the gaming activity, offering for sale entries in exchange for entry fees, receiving entry fees from players, allocating entries to players in exchange for those entry fees, identifying one or more winning entries, and arranging for the distribution of prizes among the players. In practice, these tasks are often performed by a number of parties. For example, a first category of party (such as vendors or agents) may be responsible for offering for sale entries in exchange for entry fees and receiving entry fees from players, whilst a second party may be responsible for identifying one or more winning entries. However, this is ignored for the present purposes, and the term "gaming operator" should be read sufficiently broadly so as to cover whatever group of related and/or unrelated parties are responsible for the carriage and administration of a particular gaming activity.

Thus, in some cases, a gaming activity may be provided by a plurality of parties, which might or might not be related or affiliated. Additionally, in some cases, a gaming activity may include a plurality of sub-activities, such as individual lotteries, that might in themselves be provided by differing parties. However, it should be appreciated that a plurality of such sub-activities, regardless of the nature of the relationship between providing parties, should be considered as a single gaming activity in the context of the present disclosure. In some cases, a plurality of sub-activities may be conducted by differing parties in different locations and/or with differing branding. However some or all of the entry fees from these sub-activities might be notionally or physically combined into a common pool, for example to facilitate investment, risk management or infrastructure sharing activities. In such cases, the sub-activities should certainty be collectively regarded as a single gaming activity in the context of the present disclosure.

Risk Profiles

FIG. 1 illustrates a method 100 for providing a gaming activity. In this gaming activity, a plurality of players provide respective entry fees. Method 100 includes, at step 101, defining a plurality of risk profiles, wherein each risk profile defines a proportion of an entry fee that is refundable on the basis of predetermined refund criteria and a complementary proportion of the entry fee that is placed at risk. Step 102 includes receiving, for each player, data indicative of the entry fee provided by that player and a risk profile selected by that player. Step 103 includes allocating to each player, on the basis of the entry fee provided by that player and the risk profile selected by that player, one or more entries in relation to the gaming activity.

The term "complementary" is primarily used herein with reference to relative percentages of two mutually exclusive components or proportions, primarily the proportion of an entry fee that is placed at risk, and the "complementary" proportion that is refundable (or vice versa). In this context, if a given proportion is X %, then the complementary proportion would be 100%−X %. It should also be noted that as used herein, unless the context clearly dictates otherwise, any reference to "a proportion" is intended to encompass the situations where that proportion is 0% or 100%, as well as any intermediate percentage.

As noted, step 101 includes defining a plurality of risk profiles. The nature and number of risk profiles defined varies between embodiments. There are three main categories of risk profile:

"No-risk" risk profiles. These are risk profiles for which 100% of the entry fee is refundable.

"Full-risk" risk profiles. These are risk profiles for which 100% of the entry fee is placed at risk.

"Hybrid" risk profiles. These are risk profiles for which X % of the entry fee is refundable and Y % of the entry fee is placed at risk, wherein X+Y=100 and wherein 0<X<100. It will be appreciated that, at least theoretically, an infinite number of hybrid risk profiles are definable.

It will be appreciated that which of these categories are made available varies between embodiments. In particular, some embodiments make use of a no-risk profile and full-risk profile exclusively, some embodiments make use of a no-risk profile, full-risk profile and one or more hybrid risk profiles, some embodiments make use of a no-risk profile and one or more hybrid risk profiles, some embodiments make use of full-risk profile and one or more hybrid risk profiles, and some embodiments may only make use of one or more hybrid risk profiles.

Figure 2:
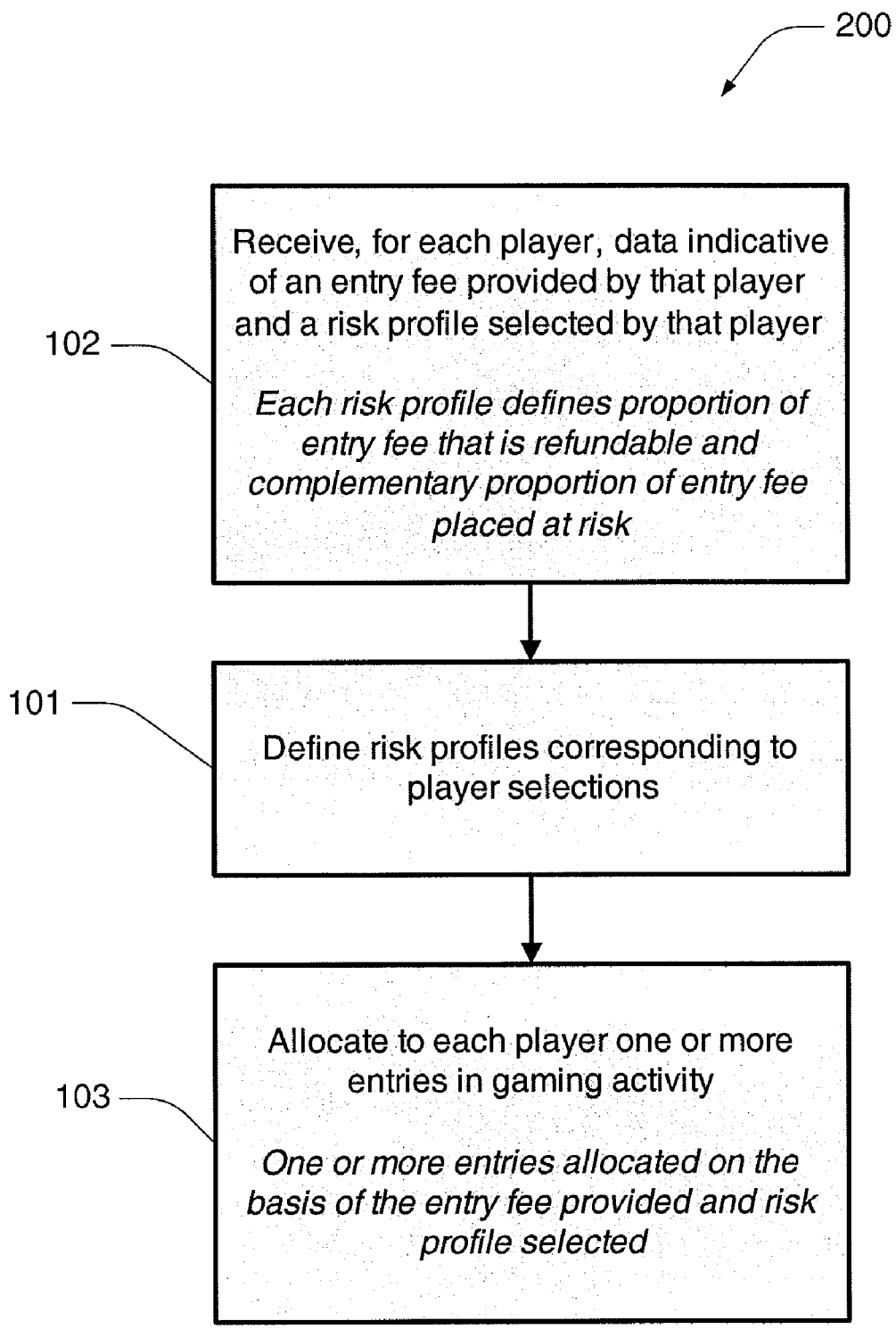
FIG. 2 illustrates a method for providing a gaming activity according to one embodiment.

The manner in which risk profiles are defined also varies between embodiments. Generally speaking, there are two main approaches, which are by no means mutually exclusive. The first approach is for a gaming operator to stipulate one or more predefined risk profiles, and make these available to players. In one such embodiment only the "no-risk" and "full-risk" profiles are made available, while in another such embodiment hybrid-risk profiles are additionally or alternatively made available at, for example, 20% increments (20% at-risk with 80% refundable, 40% at-risk with 60% refundable, and so on). Of course, this simple example should not be regarded as limiting, and other increments (including consistent and inconsistent increments) are used in other instances. The second approach is for a gaming operator to allow players to stipulate risk profiles. For example, a given player is invited to stipulate precisely how much of his or her entry fee is to be placed at risk, and/or how much of his or her entry fee is to be refundable. Although "and/or" is used in this situation, it will be appreciated that in most cases a player, by stipulating precisely how much of his or her entry fee is to be placed at risk, inherently by exclusion stipulates how much is to be refundable, and vice versa. Under this second approach, it is perhaps more intuitive to consider method 200 of FIG. 2, in which the order of steps 101 and 102 are reversed by comparison to FIG. 1. In this regard, it should be noted that any steps of methods described herein as being performed in a particular sequence are, in other embodiments, performable in a different sequence, provided there is no insurmountable practical barrier to such performance.

Although the majority of embodiments discussed herein are concerned with a situation where a plurality (that is, two or more) risk profiles are defined, in some embodiments there is only a single risk profile. In particular, in some embodiments only a single hybrid risk profile is defined. That is, all of the players place their respective entry fees on the basis of the same hybrid risk profile.

The term "refund" as used herein is intended to encompass a full or partial refund of the value component of an entry fee, whether in the form in which it was contributed or in some other form. Refunds may therefore be in cash or in kind. In particular, in some embodiments of the invention, a refund may take the form of a limited rollover entry for a specified number of subsequent gaming activities of the same or different type, an unlimited rollover entry for an indeterminate number of subsequent gaming activities of the same or different type, or the maintenance of a limited rollover entry or an unlimited rollover entry from a previous gaming activity. The term is also intended to encompass the option of a refund, in whatever form, whether or not that option is exercised at any particular point in time, or at all. In some embodiments a player is able to exercise the option of a refund at substantially any point in time. Further, the term "refund" is intended to encompass the concept of a promised prize, whether as an alternative to, or in addition to, a refund based on the value component of the entry itself. It is therefore possible that a refund in the context of particular gaming activities may exceed the full value component of the corresponding entry.

Carriage of Gaming Activity

Figure 3:
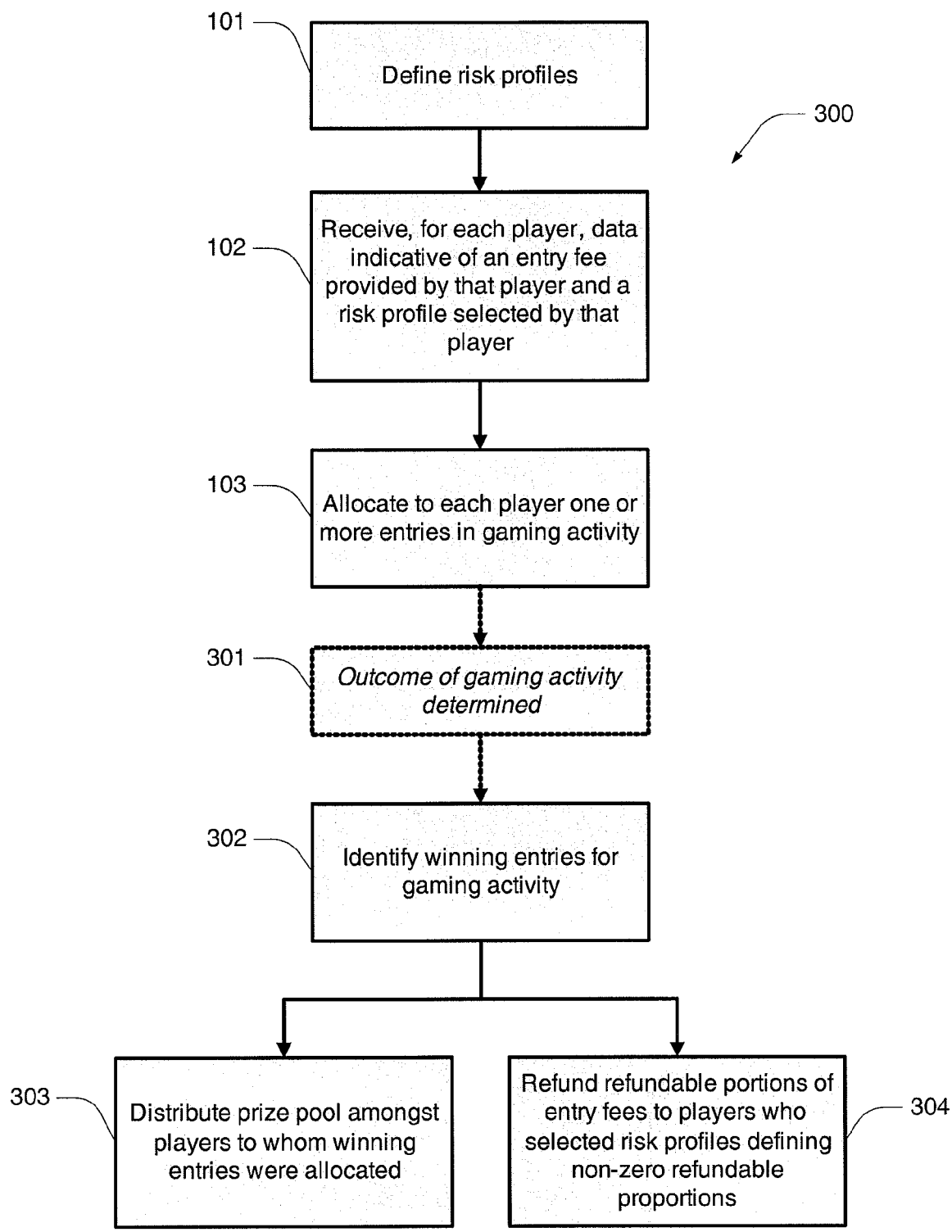
FIG. 3 illustrates a method for providing a gaming activity according to one embodiment.

FIG. 3 illustrates a method 300, which provides some additional context to steps 101 to 103. In particular, FIG. 3 illustrates additional steps 301 to 304, which generally relate to the manner in which a gaming activity is completed.

The outcome of the gaming activity is determined at step 301. Step 301 is bounded by a dashed line to indicate that it is, at least in some cases, an independent event, and not necessarily part of method 300. For example in some embodiments, the outcome of a gaming activity is determined by the completion of a sporting event or the like.

Step 302 includes identifying one or more winning entries. In the context of some gaming activities, there is only a single winning entry, whereas in other gaming activities there are multiple winning entries. In overview, the gaming operator has in place predefined criteria for determining, based on the outcome of the gaming activity, which entries are "winning entries" (entries in respect of which a win-event applies) and which entries are "non-winning entries" (entries in respect of which a no-win event applies). In one simple example, the gaming activity involves wagering on the outcome of a sporting event between two teams, Team A and Team B. Assume a given entry is placed on the basis of a wager that Team A will be victorious. If the outcome of the sporting event reveals that Team A was indeed victorious, that entry would be identified as a winning entry. Otherwise, it would be identified as a non-winning entry. It will be appreciated that identifying winning entries is a more detailed procedure in, for example, complex lottery style games.

Step 303 includes distributing a prize pool of prizes to players to whom the winning entries were allocated. That is, a prize pool is used to fund one or more prizes, and these prizes are awarded to the winning players (or player, in the event that there is only one prize, or in the event that one player wins all prizes). This is carried out in accordance with a predefined prize distribution protocol. There is no requirement that, at the completion of step 303, the relevant players have physically received prizes. Rather, in some embodiments, step 303 includes simply making it possible for winning players to obtain prizes by redeeming their entries in a designated manner. In some practical cases, winning entries are never redeemed, and the corresponding prizes never physically awarded (see discussion of unclaimed and abandoned prizes below).

The prize pool, and prizes distributed from that prize pool, need not be monetary in nature. For example, in some embodiments the prize pool includes goods and/or services for distribution as prizes. Examples include, but are not limited to, automobiles, consumer electronic devices, fashion products, retail goods, livestock, real property, professional services, education services, hospitality services, discount coupons, entries in other gaming activities and so on.

Step 304 includes refunding the refundable portions of entry fees to players who selected risk profiles defining non-zero refundable proportions. For example, assume a player provides an entry fee on the basis of a risk profile whereby 50% of that entry fee is refundable. In that case, step 304 includes refunding to that player 50% of his or her entry fee. Similarly to step 303, there is no requirement that, at the completion of step 304, the relevant players have physically received refunds. Rather, in some embodiments, step 304 includes simply creating an entitlement or making it possible for winning players to obtain refunds by redeeming their entries in a designated manner. In some practical cases, entries may never be redeemed, and the corresponding refunds therefore never physically provided.

In most embodiments described herein, it is assumed that all players receive refunds for the refundable proportions of their entry fees regardless of whether one or more winning and/or one or more non-wining entries were allocated in exchange for the relevant entry fees. However, in some embodiments, an entry fee attributable to a winning ticket is not refunded.

Recurring Entries

Figure 4:
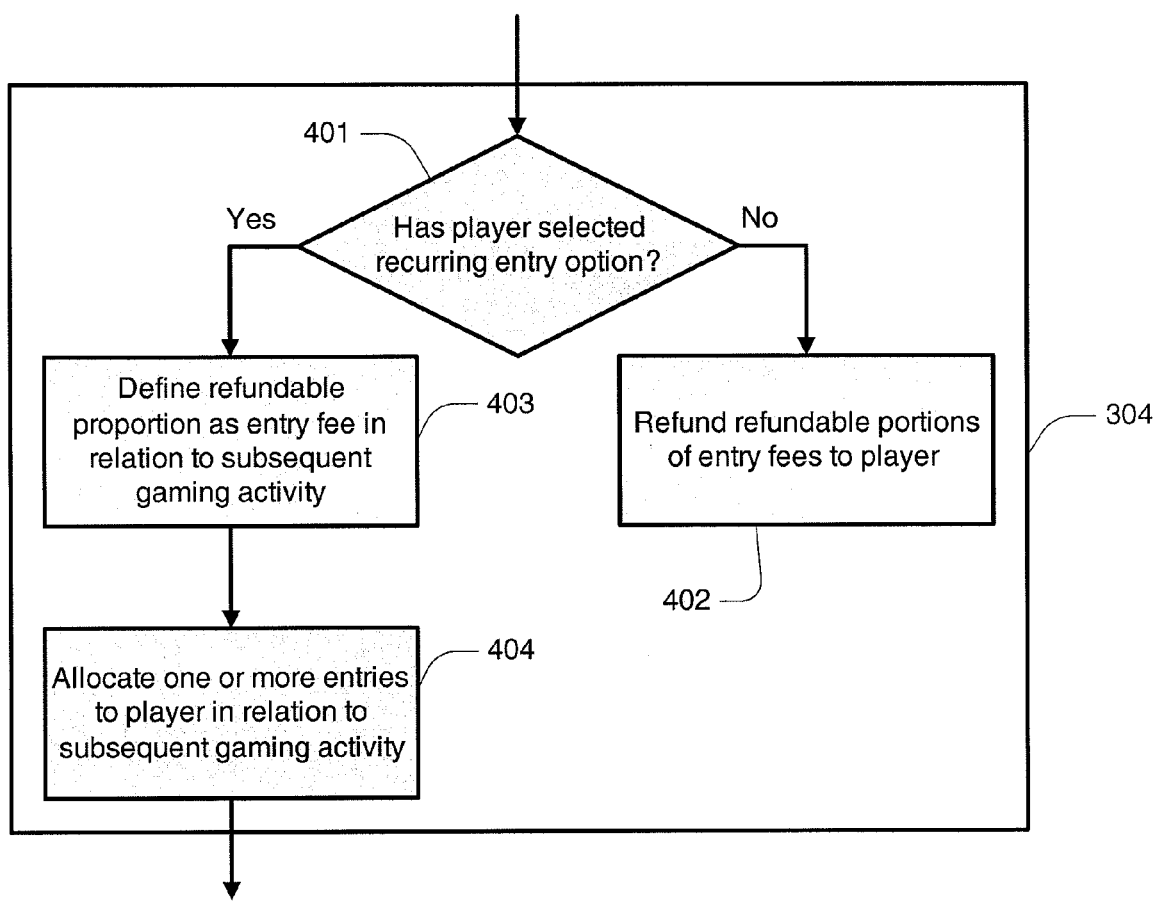
FIG. 4 illustrates a method for providing a gaming activity according to one embodiment.

Referring to FIG. 4, in some embodiments step 304 includes, for each player, selectively defining the refundable portion of the entry fee as at least part of a subsequent entry fee in relation to a subsequent gaming activity, and in the event that this occurs, allocating to the at least one player one or more entries in relation to the subsequent gaming activity in exchange for the subsequent entry fee.

In the context of FIG. 4, step 304 includes sub-steps 401 to 404. Sub-step 401 includes determining whether a player has selected a recurring entry option. To this end, for a gaming activity wherein the scenario of FIG. 4 applies, a player is provided with the opportunity to select a recurring entry option either at the time of providing an entry fee, or at a subsequent time. In some embodiments a player is deemed to have selected the recurring entry option in the event that predefined criteria are met. For example, in various embodiments these predefined criteria include the likes of failure explicitly to select a non-recurring entry and/or failure to redeem, within a specified timeframe, an entry in respect of which a refundable proportion of the entry fee is available for collection.

In the event that a player has not selected the recurring entry option, the method progresses to step 402, which includes refunding to that player the refundable portion of his/her entry fees (for example by making it available for collection at a predetermined time upon redemption of the relevant entry or entries). In some embodiments, if this redemption does not occur within a specified timeframe, the method progresses to step 403.

In the illustrated embodiment, if at step 401 it is determined that the player has selected a recurring entry option, the method progresses to step 402 where the refundable proportion of the entry fee is defined as a subsequent entry fee in relation to a subsequent gaming activity. In some embodiments, only part of the refundable portion of the entry fee is defined as a subsequent entry fee. Furthermore, in some embodiments it defines only part of a subsequent entry fee. However, for the sake of the present example, it is assumed that the refundable proportion is simply defined as the subsequent entry fee. Then, at step 404, one or more entries are allocated to the player in exchange for the subsequent entry fee, these entries relating to a subsequent gaming activity.

The nature of the subsequent gaming activity varies between embodiments. For example, in some cases it is entirely unrelated to the gaming activity for which the initial entry fee was provided. However, in some embodiments, the gaming activity for which the outcome is determined at step 301 is a recurring gaming activity, and the subsequent gaming activity is a recurrence (in some embodiments being the next recurrence) of the gaming activity for which the outcome is determined at step 301. Thus, in some embodiments, an entry fee may be allocated to an initial gaming activity and thereafter rolled over into each and every subsequent recurrence of the same gaming activity, so as to create an indefinite or "perpetual" entry that is refundable at any time, or at predetermined points in time.

Figure 5:
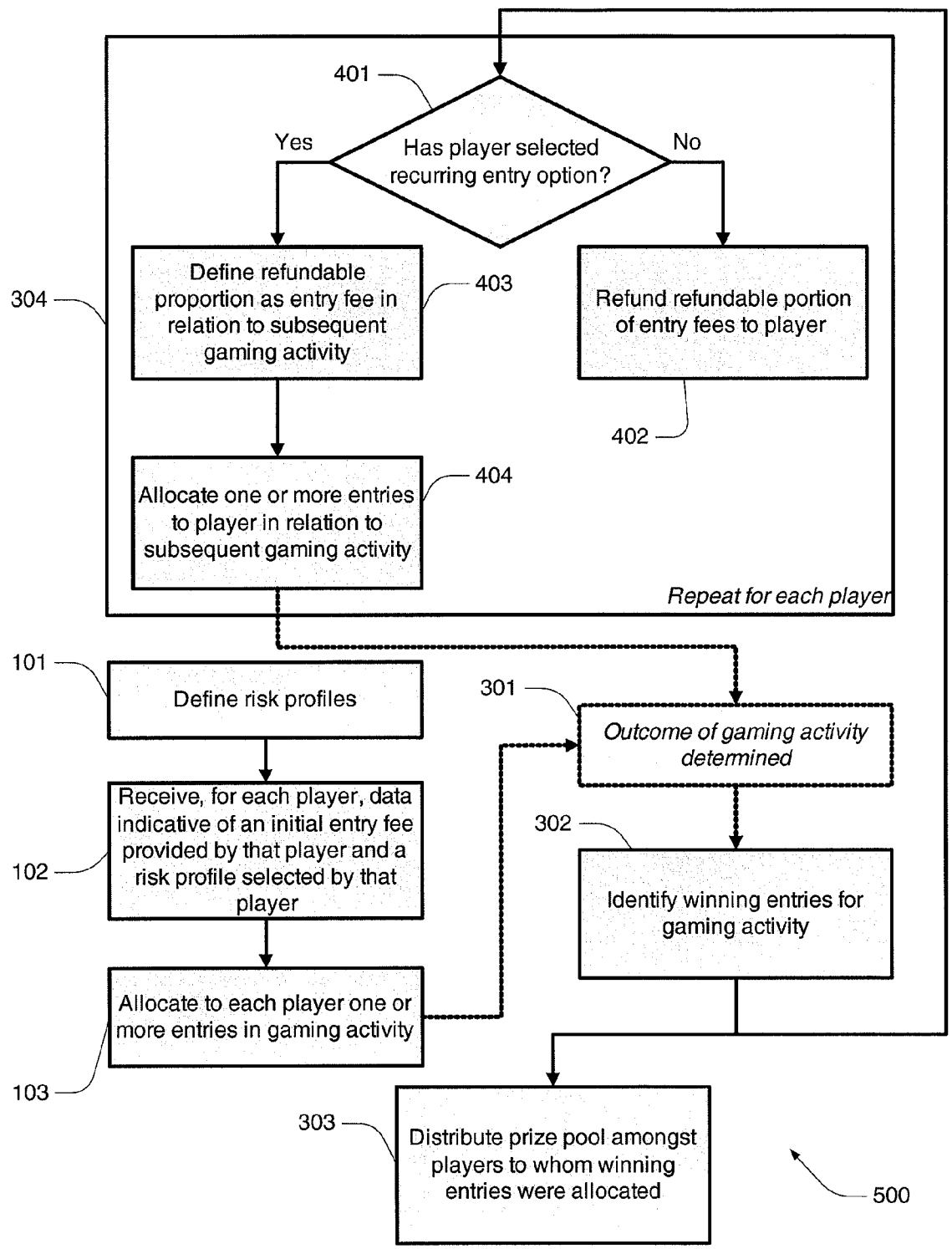
FIG. 5 illustrates a method for providing a gaming activity according to one embodiment.

An example of how this occurs is provided by method 500 of FIG. 5, where step 304 is followed by step 301 to define a looping method. Each time the method loops to step 301, the outcome of a different recurrence of the recurring gaming activity is determined.

It will be appreciated that common practical examples of recurring gaming activities include lotteries with periodic draws.

In some embodiments along the lines of FIG. 5, the subsequent entry fee is deemed to have been received on the basis of the same risk profile as the initial entry fee. However, this is not necessarily the case, and in some embodiments the risk profile for subsequent entry fees is a default risk profile or a risk profile nominated by the player or determined in accordance with another predefined protocol.

In the event that the subsequent entry fee is deemed to have been received on the basis of the same risk profile as the initial entry fee, some significant results are encountered. In the event that a no-risk profile is selected in respect of the initial entry, and the recurring entry option selected, a perpetually recurring entry is effectively provided (of course, this is contingent on continuing recurrence of the gaming activity). In this case, a player is essentially able to provide a single entry fee, and in exchange for that entry fee to be provided with one or more entries in a gaming activity and all subsequent recurrences of that gaming activity. In the context of lotteries having a periodic draws, the player is essentially provided with one or more entries in relation to each draw in exchange for a one-off entry fee. In the event that a hybrid risk profile is selected, the entry fee provided in relation to subsequent gaming activities diminishes after each activity, and inevitably the refundable proportion will diminish to a level where it cannot be exchanged for any entries. As a variation, in some embodiments, if a hybrid risk profile is selected, a no-risk profile is automatically adopted for subsequent activities thereby to provide perpetual recurrence (of course, this is contingent on continuing recurrence of the gaming activity).

In some embodiments, a user is permitted at any time to change whether or not the recurring entry option is selected. Essentially, this means that a user is permitted to obtain a refund corresponding to his/her remaining refundable entry fees at any time. For example, at or before the completion of the next gaming activity. Typically, a player who obtains a refund prior to the completion of a given gaming activity forfeits any entries in that gaming activity.

Prize Pool Supplementation

As foreshadowed, step 303 includes distributing a prize pool amongst those players to whom winning entries were allocated. In some embodiments, particularly where the gaming activity includes pari-mutuel aspects, this prize pool is funded at least in part by a portion of the entry fees.

The term "pool" is also intended to be given the broadest possible interpretation, covering the physical pooling of bets, entry fees or other value components into a single deposit account or other investment product, as well as the virtual pooling of such components across multiple accounts or multiple investment products, whether those components are deposited simultaneously or at different times, and whether those components are invested over the same or different timeframes.

It is appreciated that, in the context of a pari-mutuel type gaming activity, the provision of a no-risk profile may seem counterintuitive. In particular, in the context of many such gaming activities, entry fees are used to fund prizes. However, in the event that an entry fee is fully refundable, by traditional mechanics it is not possible to use that entry fee to fund prizes.

Some embodiments of the present invention have been developed to allow a player who selects a no-risk profile in relation to a given entry fee to nevertheless make a contribution to a prize pool on the basis of that entry fee. This is achieved by a process referred to as "prize pool supplementation", which is discussed below.

Figure 6:
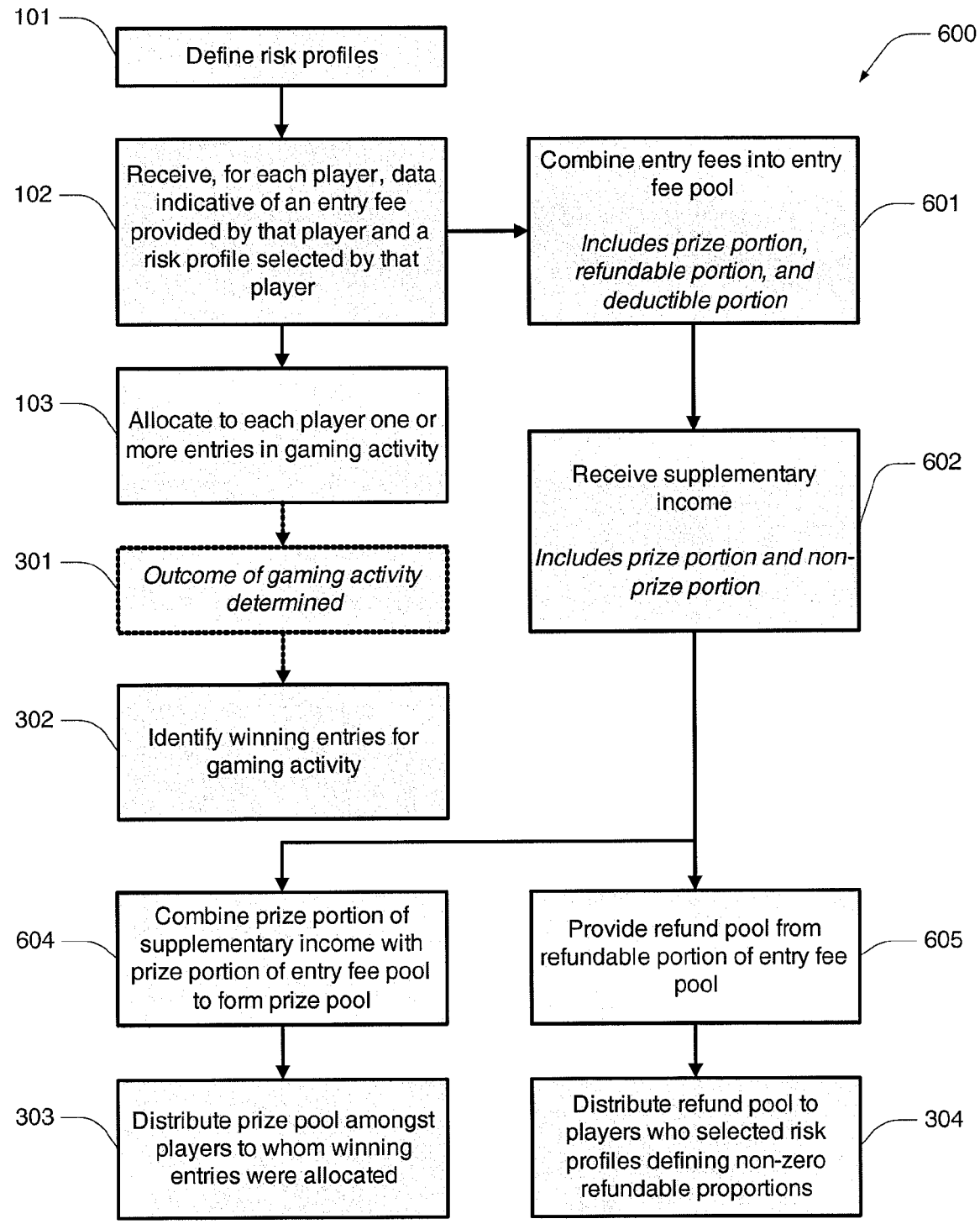
FIG. 6 illustrates a method for providing a gaming activity according to one embodiment.

A general example of prize pool supplementation is provided by method 600 of FIG. 6. Step 601 includes combining the entry fees received from the plurality of players at step 102 into an entry fee pool. This entry fee pool, in the present embodiment, includes three portions:

- A prize portion. This prize portion is defined by at least a proportion of the at-risk proportions of entry fees received at step 102.
- A refundable portion. The refundable proportions of entry fees received at step 102 define this refundable portion.
- A deductible portion. This portion is essentially defined by any remaining proportion of the entry fees that is not attributable to the prize portion or the refundable portion. In some embodiments the gaming operator derives profit from the deductible proportion. In some embodiments, government taxes, duties, levies or charges are included in the deductible portion. In some embodiments the deductible portion is zero.

Step 602 includes receiving supplementary income. This supplementary income includes a prize portion and a non-prize portion, with the latter being zero in some embodiments.

Step 604 includes combining the prize portion of supplementary income with the prize portion of the entry fee pool to form the prize pool from which prizes are to be distributed. In some embodiments, by such an approach and as described in more detail below, it is possible to provide a prize pool that is greater in value than the sum of the entry fees. That is, the gaming activity distributes to the players a greater sum in prizes than was collected as entry fees.

Step 605 includes providing a refund pool from the refundable portion of entry fee pool. It will be appreciated that this refund pool provides the funds from which refunds are distributed at step 304.

The nature of supplementary income received at step 602 varies between embodiments. In some embodiments, the nature of supplementary income includes income that falls into one or more of the following broad categories, which should by no means be regarded as exclusive:

Investment Return. This is considered in more detail below under the heading "Prize Pool Supplementation by Investment of Entry Fees", and various embodiments described herein assume that the supplementary income takes this form. As a general overview, some or all of the entry fees collected from players are subjected to an investment procedure for a period of time, and the supplementary income includes some or all of the investment return derived from that investment procedure, or a an amount having a value corresponding to some or all of the investment return derived from that investment procedure (optionally provided by an operator in anticipation of receiving the investment return).

Operator Contributions. In some embodiments, the gaming operator itself beneficially provides some or all of the supplementary income from its own source of funds. For example, in some cases the operator offers the incentive of an enhanced prize pool to induce a higher level of player participation than might otherwise be the case.

Third Party Contributions. In some embodiments, a third party makes a contribution, and the supplementary income includes some or all of this third party contribution. In some such embodiments, a third party makes a contribution in consideration for being granted a marketing opportunity. For example, a third party enters into an arrangement with a gaming operator whereby a predetermined level of contribution is made in exchange for either the provision of marketing information on behalf of the third party to one or more of the players, or alternately the provision to the third party information regarding one or more of the players (such as personal information or opinion information), for subsequent marketing purposes. In a simple example, entries are printed on physical tickets, these tickets being configured to carry printed marketing information, and a third party makes a contribution in exchange for having its own marketing information printed on those tickets. It will be appreciated that various marketing structures may be implemented among different embodiments.

A significant result from the notion of supplementary income is that, at least in some embodiments, a gaming operator is essentially able, in a consistent and sustainable manner, to provide a gaming activity that distributes to players a sum of money or a corresponding value in prizes that is greater than the sum of entry fees received from the players. That is, a game is provided that in essence "gives out more than it takes in". This is discussed further below.

Prize Pool Supplementation by Investment of Entry Fees

Figure 7:
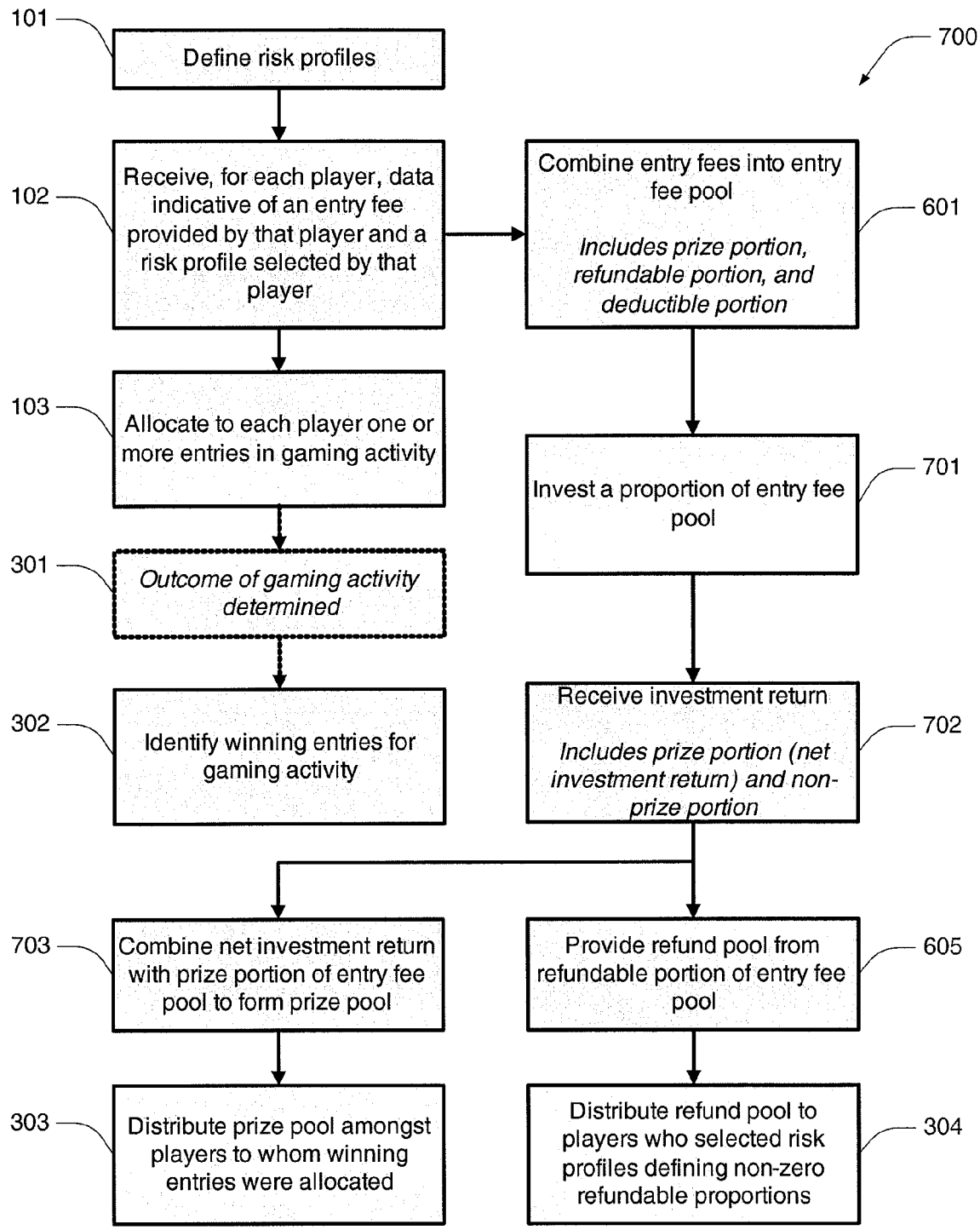
FIG. 7 illustrates a method for providing a gaming activity according to one embodiment.

As foreshadowed, in some embodiments the supplementary income is practically or notionally funded by subjecting some or all of the entry fees collected from players to an investment procedure for a period of time, the supplementary income including some or all of the investment return derived from that investment procedure or an amount corresponding to the value of some or all of that investment return. This is illustrated in method 700 of FIG. 7. In particular, step 701 includes investing a proportion of the entry fee pool (a non-zero proportion, in this instance). Step 703 includes receiving a gross investment return, including a prize portion (referred to herein as the net investment return) and a non-prize portion. Step 703 includes combining an amount having a value corresponding to the net investment return with the prize portion of the entry fee pool to provide a prize pool for distribution to the winning players. In some cases this amount having a corresponding value to the net investment return is the investment return itself, whereas in other cases it is a third party or operator contribution made in anticipation of, or as a substitute for, the net investment return.

In some embodiments, so as to allow a longer investment period, step 703 does not occur for some time after step 301 or 302, this period of time optionally being of the order of days, weeks or months.

Any references herein to "investment return" or "investment income" are to be interpreted as references to "net investment return" and "net investment income" unless specifically stated otherwise. In practice, the investment procedure results in the derivation of a gross investment return, and various deductions (such as taxes, levies, duties, commissions, investment charges, broker fees, operator charges, and so on) are taken from this gross investment return. The term "net investment return" defines a remainder of the gross investment return, this net investment return being added to the prize pool as some or all of the supplementary income.

The terms "taxes" and "duties" as used herein are intended to encompass any relevant Federal, State and/or local government taxes, duties or imposts as well as levies or charges applied by intermediaries or other third parties connected with the gaming activity, that are essentially non-discretionary in so far as the gaming operators or players are concerned.

The terms "invest", "investing", "investment" and the like as used herein are intended to be afforded a broad interpretation covering the utilisation or disposition of funds or valuable assets in a general sense. Examples include but are not limited to, investment in any financial or real asset or property of any type, whether securitised or otherwise, with value denominated in any currency or combination of currencies, whether listed on a public trading exchange or unlisted on any such exchange, including the following, as well as warrants, options, derivatives, deferred purchase contracts, installment receipts and the like over any of the following:

Deposits with third parties whether interest-bearing or otherwise and whether held with a financial institution or some other party.

Mortgages, debt instruments or securities of any type.

Any form of American Depository Receipts or similar instruments or asset classes as may be available from time to time in any jurisdiction.

Promissory notes, bills of exchange, convertible notes, loan notes or any other form of debt or debt instrument.

Convertible or other bonds.

Preference shares, redeemable preference shares, stocks, equities or shares of any class whether fully or partly paid up.

Warrants, options, derivatives, deferred purchase contracts, installment receipts and the like.

Options, warrants or similar instruments convertible into stocks, shares or equities of any sort.

Warrants, options, derivatives, deferred purchase contracts, installment receipts or the like over any index relating to any matter including but not limited to stocks, shares or equities of any sort or futures or any financial instrument or financial asset.

Currency or interest rate swap agreements, forward interest rate agreements and the like.

Real property or property of any other kind including intellectual property.

Any contract, arrangement or instrument of any type which confers a benefit of value in relation to an item or items of value.

Futures contracts and the like in relation to any thing, item or matter.

Currencies.

Precious metals.

Works of art and any other valuables such as stamps, coins or jewels; and

Any other form of investment offering at least the potential for return on capital over a period of time, whether or not the capital is guaranteed, and whether or not a return on capital is guaranteed.

Offshore investment.

Trade in bullion or the like.

Alternatives forms of disposition of valuable assets, for example buy-back contracts and other instruments used in certain jurisdictions in light of Sharia law, or in accord with any other religious or other customs or beliefs.

Additionally, the terms "invest", "investing", "investment" and the like, as used herein, should be construed as including, but not limited to, the use of one or more money management techniques to increase an available amount of funds and investing the resultant increased available amount of funds. It should also be appreciated that the "investment return" need not be cash-based or even financial in nature, provided merely that it has some intrinsic, virtual, deemed or perceived value in the broad context of the gaming activity.

Further, it should be appreciated that for the purposes of the present invention, any investment procedure (or other methodology for generating supplementary contributions for or on behalf of players) may be entirely invisible from the players' perspectives, being managed as a "back office" operation by or on behalf of the gaming operator. Indeed, in many embodiments, this is the preferred approach, so as to shield the players from the detail of potentially complex investment and risk management strategies, which might otherwise detract from the experience and enjoyment of the primary gaming activity itself. This is an important distinction with respect to some forms of investment product, in which an understanding of transparent the underlying investment mechanics is primary, and any associated gaming activity is of secondary significance.

Figure 8A:
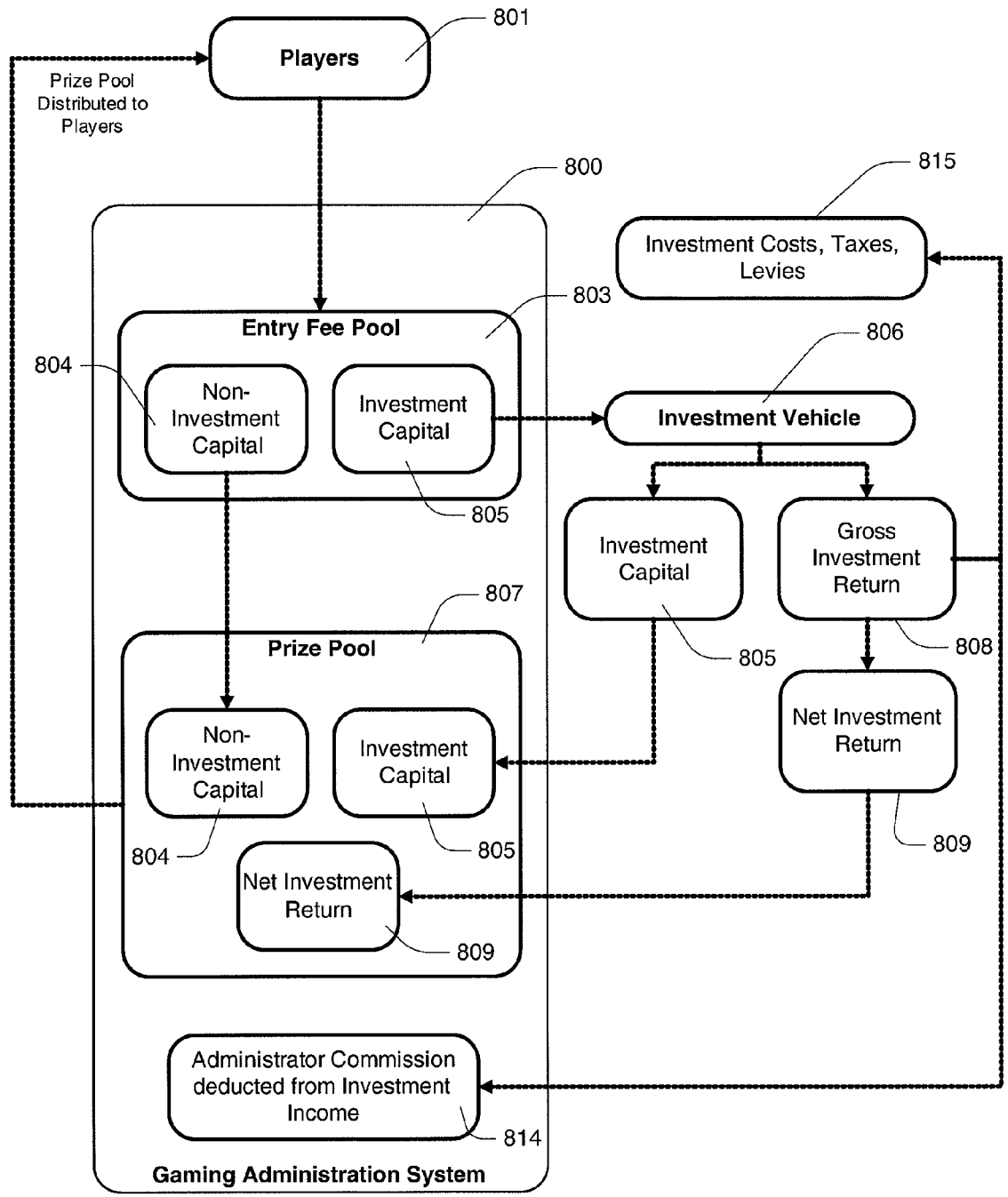
FIG. 8A illustrates system for providing a gaming activity according to one embodiment.

FIG. 8A schematically illustrates an exemplary gaming administration system 801 according to one embodiment where the prize pool is supplemented by investment income. Players 801 provide respective entry fees to the system 801. These entry fees are combined into an entry fee pool 802. This entry fee pool includes non-investment capital 804 and investment capital 805, although in some embodiments the former has a zero value. Investment capital 805 is provided to an investment vehicle 806, optionally by way of electronic funds transfer. In some embodiments the entry fees, or parts thereof, are transferred substantially directly to this vehicle. Non-investment capital 804 is added to a prize pool 807.

At the end of a predetermined investment period, investment capital 805 is added to prize pool 807. A gross investment return 808 is received, and from this an administrator commission 814 is deducted, along with other deductions 815 (such as taxes, levies, duties, investment costs, and so on), thereby to define a net investment return 809. Net investment return 809 is added to prize pool 807, that prize pool being at an appropriate time distributed among the players.

Sustaining a Prize Pool of Greater Magnitude than an Entry Fee Pool

As foreshadowed, a significant result from the notion of supplementary income is that, at least in some embodiments, a gaming operator is essentially able, in a consistent and sustainable manner, to provide a gaming activity that distributes to players a sum of money (or a prize pool having a value) that is greater than the sum of entry fees received from the players. That is, a game that "gives out more than it takes in". Some embodiments of the present invention are focussed on such a gaming activity, quite apart from aspects of risk profiles. For example, in one embodiment the invention provides a method including the steps of:

- Receiving entry fees from players.
- Combining the entry fees into an entry fee pool.
- Defining a prize portion of the entry fee pool for addition to a prize pool.
- Deriving gross supplementary income. In some cases this gross supplementary income is derived by virtue of the operator having access to the funds defining the entry fee pool (for example by way of investing some or all of the entry fee pool). In some cases this supplementary income is derived by virtue of the operator having an interaction with the players (for example where the supplementary income is derived from providing marketing information such as a corporate name or logo imprinted on a ticket to the players, or acquiring personal information of marketing value such as contact details or purchasing preferences from the players).
- Defining net supplementary income. This is, in some embodiments, the gross supplementary income less any predefined deductions, such as taxes, duties, levies, operator deductions, commissions, investment costs, and so on.
- Combining the prize portion of the entry fee pool with the net supplementary income to form the prize pool, wherein the prize pool has a value greater than the sum of the entry fees.
- Distributing the prize pool among winning players based on a distribution protocol.

It is appreciated that, in the prior art, it is known for a gaming operator to itself make a contribution to the prize pool, thereby to provide a prize pool having a value greater than the sum of the entry fees. However, it will be appreciated that this is unsustainable and typically a temporary, or ad-hoc or one-off approach implemented from time-to-time to increase player participation or to honour prize promises in the event that participation is below expectations. On the other hand, some embodiments of the present invention provide approaches that are sustainable in the longer term, these being particularly useful for recurring gaming activities.

Unclaimed/Abandoned Prizes

In some embodiments, unclaimed prizes are used to further supplement the prize pool. Referring to examples considered previously, steps 303 and 304 respectively include distributing a prize pool or prizes to players to whom the winning entries were allocated and refunding the refundable portions of entry fees to players who selected risk profiles defining non-zero refundable proportions. As foreshadowed, there is no requirement that, at the completion of steps 303 and 304, the relevant players have physically received prizes and/or refunds. Rather, in some embodiments, these steps include simply making it possible for winning players to obtain prizes and/or refunds by redeeming their entries in a designated manner.

Inevitably, for at least some of the refunds and prizes, there will be a delay between the steps 303/304 and the time at which funds are actually obtained by players. During this delay, the funds are considered to be "unclaimed prizes" (noting that these, at least in some cases, include both prizes and refunds). In some cases, upon the expiration of a predetermined time period, it is deemed that certain unclaimed prizes will never be obtained by the relevant player or players, and these are categorised as "abandoned prizes" (again, noting that these, at least in some cases, may include both prizes and refunds).

In some embodiments, some or all of the unclaimed prizes are subjected to an investment procedure to derive investment income. At least a portion of this investment income is then added to a subsequent prize pool in relation to a subsequent gaming activity, typically a recurrence of the gaming activity from which the unclaimed prizes originated (although not necessarily the immediately subsequent recurrence). It will be appreciated that such an approach allows for additional prize pool supplementation.

In some embodiments a proportion of the abandoned prizes is also added to the prize pool for a subsequent gaming activity.

Contribution

In some of the embodiments considered below, the number of entries allocated to a given player takes into account the "contribution" made by that player. Notionally, each entry fee has a corresponding total contribution. This total contribution includes:

- A primary contribution amount, which comprises the proportion (which may be zero) of the entry fee that is placed at risk, less any predefined deductions. These predefined deductions include none or more of operator deductions (for example where the gaming operator takes a proportion of the entry fees as income), levies, taxes, duties, and so on. Essentially, it is the proportion of the entry fee that is attributable to the prize pool.
- A supplementary contribution amount. For a given entry, the supplementary contribution amount is a proportion of the supplementary income attributable to that entry. In some examples along the lines of FIG. 7 and FIG. 8A, the supplementary contribution amount comprises the proportion of the prize portion of investment return notionally or actually attributable to a given entry. This will be more fully understood in light of examples considered further below.

The precise manner in which contribution is defined varies between embodiments, and the scope of the present disclosure should not necessarily be limited by any specific definition. The supplementary contribution amount for a given player in some embodiments includes components having values corresponding to:

- An entry fee supplementary contribution amount. For example, an operator designates that a predetermined proportion of each entry fee defines at least a component of the supplementary contribution amount for that entry fee.
- A net investment return derived from subjecting the entry fee to an investment procedure for a period of time (such as from the time the entry fee is received to the time primary prizes are allocated). The investment procedure derives a gross investment return, and of this a net investment return preferably defines a component of a player's supplementary contribution amount.
- A net distribution marketing amount. For example, a third party provides a gaming operator with a gross distribution marketing amount (such as currency or goods/services) in consideration for marketing information being provided to a player. Of this gross distribution marketing amount, a net distribution marketing amount preferably provides a component of the player's supplementary contribution amount. In some cases, a player receives a ticket (physical or electronic) as a receipt for placing an entry fee, and this ticket carries the relevant marketing information. In some cases a player is able to increase his/her net distribution marketing amount by receiving further marketing material—for example by viewing electronic advertisements.

A net collection marketing amount. This is similar to the example considered above, however is derived by collecting information from players, such as personal information or opinion information. For example, in some cases a player is able to increase his/her net collection marketing amount by participating in a survey.

Other net third party contribution amounts.

This is by no means an exclusive list, and alternative embodiments make use of a wider range of possible amounts.

There is discussion in the above examples of "gross" amounts and "net" amounts. The terms "gross" and "net" are used in a descriptive sense only. In particular, the term "gross" refers to an amount derived by the gaming operator, and the term "net" refers to an amount that is added to the supplementary contribution amount. In some cases the net amount is the corresponding gross amount less any applicable taxes, levies or operator charges. In other cases there is no direct nexus between the gross and net amounts.

In some embodiments, a player is able to obtain one or more entries without providing a physical entry fee, and instead by participating in marketing activities so as to derive a supplementary contribution amount, and therefore make a non-zero contribution. That is, in some cases the entry is in essence wholly notional, and may also be deemed to be fully or partially refundable, based on associated risk factors and/or other criteria. However, the player does indeed provide an entry fee that has value to the operator, in the sense that, by the player participating in marketing activities, the operator derives a gross marketing contribution amount. This allows the player to derive a supplementary contribution amount, and therefore receive one or more entries. In a practical example, players are, in this way, essentially able to be provided "free" entries in exchange for viewing advertisements or participating in market research activities. The number of entries allocated to a given player is, as in various other examples presently considered, preferably related to the supplementary contribution amount for that player.

Allocation of Entries to Players

The number of entries allocated to a given player at step 103 varies between embodiments. As a general notion, the risk profile selected by a player impacts on that player's involvement in the gaming activity. It will be appreciated that, by selecting a risk profile, a player is essentially able to manage the risk taken, with risk inherently increasing in relation to a given entry fee as a greater proportion of that entry fee is placed at risk. Several categories of examples regarding how the selection of a risk profile affects the player's involvement in the gaming activity are considered below, and fall into the following general categories:

Risk and Chance. Under this category, the risk profile selected by a given player affects the relative probability of that player winning a prize in relation to the gaming activity in exchange for the entry fee provided. In some cases, this relative probability is increased by allocating more entries, and the risk profile selected by a given player affects the number of entries allocated to that player in exchange for the entry fee provided.

Risk and Cost. Under this category, the risk profile selected by a given player affects the quantum of entry fee in exchange for which a predetermined number of entries is allocated.

Risk and Return. Under this category, the risk profile selected by a given player affects one or more characteristics of a prize winnable by that player in exchange for the entry fee provided.

Combination Approaches. This category combines two or more of the above categories. For example, in some cases, the risk profile selected by a given player affects the quantum of entry fee in exchange for which a predetermined number of entries is allocated and one or more characteristics of a prize winnable by that player in exchange for the entry fee provided.

These categories are dealt with in more detail below, under respective headings.

Risk and Chance

As foreshadowed, some embodiments of the present invention allow a player to select between a plurality of unique risk profiles, and in doing so manage aspects of risk and chance. In overview, each risk profile defines a proportion of the entry fee that is refundable on the basis of predetermined refund criteria and a complementary proportion of the entry fee that is placed at risk. As noted above, in some embodiments, the risk profiles include:

A "no-risk" profile. Under this profile, the entry fee is 100% refundable in the case of a no-win event. That is, a player selecting the "no-risk" profile is essentially promised a refund of his or her entry fee regardless of the outcome of the gaming activity.

A "full-risk" profile. Under this profile, 100% of the entry fee is placed at risk, and the player is not promised any refund in the case of a no-win event.

One or more hybrid-risk profiles where X % of the entry fee is refundable and Y % of the entry fee is placed at risk, with constraints X+Y=100 and 0<X<100.

In the context of "Risk and Chance", the risk profile selected by a given player affects the relative probability of that player winning a prize in relation to the gaming activity in exchange for the entry fee provided. In some cases, this relative probability is increased by allocating more entries, and the risk profile selected by a given player affects the number of entries allocated to or on behalf of that player in exchange for the entry fee provided.

The term "relative probability" essentially describes the probability of an entry being identified as a winning entry, relative to the total number of entries at the time the outcome is determined (that it, the time of step 301). As used herein, the terms "chance" and "chances" are particularly distinguished from the concept of relative probability. The term "chance" is used to describe a notional unit of chance, and the relative probability of this "chance" winning a prize depends on the total number of competing chances. For example, if a first player is awarded a single chance in a game where there are a total of 100 chances awarded, that player has a 1 in 100 relative probability of winning on the basis of that chance. If a second player in the same game is awarded 10 chances of these 100 total chances, that player has a 1 in 10 relative probability of winning. If another 100 chances are subsequently awarded, increasing the total number of chances in the game to 200, the first and second player's relative probabilities of winning decrease to 1 in 200 and 1 in 20 respectively. As used herein, unless the context dictates otherwise, the phrase "chances of winning" relates to the number of chances, and not necessarily to the relative probability of winning.

In overview, Risk and Chance embodiments assume a situation where a player's chances of winning a prize in relation to a particular gaming activity correspond to the number of entries that player holds in relation to that gaming activity. By doubling the number of entries, the number of chances correspondingly doubles. Increasing the chances awarded to a player can correspondingly increase the probability of a player winning, however the relative probability of the player winning will also depend on the total number of chances/entries in the game, and may vary over time as the total number of chances/entries in the game correspondingly varies.

In the context of the present disclosure, it is assumed that a single entry equates to a single chance. This is for the sake of simplicity only, and it will be appreciated that in some embodiments some entries may be structured or defined so as to carry with them a plurality of chances. For example, in some embodiments each entry may equate to a "packet" of five chances.

In some embodiments of the invention, the number of entries allocated to a given player, on the basis of a given entry fee, is greater if that player adopts a less conservative risk profile (that is, a risk profile for which a higher proportion of the entry fee is placed at risk). That is, for a first risk profile, a given player is allocated a predetermined number of entries in exchange for a predetermined entry fee, and, for a second risk profile, a given player is allocated an increased number of entries for the same predetermined entry fee, wherein the first risk profile defines a greater proportion of the entry fee that is refundable compared with the second risk profile.

In some embodiments, the number of entries allocated to a given player is related to a contribution made by or on behalf of that player to the relevant prize pool. For example, in some embodiments the number of entries allocated to a given player is determined according to the general formula:

$$E_{player} = kA + B$$

wherein $E_{player}$ is the number of entries allocated to a particular player in exchange for the entry fee provided by that player, A is a parameter related to the contribution made by or on behalf of that player to the prize pool, B is an adjustment factor, and k is a proportionality factor selected such that the allocation of entries follows a predetermined risk/chance favouritism protocol. In some cases, it is preferred that $k \geq 1$, and in some embodiments $1 \leq k \leq 100$. However, in various embodiments $0.01 \leq k \leq 100$.

One approach for implementing Risk and Chance is to use "bonus entries". As a general concept, a player who places a non-zero proportion of his or her entry fee at risk receives more bonus entries than a player who adopts a no-risk profile (and in doing so places none of his/her entry fee at risk), and therefore the former player is rewarded with an increased number of entries, in the form of bonus entries. Several examples of how bonus entries are assigned in various embodiments are considered below. In these examples, the following parameters are used:

$t_{player}$, the entry fee provided by a particular player. For the purposes of some embodiments, $t_{player}$ is assumed to be net of any levies, taxes, operator charges, and so on. That is, in some embodiments $t_{player}$ is less than the actual amount of money provided by the player.

$b_{player}$, the number of "bonus entries" given to a particular player in exchange for $t_{player}$.

$s_{player}$, the number of "standard entries" given to a particular player in exchange for $t_{player}$.

$E_{player}$, the total number of entries given to a particular player based on an entry fee $t_{player}$. Unless specifically stated otherwise, it may be assumed that this total number of entries is made up of the standard entries and the bonus entries ($E_{player} = s_{player} + b_{player}$). In some embodiments there are no standard entries, only bonus entries, as discussed below.

a, the desired refund proportion for a particular player, where $0 \leq a \leq 1$. This is, in essence, indicative of a risk profile. Specifically, $a=0$ for full-risk and $a=1$ for no-risk. If $a=0.2$, then 20% of the entry fee is refundable and 80% of the entry fee is placed at-risk. It will be recognised that $(1-a)$ is the proportion that is placed at risk.

$I_1$ and $I_2$, the net rates of return based on supplementary contribution strategies in respect of the refundable portion of the entry fee and non-refundable portion of the entry fee respectively. This is the "net" strategy in the sense that it excludes supplementary contribution that is attributable to operator charges, investment costs, taxes, levies, and the like. It only relates to that portion of supplementary contribution that is designated for addition to the prize pool. For simplicity in the present examples, it is assumed that supplementary contribution takes the form of investment return only. However it will be appreciated that this is for the sake of illustration only, and the present embodiments are by no means intended to be limited to the situation where supplementary contribution is comprised wholly or even partly of investment return. In the present examples, it will be appreciated that $I_1(a.t_{player})$ provides the net return on investment on the refundable portion of the entry fee, and likewise $I_2.((1-a).t_{player})$ provides the net return on investment on the at-risk portion of the entry fee. To provide a simple example, if the investment strategy $I_1$ provides a 1% net return on investment for funds invested over the course of the "game period", then $I_1=0.01$. It will be appreciated, from the context, that the "game period" is the period of time between the receipt of entry fees and the distribution of prizes and refunds during which the entry fees are subjected to investment. In some embodiments $I_1=I_2$, and in some embodiments one of $I_1$ or $I_2$ is zero. It will be appreciated that values of $I_1$ or $I_2$ depend on the selection of appropriate investment and risk-management strategies on the part of a game operator, issues that fall generally beyond the scope of the present disclosure. In the present circumstances, a positive return on investment is assumed. Furthermore, although in the present embodiments linear investment strategies are assumed, in other embodiments non-linear investment strategies are used. The present embodiments assume a positive return on investment, which can effectively be guaranteed by the operator if desired, for example through fixed-interest bearing deposits with secure financial institutions, or otherwise hedged against loss. This feature is a particularly advantageous and attractive outcome from the players' perspective by contrast with traditional pari-mutuel type gaming systems, in which the prize pool available for distribution to players collectively is typically of lesser value than the total amount received from the players collectively as bets.

$C_{player}$, the contribution a player makes based on $t_{player}$. $C_{player}$, in the present embodiments, consists of the return on investment derived in respect of the entry fee plus the portion of the entry fee that is placed at risk. It will be appreciated that the following formula can be used to calculate $C_{player}$:

$$C_{player} = I_1(a.t_{player}) + I_2((1-a).t_{player}) + (1-a).t_{player}$$

In other embodiments a different definition of $C_{player}$ is used, for example in embodiments where the supplementary income includes or is defined by a component other than a net investment return (such as an operator contribution or third party contribution).

$t_{unit}$, a unit payment amount. This parameter is used in some embodiments where an operator wishes to set a minimum spend level, and/or receive entry fees in common multiples. For example, in one embodiment $t_{unit}$=$10, and entries are sold in $10 lots. In some embodiments $t_{unit}$ only applies in certain situations—for example $t_{unit}$ applies for entries sold at a physical retail venue, and $t_{unit}$ does not apply for entries sold at virtual retail venues (by telephone, SMS, email, internet, or the like). In some cases, a minimum spend level is set independent of $t_{unit}$. In some embodiments, there is substantially no restriction on the quantum of entry fee that a player is able to provide, conditional on that entry fee being greater than the minimum spend level.

e, the number of standard entries per unit payment amount. e is used in conjunction with $t_{unit}$. For example, in one embodiment a $10 lot buys five standard entries, so $t_{unit}$=$10 and e=5. In embodiments where $t_{unit}$ and e are used, it will be appreciated that the following formula provides $s_{price}$, the price of a single standard entry:

$$s_{price} = \frac{t_{unit}}{e}$$

It will be appreciated that the number of standard entries $s_{player}$ given to a player in exchange for a unit payment is given by the following formula:

$$s_{player} = \frac{t_{player}}{\frac{t_{unit}}{e}} = \frac{e}{t_{unit}} \cdot t_{player}$$

In some embodiments, there is no limitation on an entry fee provided by a player, and the number of entries awarded to a given player is simply the total sum provided by that player divided by $s_{price}$, with any residual amount attributable to an "impartial entry" being returned as change. In some cases $s_{price}$ is set at $0.01 (or an alternative lowest possible unit of legal tender) to substantially eliminate residual amounts.

k, a proportionality constant. This proportionality constant is used in the sense that if A is proportional to B, then A=k.B. The proportionality constant is varied to affect game characteristics, such as whether risk-averse or non-risk averse (or neither of these) players are favoured. That is, k is a proportionality constant selected such that the allocation of bonus entries follows a predetermined risk/chance favouritism protocol.

It should be noted that the term "bonus" is intended to be descriptive only, and the use of this term should not be regarded as limiting in any way. That is, in other embodiments, approaches are implemented whereby a category of entries corresponding conceptually to "bonus" entries may be implemented, although those entries may not necessarily be explicitly referred to as "bonus entries". The terms "bonus entry", "bonus entries" and the like are intended to be broadly construed as encompassing both physical and virtual bonus entries, as well as any other physical or virtual mechanism, mathematical algorithm, software program, programming subroutine or any combination thereof that has an equivalent effect of increasing the chances, in some defined way, of a particular entrant winning the associated gaming activity, relative to those of one or more other entrants, or categories of entrants, or relative to the same player under different circumstances. A bonus entry may also provide the opportunity for a particular entrant to participate in a larger prize pool relative to one or more other entrants, on the basis of the same or different chances of winning.

EXAMPLE 1

Bonus Entries Proportional to Contribution

In some embodiments, the number of bonus entries awarded is proportional to the player's contribution. That is, the following formula applies:

$b_{player}=k.(C_{player})=k.(I_1(a.t_{player})+I_2((1-a).t_{player})+(1-a).t_{player})$ In such embodiments, the total number of entries that are awarded to a player is given by the formula $E_{player}=s_{player}+b_{player}$. In some cases the players are offered a set number of standard entries for a unit entry amount, such as 5 entries for $1, 1 entry for $5, or entries at $1 each. The player receives this many standard entries, plus bonus entries proportional to contribution. In such cases, it is preferred that $k \geq 1$, and in some embodiments $1 \leq k \leq 100$. However, in various embodiments $0.01 \leq k \leq 100$.

As a numerical example, consider an instance where $e/t_{unit}$=0.1 (such as one entry for $10), $I_1=I_2$=0.02, and k=1. Three players each provide a $100 entry fee at a=0, a=0.5, and a=1 respectively. The first player (a=0) receives 12 entries (10 standard, 2 bonus), the second player (a=0.5) receives 62 entries (10 standard, 52 bonus), and the third player (a=1) receives 112 entries (10 standard, 102 bonus).

In some embodiments $s_{player}$=0 (i.e. $e/t_{unit}$=0), meaning that only bonus entries are awarded (it is appreciated that in such embodiments the term "bonus" is somewhat redundant, as $E_{player}=b_{player}$). To provide a further numerical example, consider an instance where $e/t_{unit}$=0, $I_1=I_2$=0.02, and k=1. Three players provide $100 entry fees at a=0, a=0.5, and a=1 respectively. The first player (a=0) receives 2 entries, the second player (a=0.5) receives 52 entries, and the third player (a=1) receives 102 entries. It will be recognised that, with k=1, $b_{player}=C_{player}$.

EXAMPLE 2

Total Entries Proportional to Contribution

In some embodiments, the total number of entries awarded is proportional to the player's contribution. That is, the following formula applies:

$E_{player}=k.(C_{player})=k.(I_1(a.t_{player})+I_2((1-a).t_{player})+(1-a).t_{player})$ In such embodiments, the total number of entries that are awarded to a player is again given by the formula $E_{player}=s_{player}+b_{player}$. Therefore:

$b_{player}=k.(C_{player})-s_{player}$

As a numerical example, consider an instance where $e/t_{unit}$=0.1, $I_1=I_2$=0.02, and k=10. Three players each provide $100 in entry fees at a=0, a=0.5, and a=1 respectively. The first player (a=0) receives 20 entries (10 standard, 10 bonus), the second player (a=0.5) receives 530 entries (10 standard, 520 bonus), and the third player (a=1) receives 1030 entries (10 standard, 1020 bonus).

It will be appreciated that if $k.(C_{player}) < s_{player}$, the above formula yields a negative result for $b_{player}$. In some embodiments this is conveniently avoided by appropriate selection of k. However, in other embodiments a philosophical change allows for the concept of negative bonus entries. For example, in one embodiment $s_{player}$ is replaced by $m_{player}$, which defines the maximum number of entries awarded based on a full-risk profile, and $b_{player}$ is replaced by $f_{player}$, which defines a number of those entries that are foregone if the player decides to adopt a more conservative risk profile. That is, $E_{player} = m_{player} - f_{player}$. It will be appreciated that the underlying concept is the same, although the perception shifts from rewarding players who take greater risks to penalising players who take smaller risks.

EXAMPLE 3

Bonus Entries Proportional to Entry Fee Placed at Risk

In some embodiments, the number of bonus entries that are awarded to a player is proportional to the portion of the entry fee that the player puts at risk. That is, the following formula applies:

$$b_{player} = k.((1-a).t_{player})$$

This is generally similar to Example 1, however contribution derived from return on investment does not result in bonus entries. As a result, players that adopt a "no-risk" risk profile receive no bonus entries.

Again, the total number of entries that are awarded to a player is given by the formula $E_{player} = s_{player} + b_{player}$, and the player receives this many standard entries, plus bonus entries proportional to contribution. In a similar vein to Example 1, it is preferred that $k \geq 1$, and in some embodiments $1 \leq k \leq 100$. In further embodiments $0.01 \leq k \leq 100$.

An advantage of this example is that entries are able to be accurately awarded without necessarily having accurate knowledge of $I_1$ or $I_2$. The investment return is nevertheless returned to the prize pool for distribution.

As a numerical example, consider an instance where $e/t_{unit} = 0.1$, $I_1 = I_2 = 0.02$, and $k=1$. Three players provide \$100 entry fees at $a=0$, $a=0.5$, and $a=1$ respectively. The first player ($a=0$) receives 10 entries (10 standard, 0 bonus), the second player ($a=0.5$) receives 60 entries (10 standard, 50 bonus), and the third player ($a=1$) receives 110 entries (10 standard, 100 bonus).

EXAMPLE 4

Bonus Entries Only Awarded where Funds Placed at Risk

In some embodiments, bonus entries are awarded only in the event that funds are placed at risk. That is, a player who adopts a no-risk profile ($a=1$) receives no bonus entries. In disclosing this example, we begin by considering the "real cost" of a no-risk standard entry.

In overview, a no-risk standard entry is advertised at a cost of $t_{unit}/e$, and a player is permitted to purchase a 100% refundable single standard entry by handing over $t_{unit}/e$ in funds. However, the operator does not keep these funds. Rather, the operator invests these funds to derive a net investment return of $I_{1\_}(t_{unit}/e)$ (noting that, for this entry, $a=1$ and $t_{player} = t_{unit}/e$). Therefore, the player is really paying $I_{1\_}(t_{unit}/e)$ for that no-risk standard entry, and the real cost, $R_s$, which in a sense corresponds to an "opportunity cost" from the player's perspective, is given by:

$$R_s = I_1 \frac{t_{unit}}{e}$$

For example, assume that a standard entry has a price of \$2 (that is, $t_{unit}/e = 2$), and further assume that $I^1 = 0.01$. The sale of one standard entry at $a=1$ results in a return on investment return of \$0.02. Therefore, the real cost of a standard entry is \$0.02.

In the present example $R_s$ is used to determine the total number of entries (standard and bonus) that should be awarded to a player that provides an entry fee of $t_{player}$ at a particular risk profile, the rationale being that all entries should cost the same, in terms of relative contribution, as a no-risk standard entry. That is:

$$E_{player} = \frac{C_{player}}{R_s}$$

And, from $E_{player} = s_{player} + b_{player}$, we get:

$$b_{player} = \frac{C_{player}}{R_s} - s_{player}.$$

It will be appreciated that the minimum contribution a player is able to make is where $a=1$, (referred to by $C_{a=1}$, in this instance) that is:

$$C_{a=1} = I_1 t_{player}$$

Therefore, in the event that a player adopts a risk profile of $a=1$, the number of bonus tickets awarded (referred to by $b_{a=1}$, in this instance) is given by:

$$b_{a=1} = \frac{I_1 t_{player}}{R_s} - s_{player}$$

Expanding, this becomes:

$$b_{a=1} = \frac{I_1 t_{player}}{I_1 \frac{t_{unit}}{e}} - \frac{e}{t_{unit}} \cdot t_{player} = 0$$

This confirms that a player who places no funds at risk receives no bonus entries.

The above formula for $b_{player}$ provides an "equity position", this being a position where (at least in theory) risk-averse players and non-risk-averse players are treated equitably. To provide a numerical example, in the case that a standard entry has a price of \$1 (that is, $e/t_{unit} = 1$), and $I_1 = I_2 = 0.02$, the at-risk contribution for a $t_{player}$ of \$1 at $a=1$ is 1.02. Given that entry, $R_s = 0.02$, an entry fee of \$1 at $a=1$ derives 50 bonus entries, and a total of 51 entries.

In some embodiments, k is used to shift away from this equity position, and thereby to affect whether risk-averse or non-risk-averse players are favoured. The general form of this formula is therefore:

$$b_{player} = k \frac{C_{player}}{R_s} - s_{player}$$

Typically, $0.01 \leq k \leq 100$, more preferably $0.01 \leq k \leq 10$ or $0.1 \leq k \leq 10$, and still more preferably $0.5 \leq k \leq 5$. In some embodiments $k=1$, or thereabouts.

Although the above discussion focuses on calculating $R_s$ by consideration of a single standard entry sold at no-risk, it is also possible to achieve the same general objective by considering, as a starting point, an amount of $t_{unit}/e$ invested at $a=0$.

OTHER EXAMPLES

In some embodiments the total number of entries awarded is proportional to the "at-risk contribution". The "at-risk contribution" describes the contribution resulting from at-risk funds (the return on investment on at-risk funds plus the at-risk funds themselves), and is given by the following formula:

$$C_{risk} = I_2((1-a) \cdot t_{player}) + (1-a) \cdot t_{player}$$

As such, the following formula applies:

$$E_{player} = k \cdot C_{risk} = k(I_2((1-a) \cdot t_{player}) + (1-a) \cdot t_{player})$$

Again, the total number of entries that are awarded to a player is given by the formula $E_{player} = s_{player} + b_{player}$, so:

$$B_{player} = k \cdot C_{risk} - s_{player} = k(I_2((1-a) \cdot t_{player}) + (1-a) \cdot t_{player}) - s_{player}$$

As noted above, the number of standard entries awarded is given by $$s_{player} = \frac{e}{t_{unit}} \cdot t_{player}$$

Therefore:

$$B_{player} = k \cdot C_{risk} - s_{player}$$

Expanding this, we get:

$$B_{player} = k(I_2((1-a) \cdot t_{player}) + (1-a) \cdot t_{player}) - \frac{e}{t_{unit}} \cdot t_{player}$$

Or, with some simplification, $$B_{player} = t_{player}\left(k(1-a)(I_2+1) - \frac{e}{t_{unit}}\right)$$

In other embodiments the number of bonus entries awarded is proportional to the at-risk contribution as follows:

$$B_{player} = k \cdot C_{risk}$$

It will be appreciated that the above examples each make use of a relationship in the general form:

$$b_{player} = k\alpha + \beta$$

where α is a is a parameter related to the contribution the player makes to the prize pool (such as a parameter based on one or more of $C_{player}$, $C_{risk}$, $T_{player}$, and $R_s$) and β is an adjustment factor (such as zero or a parameter relying on $S_{player}$). Other embodiments falling within the scope of the present invention make use of alternate relationships based on this general form.

Risk and Cost

As foreshadowed, in some embodiments players are allowed to manage aspects of risk and cost. In such cases, the risk profile selected by a given player affects the quantum of entry fee in exchange for which a predetermined number of entries is allocated. In some such cases, for a first risk profile, a given player is allocated a predetermined number of entries in exchange for a predetermined entry fee, and, for a second risk profile, a given player is allocated the same predetermined number of entries for less than the predetermined entry fee, wherein the first risk profile defines a greater proportion of the entry fee that is refundable compared with the second risk profile.

In a simple example, an operator offers for sale "no-risk entries" (that is, entries for which 100% of the entry fee is refundable) and "full-risk entries" (that is, entries for which 100% of the entry fee is placed at risk). Entries of each type are offered for sale at respective prices. The prices define the quantum of entry fee that is provided in exchange for a predetermined number of entries, which in some cases is a single entry. In this simple example, we assume that the predetermined number is one, such that the prices define the quantum of entry fee that is provided in exchange for a single entry. A single full-risk entry is offered for sale at a lower price than a single no-risk entry. The general underlying rationale is that players who purchase full-risk entries make a greater contribution to a prize pool as compared with players who purchase no-risk entries. Indeed, in some embodiments the only contribution made to the prize pool resulting from a no-risk entry is either zero, or comes from a portion of return on investment derived from investing some or all of the entry fee provided in exchange for that no-risk entry (or other supplementary income).

In more complex embodiments, a larger number of entry types are used, including one or more "hybrid risk entries" (that is, entries corresponding to hybrid risk profiles). Generally speaking, as the proportion of refundable entry fee increases, so does the quantum of entry fee in exchange for which a common predetermined number of entries is allocated.

The manner in which a pricing structure is implemented for entries at varying risk profiles differs between embodiments. One approach is to consider a contribution (net of any taxes, duties, levies, operator charges, and other deductions) made to a prize pool by a full-risk entry, and to apply a constraint such that all entries make the same contribution to the prize pool. For example, consider a situation where full-risk entries are offered for sale at a unit price of $10. Assume, for the sake of example, that an investment return of $1 (corresponding to 10%) is added to the prize pool in respect of a $10 full-risk entry. The contribution of that entry is therefore $11. In determining a pricing structure, a constraint is therefore set such that for any given entry the contribution is $11. In that vein, consider a no-risk entry. The contribution made by a no-risk entry is the portion of investment return that is added to the prize pool. Therefore, the investment return should be $11. Noting that, for this example, the investment return is 10% of the entry fee, no-risk entries are therefore offered for sale at a unit price of $110.

In another embodiment, the contribution made by a full-risk entry is defined to be exclusive of investment return. For example, the contribution of a $10 full-risk entry is therefore $10. Assuming a 10% return on investment is added to the prize pool in respect a no-risk entry, such entries are therefore offered for sale at a unit price of $100.

In some embodiments the pricing structure is varied to apply a predetermined risk/cost favouritism protocol. For example, the divergence in unit costs between no-risk entries and full risk entries is either reduced (advantaging risk-averse players) or increased (disadvantaging risk-averse players) compared to the examples provided above.

There are a number of approaches implemented across various embodiments for determining an appropriate pricing structure for entries at varying risk profiles. Several examples are considered below, and the following parameters are used:

a, the desired refund proportion for a particular player, where $0 \leq a \leq 1$. This is, in essence, indicative of a risk profile. Specifically, a=0 for full-risk and a=1 for no-risk. If a=0.2, then 20% of the entry fee is refundable and 80% of the entry fee is placed at-risk. It will be recognised that (1−a) is the proportion that is placed at risk.

$F_{a=n}$, the entry fee a player provides to obtain a predetermined number of entries at a risk profile defined by a=n, where $0 \leq n \leq 1$. For example, the entry fee for a predetermined number of no-risk entries is provided by $F_{a=1}$, the entry fee for the same predetermined number of full-risk entries is provided by $F_{a=0}$, and the entry fee for the same predetermined number of entries where 50% of the entry fee is placed at risk is provided by $F_{a=0.5}$. To provide a simple example, if no-risk entries are offered for sale at $1 for the predetermined number, then $F_{a=1}$=$1. In some embodiments the predetermined number is one.

$I_1$ and $I_2$, the net rates of return based on supplementary contribution strategies in respect of the refundable portion of the entry fee and non-refundable portion of the entry fee respectively. This is the "net" strategy in the sense that it excludes supplementary contribution that is attributable to operator charges, investment costs, taxes, levies, and the like. It only relates to that portion of supplementary contribution that is designated for addition to the prize pool. For simplicity in the present examples, it is assumed that supplementary contribution takes the form of investment return only. However it will be appreciated that this is for the sake of illustration only, and the present embodiments are by no means intended to be limited to the situation where supplementary contribution is comprised wholly or even partly of investment return. In the present examples, it will be appreciated that $I_1$ (a.$F_{a=n}$) provides the net return on investment on the refundable portion of the entry fee for a single entry at a=n, and likewise $I_2.((1-a).F_{a=n})$ provides the net return on investment on the at-risk portion of the entry fee for a single entry at a=n. To provide a simple example, if the investment strategy $I_1$ provides a 1% net return on investment for funds invested over the course of the "game period", then $I_1$=0.01. It will be appreciated, from the context, that the "game period" is the period of time between the receipt of entry fees and the distribution of prizes and refunds during which the entry fees are subjected to investment. In some embodiments $I_1$=$I_2$, and in some embodiments one of $I_1$ or $I_2$ is zero. It will be appreciated that values of $I_1$ or $I_2$ depend on the selection of appropriate investment and risk-management strategies on the part of a game operator, issues that fall generally beyond the scope of the present disclosure. In the present circumstances, a positive return on investment is assumed. Furthermore, although in the present embodiments linear investment strategies are assumed, in other embodiments non-linear investment strategies are used. A positive return on investment can effectively be guaranteed by the operator if desired, for example through fixed-interest bearing deposits with secure financial institutions, or otherwise hedged against loss. This feature is a particularly advantageous and attractive outcome from the players' perspective by contrast with traditional pari-mutuel type gaming systems, in which the prize pool available for distribution to players collectively is inherently of lesser value than the total amount received from the players collectively as bets.

$C_{a=n}$, the contribution to the prize pool resulting from the sale of the predetermined number of entries in exchange for an entry fee of $F_{a=n}$. $C_{a=n}$ consists, in the present examples, of the return on investment derived in respect of the entry fee plus the portion of the entry fee that is placed at risk. It will be appreciated that the following formula can be used to calculate $C_{a=n}$:

$$C_{a=n}=I_1(n.F_{a=n})+I_2((1-n).F_{a=n})+(1-n).F_{a=n}$$

This simplifies to provide:

$$C_{a=n}=F_{a=n}(I_1(n)+I_2(1-n)+(1-n))$$

k, a proportionality constant. This proportionality constant is used in the sense that if A is proportional to B, then A=k.B. The proportionality constant is varied to affect game characteristics, such as whether risk-averse or non-risk averse (or neither of these) players are favoured. That is, k is a proportionality constant selected such that the pricing structure applies a predetermined risk/chance favouritism protocol.

In some embodiments, the pricing structure is based on equality of contribution. Specifically, a limitation is imposed such that the contribution for each entry is the same, regardless of the risk-profile adopted. That is That is, $C_{a=n}$ remains constant irrespective of n.

First, consider full-risk entries, of which a predetermined number are offered for sale in exchange for $F_{a=0}$. The contribution to the prize pool made by the sale of the predetermined number of full-risk entries is given by the following formula:

$$C_{a=0}=I_2.F_{a=0}+F_{a=0}=F_{a=0}(I_2+1)$$

Noting that $C_{a=0}=C_{a=n}$, we notice:

$$C_{a=n}=F_{a=0}(I_2+1)$$

Substituting back into the general formula for contribution, we get:

$$C_{a=n}=F_{a=0}(I_2+1)=F_{a=n}(I_1(n)+I_2(1-n)+(1-n))$$

Rearranging, this yields:

$$F_{a=n} = \frac{F_{a=0}(I_2 + 1)}{(I_1(n) + I_2(1 - n) + (1 - n))}$$

To provide a simple numerical example, consider a situation where a predetermined number of full-risk entries are offered for sale for $1. That is, $F_{a=0}$=1. For the sake of example, assume that $I_1$=$I_2$=0.01. In this situation, the following relationship applies:

$$F_{a=n} = \frac{(1.01)}{(0.01(n) + 0.01(1 - n) + (1 - n))}$$

Under this pricing structure, the same predetermined number of no-risk entries is offered for sale at:

$$F_{a=1} = \frac{(1.01)}{(0.01)} = 101$$

That is, no-risk entries are offered for sale at $101 each.

By a similar approach, it is possible to offer a predetermined number of entries for sale at a given entry fee and, based on the quantum of that entry fee, determine the risk profile that should be applied. For example, assume a predetermined number of entries are offered for sale in exchange for a $10 entry fee:

$$10 = \frac{(1.01)}{(0.01(n) + 0.01(1-n) + (1-n))}$$

This yields a=n=0.9 (approximately). Therefore, approximately $1 of the $10 entry is refundable, and $9 is placed at risk.

In some embodiments where the pricing structure is based on contribution, k is used to implement a predetermined risk/chance favouritism protocol. In one such embodiment, the following formula applies:

$$F_{a=n} = k \frac{F_{a=0}(I_2 + 1)}{(I_1(n) + I_2(1-n) + (1-n))}$$

Variations to this general formula are applied in other embodiments. For example, in the following formula, the interest return on a full-risk entry is not considered when deriving $F_{a=n}$:

$$F_{a=n} = k \frac{F_{a=0}}{(I_1(n) + I_2(1-n) + (1-n))}$$

Other Risk and Cost variations are implemented in further embodiments.

Risk and Return

In the context of "Risk and Return", the risk profile selected by a player affects one or more characteristics of a prize winnable on the basis of that entry, thereby allowing for a degree of player control over aspects of risk and return. For example, in some embodiments, the one or more characteristics include the value of the prize, and a player is provided with the opportunity to take greater risk for the opportunity to win a more valuable prize. That is, for a first risk profile, a given player is able to win a prize having a first value in exchange for a predetermined entry fee, and, for a second risk profile, a given player is able to win a prize having a second value in exchange for the same predetermined entry fee, wherein the second value is greater then the first value, and wherein the first risk profile defines a greater proportion of the entry fee that is refundable compared with the second risk profile.

In some Risk and Return style embodiments, players are provided with the opportunity to select between two different risk profiles, and by this selection correspondingly play for two different categories of prize. The categories of prize are, for the sake of convenient explanation, described in terms of "major prizes" and "minor prizes". As will be appreciated from the discussion below, the intention is for major prizes to generally be of greater value than minor prizes. However, in some alternative embodiments this is not the case. In some embodiments the major prize includes, as a component, the minor prize. In overview, a player who selects the no-risk profile is allocated one or more no-risk entries in a minor prize draw, with the number of entries being based on the quantum of the refundable entry fee. A player who selects the full-risk profile is allocated one or more full-risk entries in a major prize draw, again with the number of entries being based on the quantum of the refundable entry fee. An example along these lines is provided in FIG. 8B, which schematically shows pool distributions in one embodiment.

Figure 8B:
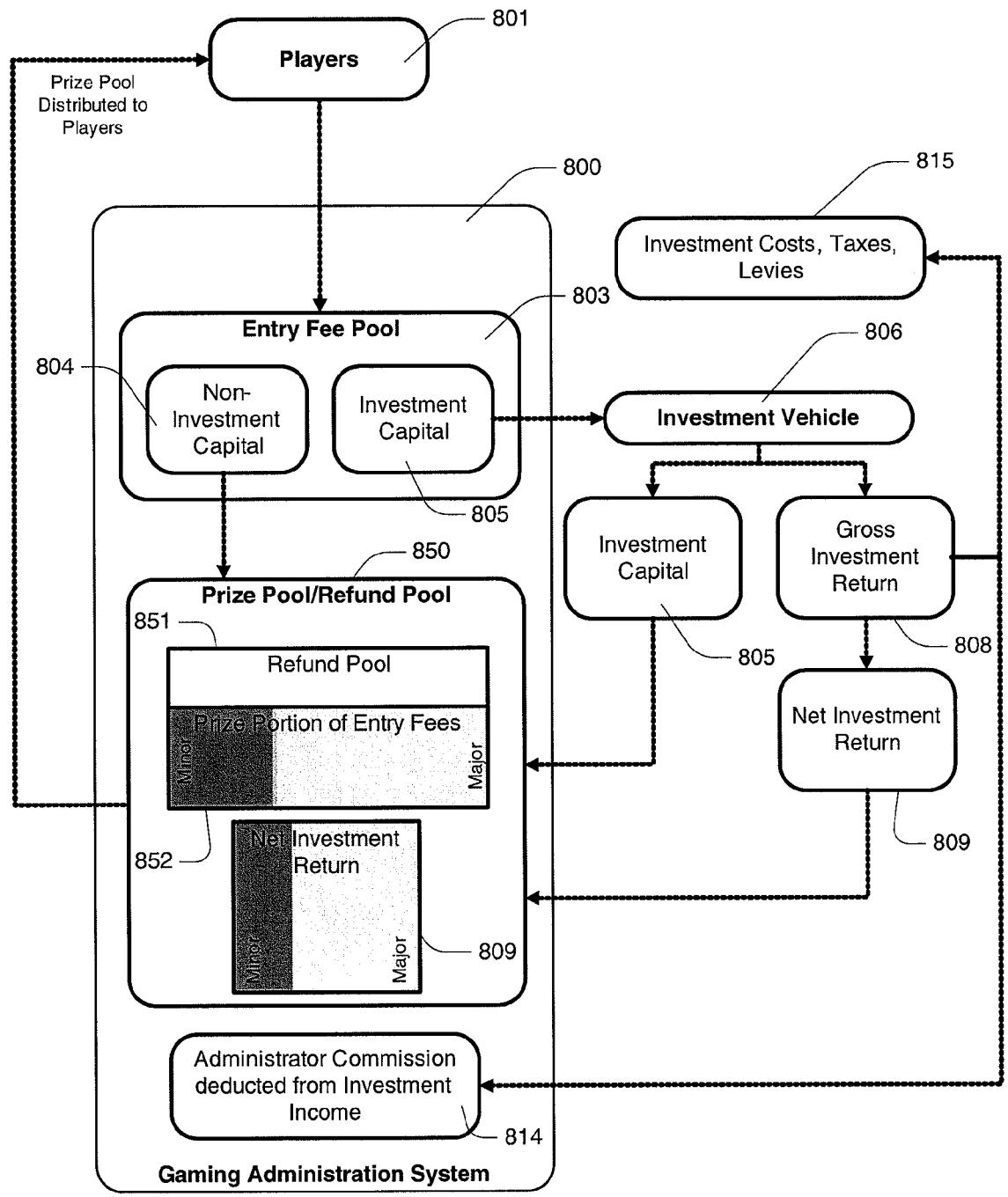
FIG. 8B illustrates a system for providing a gaming activity according to one embodiment.

The example of FIG. 8B illustrates a prize pool/refund pool 850. Pool 850 is used to fund major prizes, minor prizes and refunds, and as such effectively includes a refund pool 851 (for refunding entry fees where appropriate) and a prize pool, the prize pool being defined by the entry fee prize portion 852 and the net investment return 809. Prize portion 852 and investment return 809 together fund the major and minor prizes.

The proportions of the prize pool used to fund major and minor prizes varies between embodiments, and are preferably selected such that a predefined value proportionality relationship exists between the major and minor prizes. As schematically illustrated in FIG. 8, the major and minor prizes are each funded by a proportion of the entry fee prize portion 852 and net investment return 809. The proportions need not be the same, and appropriate proportions are preferably selected to provide a desired value relationship between major and minor prizes. For example, in some cases, the minor prizes are funded solely by a proportion of the investment return 809.

Figure 9:
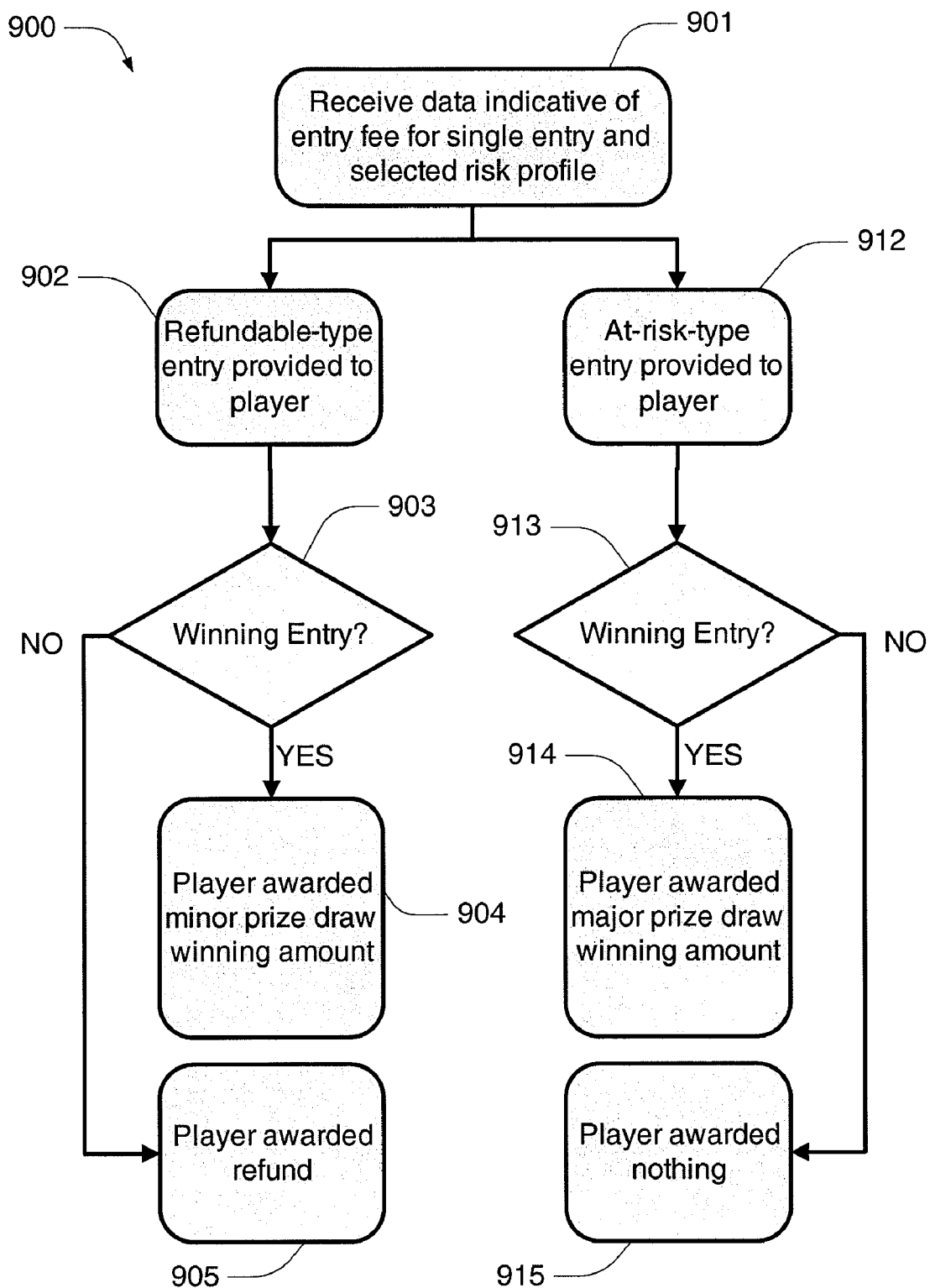
FIG. 9 illustrates a method for providing a gaming activity according to one embodiment.

FIG. 9 schematically illustrates an exemplary method 900 for providing a gaming activity in the context of the system of FIG. 8A, according to one embodiment. In overview, data indicative of an entry fee and a selected risk profile (in this example being either full-risk or no-risk) is received at 901. For the sake of simplicity in the present example, it is assumed that the entry fee is exchanged for a single entry, however in other embodiments a different predetermined number of entries are allocated in exchange for that entry fee. In the event that the full-risk profile is selected, the method progresses to step 902. In the event that the no-risk profile is selected, the method progresses to step 912.

At step 903 it is determined whether the entry is a winning entry. In the event that the entry is a winning entry, the method progresses to 904 where the player is awarded a minor prize draw winning amount. Otherwise, in the event that the entry is not a winning entry, the method progresses to 905 where the player is awarded a refund of his/her entry fee.

At step 913 it is determined whether the entry is a winning entry. In the event that the entry is a winning entry, the method progresses to 914 where the player is awarded a major prize draw winning amount. Otherwise, in the event that the entry is not a winning entry, the method progresses to 915 where the player is awarded nothing.

Although the present example of FIG. 9 assumes only the full-risk and no-risk profiles are used, it will be appreciated that similar embodiments make use of either or both of these risk profiles in conjunction with one or more hybrid risk profiles, or alternatively two or more different hybrid risk profiles.

As illustrated, FIG. 9 implies that the gaming activity includes a first sub-activity for determining winning outcomes in relation to minor prizes, and a second sub-activity for determining winning outcomes in relation major prizes.

However, in some embodiments these sub-activities are in fact the same activity.

Some numerical examples based on the embodiments of FIG. 8B and FIG. 9 will now be considered. These are provided for the sake of convenient explanation only, and should not be regarded as limiting in any way. In particular, it should be appreciated that as with other forms of the invention, an investment return is simply one form of supplementary contribution and in other embodiments, other forms of supplementary contribution are additionally or alternatively used, including operator contributions, third-party contributions derived from the exchange of marketing information, and the like.

In one example, there are two risk profiles, these respectively allowing for no-risk entries (100% refundable) and at-risk-type entries (100% at risk). These entries are offered for sale at a price of $1 each. There is one major prize, and one minor prize. Moreover, the values of the minor and major prizes are directly related to the contributions made to the prize pool by the sale of no-risk entries and at-risk entries respectively. The investment strategy is assumed to provide a 10% return, and 10% of this return is attributable to investment costs and administration fees.

In relation to a given event, 50,000 of each type of entry are sold, resulting in investment capital of $100,000. This is invested to produce an investment return of $10,000, of which $9,000 is provided to the distribution pool ($1,000 is attributed to investment costs and administration fees). The total distribution pool is therefore $109,000. Of this, $50,000 is to be refunded in relation to no-risk entries, and is therefore attributable to the refund pool. The remaining $59,000 is attributable to the prize pool. It will be appreciated that, of this prize pool, the contribution from no-risk entries totals $4,500 (half of the investment-based prize portion), and the contribution from at-risk-type entries totals $54,500 (half of the investment-based prize portion plus the at-risk entry fees). It follows that each no-risk entry has a 1/50,000 relative probability of winning $4,500, and each at-risk entry has a 1/50,000 relative probability of winning $54,500. In another variation, in which all entries are combined into a single draw but the prize eligibility criteria in the event of a winning outcome are linked to the respective risk profiles, each no-risk entry has a 1/100,000 relative probability of winning $4,500, and each at-risk entry has a 1/100,000 relative probability of winning $54,500.

In another example, no-risk entries and at-risk-type entries are again offered for sale at a price of $1 each. Again, there is one major prize and one minor prize, and the investment strategy is assumed to provide a 10% return, of which 90% is added to the distribution pool and 10% is attributable to investment costs and administration fees. However, in this example, the minor and major prize are not related to relative contributions, and rather are defined as follows:

The minor prize has a value equal to half of the net investment income added to the distribution pool. That is, the minor prize equates to 45% of the net investment income.

The major prize has a value equal to half of the net investment income added to the distribution pool, plus the value of the at-risk entry fees.

In relation to a given event, 90,000 no-risk entries are sold, and 10,000 at-risk-type entries are sold, resulting in investment capital of $100,000. This is invested to produce an investment return of $10,000, of which a net amount of $9,000 is provided to the distribution pool. The total distribution pool is therefore $109,000, of which $50,000 is attributable to the refund pool, and $59,000 attributable to the prize pool. It follows that each no-risk entry has a 1/90,000 relative probability of winning the minor prize ($4,500), and each at-risk entry has a 1/10,000 relative probability of winning the major prize ($54,500). In another variation, in which all entries are combined into a single draw but the prize eligibility criteria in the event of a winning outcome are linked to the respective risk profiles, each no-risk entry has a 1/100,000 relative probability of winning $4,500, and each at-risk entry has a 1/100,000 relative probability of winning $54,500.

In another example, no-risk entries and at-risk-type entries are again offered for sale at a price of $1 each. Again, there is one major prize and one minor prize, and the investment strategy is assumed to provide a 10% return, of which 90% is added to the distribution pool and 10% is attributable to investment costs and administration fees. In this example, the minor and major prizes are defined as follows:

The minor prize has a value equal to 25% of prize pool.

The major prize has a value equal to 75% of prize pool.

In relation to a given event, 90,000 no-risk entries are sold, and 10,000 at-risk-type entries are sold, resulting in investment capital of $100,000. This is invested to produce an investment return of $10,000, of which $9,000 is provided to the distribution pool. The total distribution pool is therefore $109,000, of which $50,000 is attributable to the refund pool, and $59,000 attributable to the prize pool. Each no-risk entry has a 1/90,000 probability of winning the minor prize ($14,750), and each at-risk-type entry has a 1/10,000 probability of winning the major prize ($44,250).

In another embodiment the minor prize has a value equal to 10% of prize pool, and the major prize has a value equal to 90% of prize pool. Other percentages are used on further embodiments, with the general objective being to provide players at different risk profiles with appropriate incentives, linked to the potential returns in the event of winning outcomes. It will be appreciated that this, to some extent, is a marketing exercise.

Although the above examples deal with a single major prize and a single minor prize, in other embodiments there are a numerous tiered major prizes and/or minor prizes. For example, one embodiment provides tiered first, second and third major prizes, and tiered first, second and third minor prizes. Although the intention is for major prizes to generally be of greater value than minor prizes, in embodiments where there are multiple value-tiered major and minor prizes, it is not a necessity that every major prize is greater in value than every minor prize. Moreover, in the case of non-monetary payouts, different players may place different subjective values on different types of prizes.

Figure 10:
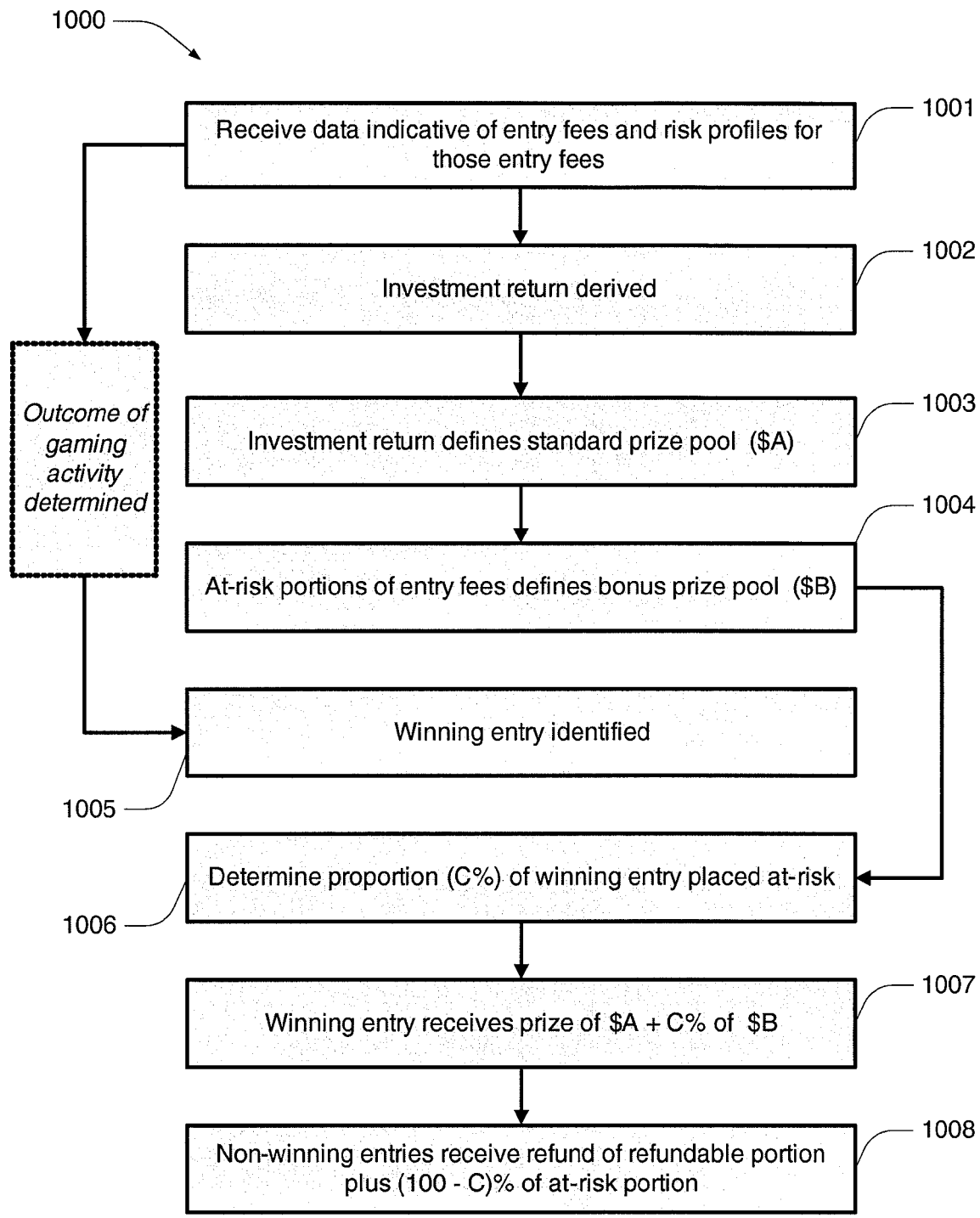
FIG. 10 illustrates a method for providing a gaming activity according to one embodiment.

Although the Risk and Return examples considered above assume that only two risk profiles are available, some embodiments make additional risk profiles available. Indeed, in some embodiments the maximum value of prize that may be won is directly related to the proportion of an entry fee that is placed at risk, which in turn may be subject to a high degree of selectivity on the part of operators and/or players. One such embodiment is provided by method 1000 of FIG. 10, discussed below.

In the context of method 1000, entries are offered for sale at a set per-unit entry fee, and a player selects a risk profile defining from, at the lower end of the risk spectrum, 0% at-risk (no risk, with full refund in the case of a non-win event) to, at the upper end of the risk spectrum, 100% at-risk (full risk, with no refund in the case of a no-win event). Data indicative of the entry fees and selected risk profiles is received at step 1001. An investment return is derived at step 1002, noting that in other embodiments an alternate form of supplementary income is used in conjunction with or as an alternative to investment income.

The prize pool is notionally structured to include a standard prize pool and a bonus prize pool. In this particular embodiment, the investment return is used to define a standard prize pool ($A) at step 1003, and the at-risk portions of entry fees are used to define a bonus prize pool ($B) at step 1004. In some embodiments alternative approaches are used for defining these prize pools. For example, in one embodiment the bonus prize pool is defined by less than 100% of the at-risk entry fees.

Upon completion of the gaming activity, a single winning entry is identified at step 1005. The player responsible for the winning entry is awarded a prize at 1006. In particular, the prize comprises the whole of the standard prize pool, plus a proportion of the bonus prize pool corresponding to the proportion of the entry fee placed at risk. For example, in the event that a player places half of his/her entry fee at risk and ultimately wins, that player is awarded the whole standard prize pool, plus half of the bonus prize pool. In this case, each entry has the same relative probability of winning a prize regardless of the risk profile adopted, and only the value of the prize changes. That is, an entry placed on the basis of a 100% refundable risk profile has the same relative probability of winning a prize as an entry placed on the basis of a 0% refundable risk profile, or any other profile for that matter.

It will be appreciated that, unless the winning entry was placed subject to 100% risk of the entry fee, there will be a residual amount in the bonus prize pool following the distribution of the prize. In the present example, this residual amount is distributed among the players in accordance with their contribution to the bonus prize pool at step 1008. In particular, each entry is refunded by:

The refundable portion of the entry fee.

A proportion of the at-risk portion of the entry fee. This proportion is the inverse of the proportion of entry fee placed at risk in respect of the winning entry. That is, if the winning entry was placed subject to 0% risk, the at-risk portions of all entry fees are fully refunded. On the other hand, if the winning entry was placed subject to 100% risk, there will be no refund of at-risk portions of any entry fees. In the event that the winning entry was placed subject to 60% risk, there will a 40% refund of at-risk portions of the entry fees, and so on.

A numerical example of such an embodiment will now be considered. In this example, entries are offered for sale at an entry fee of $100 each. The standard prize pool is to have a value equal to the prize portion of investment income, and the bonus prize pool is to have a value equal to non-refundable portions of all entry fees. Furthermore, any residual portion of the bonus prize pool is to be distributed among the players in accordance with their contribution to the bonus prize pool (or contributions notionally made on their behalf). The investment strategy is assumed to provide a 10% return, of which 90% defines the standard prize pool and 10% is attributable to investment costs and administration fees.

In relation to a given event, 1,000 entries are sold, resulting in investment capital of $100,000. $10,000 of investment income is generated, resulting in a standard prize pool of $9,000. For the sake of example, the entries are placed in accordance with the following risk profiles:

500 entries are sold on the basis of 0% at-risk (100% refundable). These make no contribution to the bonus prize pool.

200 entries are sold on the basis of 10% at-risk (90% refundable). These make a $2,000 contribution to the bonus prize pool.

200 entries are sold on the basis of 50% at-risk (50% refundable). These make a $10,000 contribution to the bonus prize pool.

50 entries are sold on the basis of 80% at-risk (20% refundable). These make a $4,000 contribution to the bonus prize pool.

50 entries are sold on the basis of 100% at-risk (0% refundable). These make a $5,000 contribution to the bonus prize pool.

The bonus prize pool therefore totals $21,000.

For the sake of example, assume that the winning entry was placed on the basis of 10% at-risk (90% refundable). The player therefore wins the $9,000 standard prize pool, plus 10% of the bonus prize pool—$2,100. The total prize therefore amounts to $11,100.

In this example, there is a residual $18,900 in the bonus prize pool, and this is distributed as refunds among the entries in accordance with the relative contributions of those entries. It will be appreciated that the prize took 10% of the bonus prize pool, and as such 90% of the at-risk portions of the entry fees are refunded. Specifically:

$9 is refunded for each entry sold on the basis of 10% at-risk (90% refundable).

$45 is refunded for each entry sold on the basis of 50% at-risk (50% refundable).

$72 is refunded for each entry sold on the basis of 80% at-risk (20% refundable).

$90 is refunded for each entry sold on the basis of 100% at-risk (0% refundable).

It will be appreciated that, by this approach, players may receive a refund for monies placed at risk. The probability of receiving a refund, and the level of refund, depend on risk selections made by players across the game.

Although in the above example a residual amount in the bonus prize pool is refunded to the players, in other embodiments this residual amount rolls over as a jackpot, or is taken by the gaming administrator, or is distributed to one or more of the players as one or more supplementary prizes.

Other techniques for apportionment of the prize pool between a standard and bonus prize pool are used in further embodiments. For example, in one embodiment the standard prize pool and bonus prize pool are maintained in a predefined ratio.

Combination Approaches

As foreshadowed, this category combines two or more of Risk and Chance, Risk and Cost and Risk and Return. Several examples of combination approaches are considered below.

In some embodiments, for a first risk profile, a given player is allocated a predetermined number of entries in exchange for a predetermined entry fee, and, for a second risk profile, a given player is allocated the same predetermined number of entries for less than the predetermined entry fee, wherein the first risk profile defines a greater proportion of the entry fee that is refundable compared with the second risk profile. For the first risk profile, a given player is able to win a prize having a first value in exchange for a predetermined entry fee, and, for a second risk profile, a given player is able to win a prize having a second value in exchange for the same predetermined entry fee. For example, in one embodiment "bonus entries" compete for a different prize to standard entries.

In some embodiments, for a first risk profile, a given player is allocated a predetermined number of entries in exchange for a predetermined entry fee, and, for a second risk profile, a given player is allocated the same predetermined number of entries for less than the predetermined entry fee, wherein the first risk profile defines a greater proportion of the entry fee that is refundable compared with the second risk profile. For the first risk profile, a given player is allocated a predetermined number of entries in exchange for the predetermined entry fee, and, for the second risk profile, a given player is allocated an increased number of entries, and therefore chances, for the same predetermined entry fee.

In some embodiments, for a first risk profile, a given player is allocated a predetermined number of entries in exchange for a predetermined entry fee, and, for a second risk profile, a given player is allocated the same predetermined number of entries for less than the predetermined entry fee, wherein the first risk profile defines a greater proportion of the entry fee that is refundable compared with the second risk profile. For the first risk profile, a given player is able to win a prize having a first value in exchange for a predetermined entry fee, and, for a second risk profile, a given player is able to win a prize having a second value in exchange for the same predetermined entry fee.

In some embodiments, for a first risk profile, a given player is allocated a predetermined number of entries in exchange for a predetermined entry fee, and, for a second risk profile, a given player is allocated the same predetermined number of entries for less than the predetermined entry fee, wherein the first risk profile defines a greater proportion of the entry fee that is refundable compared with the second risk profile. For the first risk profile, a given player is able to win a prize having a first value in exchange for a predetermined entry fee, and, for a second risk profile, a given player is able to win a prize having a second value in exchange for the same predetermined entry fee. For the first risk profile, a given player is allocated a predetermined number of entries in exchange for a predetermined entry fee, and, for the second risk profile, a given player is allocated an increased number of entries for the same predetermined entry fee.

It will be appreciated that there is a wide range of possible ways in which such combinations of approaches may be implemented across various embodiments.

Refundable Hedges

In some embodiments, the notion of risk profiles is used to provide a gaming activity wherein secondary hedge entries are either physically or notionally linked or "stapled" to conventional primary entries, thereby to provide players with more advantageous prospects of winnings or returns, without necessarily taking on additional risk. In overview, as in embodiments considered above, the player provides an entry fee and selects a risk profile in relation to that entry fee, the risk profile defining a proportion of the entry fee that is refundable on the basis of predetermined refund criteria and a complementary proportion of the entry fee that is placed at risk. The general notion is that, in the present context, the at-risk proportion of the entry fee is exchanged for a primary entry, and the refundable proportion of the entry fee is exchanged for one or more secondary entries that are "hedged" against the primary entry. By the term "hedged", what is meant is that, if the primary entry is not identified as a winning entry, the secondary entries are eligible to be identified as winning entries. Conversely, if the primary entry is identified as being a winning entry, the secondary entries are excluded from being identified as winning entries. This is sometimes referred to as a "contrary bet" in the sense of covering one, some or all outcomes not covered by the primary entry or bet. That is, win-events in respect of a primary entry and the one or more secondary entries are mutually exclusive. There are two main categories of hedge considered herein:

- A "partial hedge" whereby, in the case that the primary entry is identified as a winning entry, one or more of the secondary entries might be identified as a winning entry, however there is no guarantee that one or more of the secondary entries will be identified as a winning entry.
- A "full hedge" whereby, in the case that the primary entry is identified as a winning entry, one or more of the secondary entries will be identified as a winning entry. That is, the player is guaranteed to have at least one of his/her entries identified as a winning entry.

In some embodiments, only one of these categories is considered. However, it should be understood that a gaming operator may make either or both available.

The concept of refundable hedges is perhaps more conveniently considered against a "fixed-odds" backdrop, and will be considered below in this regard. However, it will be appreciated that other embodiments are by no means limited to fixed-odds categories of gaming activities, and that the general concepts are applicable to a wide range of gaming activities in a far broader context.

In a conventional fixed-odds gaming activity, the gaming operator defines a plurality of event outcomes, and players bet on these outcomes. Traditionally, the gaming operator sets a "payout ratio" (commonly referred to as "odds") for each outcome. For example, in the context of a sporting event where a first team, Team A, competes with a second team, Team B, the operator defines Team A winning as one event outcome, and Team B winning as another event outcome. In some cases a draw is defined as a further possible outcome. Players are offered a payout ratio for each event outcome. For example, a given player is offered 5:1 for Team A winning. A player who places a monetary bet on that outcome receives, in the case that Team A wins, a fivefold multiple of the placed monetary bet (i.e. a $5 return for each $1 placed).

In the context of risk profiles, the primary entry is essentially a conventional fixed-odds bet (which is fully-at risk). That is, an entry fee is placed on the basis of a risk profile and an event outcome, both of which are selected by the player. The event outcome is associated with a payout ratio, predetermined by the gaming operator. In the event that the selected event outcome is a winning event outcome, a primary prize is awarded to the player based on the proportion of the entry fee that is placed at risk and the payout ratio.

The refundable component of the entry fee is exchanged for one or more secondary entries, which are either fully or partially hedged entries. In the case that a secondary entry is identified as a winning entry a secondary prize is awarded to the player. In the present embodiment, the secondary prizes are pari-mutuel in nature. That is, the secondary prizes are awarded by distribution of a prize pool amongst the winning players irrespective of "payout ratios" or the like. Noting that the one or more secondary entries are allocated in exchange for the refundable component of the entry fee, it will be appreciated that, in the case that a secondary entry is not identified as a winning entry, the player receives a refund of the entry fee attributable to that secondary entry.

The following table sets out some possible results of a gaming activity according to one embodiment with refundable hedges.

|  | No Hedge | Partial Hedge | Full Hedge |
| --- | --- | --- | --- |
| Primary Entry Win/Secondary Entry Loss | Win primary prize (No refundable proportion of entry fee in this case). | Win primary prize; Receive refund of refundable proportion of entry fee. | Win primary prize; Receive refund of refundable proportion of entry fee. |
| Primary Entry Loss/Secondary Entry Win | No secondary entry, therefore receive nothing. | Win secondary prize. | Win secondary prize. |
| Primary Entry Loss/Secondary Entry Loss | No secondary entry, therefore receive nothing. | Receive refund of refundable proportion of entry fee. | Not Possible. |

The number of secondary entries allocated varies between embodiments. In some embodiments the number is predetermined and unrelated to the quantum of the refundable proportion of the entry fee. In other embodiments, the number of secondary entries is proportional to the quantum of the refundable proportion of the entry fee.

Secondary prizes are, at least in part, funded by a secondary prize pool. In particular embodiments, the general method preferably includes deriving supplementary income, adding an amount having a value corresponding to at least a proportion of the supplementary income to a secondary prize pool, refunding to each player the proportion of the entry fee that is refundable, and distributing the secondary prize pool, in accordance with a predetermined prize distribution protocol, amongst the players to whom winning secondary entries were allocated. In some embodiments, deriving supplementary income includes subjecting at least a proportion of the entry fees to an investment procedure to generate supplementary income in the form of an investment return. It should be appreciated, however, that in other embodiments, the supplementary income may be derived from third parties, or from the operator, on a basis related more to marketing interactions or other factors, than to investment procedures per se. In yet other embodiments, there is no supplementary income as such, and different prize pools are simply created from a proportion of the entry fees.

It is assumed that each secondary prize is, for a given player, greater in value than the refundable proportion of the entry fee for that player. In some embodiments this is practically achieved by providing the requisite refunds to all eligible players, and then distributing some or all of the net supplementary income amongst players having winning secondary entries. In some embodiments, there is a relationship between a player's contribution to the net supplementary income and the value of secondary prize winnable by that player.

A significant result of hedging, as described herein is that, in hindsight, a player can receive better odds for his/her level of liability by providing a larger entry fee. The general notion is that the payout ratio is applied to the at-risk proportion of entry fee, however the maximum liability for a give player in some cases is less than the at-risk proportion of entry fee. In particular, for some embodiments, in the case of a non-winning primary entry, the player receives a secondary prize that is greater than the refundable proportion of his/her entry fee.

This significant result is, in some embodiments, leveraged to offer players improved payout ratios or odds, in exchange for a greater value of entry fees. In some cases, this requires configuring the gaming activity such that the value of secondary prizes is able to be calculated in advance. For example, in one embodiment, the value of a secondary prize winnable by a player is equal to an anticipated contribution to the supplementary income, plus a refund of the refundable proportion of the entry.

In some embodiments where players are offered improved payout ratios in exchange for a greater value of entry fees on the basis of a full hedge, the players select a "maximum liability", which corresponds to the maximum amount they are prepared to "lose" (profit or loss are calculated by subtracting entry fee from return, a negative result indicating a loss). This maximum liability is less than "the proportion of the entry fee that is placed at risk" under risk profiles as discussed herein—in the event the primary entry does not win, the player receives the refundable proportion of entry fee plus the anticipated contribution from that entry fee. However, the payout ratio is nevertheless applied to the proportion (in quantum) of the entry fee that is placed at risk. As such, by increasing the total entry fee, it is possible to offer an improved payout ratio for the same maximum liability.

As a numerical example, assume that a base payout ratio of 5:1 is defined for an event outcome. Further assume that the anticipated contribution to the supplementary income is 10% of the total entry fee provided by a given player. For the sake of example, a player wishes to enter based on a maximum liability of $10.

If the player provides an entry fee of $10, in the case that the bet loses, the player receives nothing (the player loses $10, the player's bet amount/maximum liability). There is no secondary prize, and no secondary entries were allocated. The player has therefore exchanged $10 for a primary entry, the at-risk proportion of entry fees being $10 (100%), and the player stands to win $50 if the primary entry is a winning entry, based on the 5:1 payout ratio.

If the player provides an entry fee of $100 on the basis of the same maximum liability criterion, in the case that the bet loses, the player receives $90 (again, the player loses $10, the player's bet amount/maximum liability). This $90 includes $10 of supplementary income, based on the 10% anticipated contribution. Therefore, it is readily deduced that $80 of the entry fee was notionally exchanged for a secondary entry. It follows that $20 was exchanged for a primary entry, and so the at-risk proportion of entry fees is $20. This $20 is subjected to the 5:1 payout ratio in the case of a winning outcome for the primary entry, and player can therefore win $100 on the basis of the primary entry.

Pursuant to this methodology, the following options may be presented to the player:

Bet $10 on the basis of a $10 entry fee. A payout ratio of 5:1 is offered. Maximum win is $50. Maximum loss is $10.

This will be recognised as a traditional fixed odds bet.

Bet $10 on the basis of a $100 entry fee. A payout ratio of 10:1 is offered. Maximum win is $100. Maximum loss is $10.

It will be appreciated that, by configuring a computing system to operate on the logic discussed above, it is possible to offer a player a substantially unlimited number of payout ratios for a given event and bet amount, simply by requiring a predetermined level of total entry fee.

In such embodiments, the player is often not made aware of the secondary entry, which operates as a background mechanism. However, it will be appreciated that the manner in which secondary entries are made known to players is predominately an exercise in marketing.

In alternative embodiments, for a given quantum of entry fee, a player may be offered an enhanced payout ratio, or improved odds, relative to other players providing the same quantum of entry fee, in return for placing (and as an incentive to place) a greater proportion of that entry fee at risk.

Hardware/Software Implementation

Although much of the above disclosure is predominately focussed on embodiments taking the form of methods, it will be appreciated that various embodiments of the present invention are technically implemented using various combinations of hardware and software. Some of these are considered below.

Figure 11A:
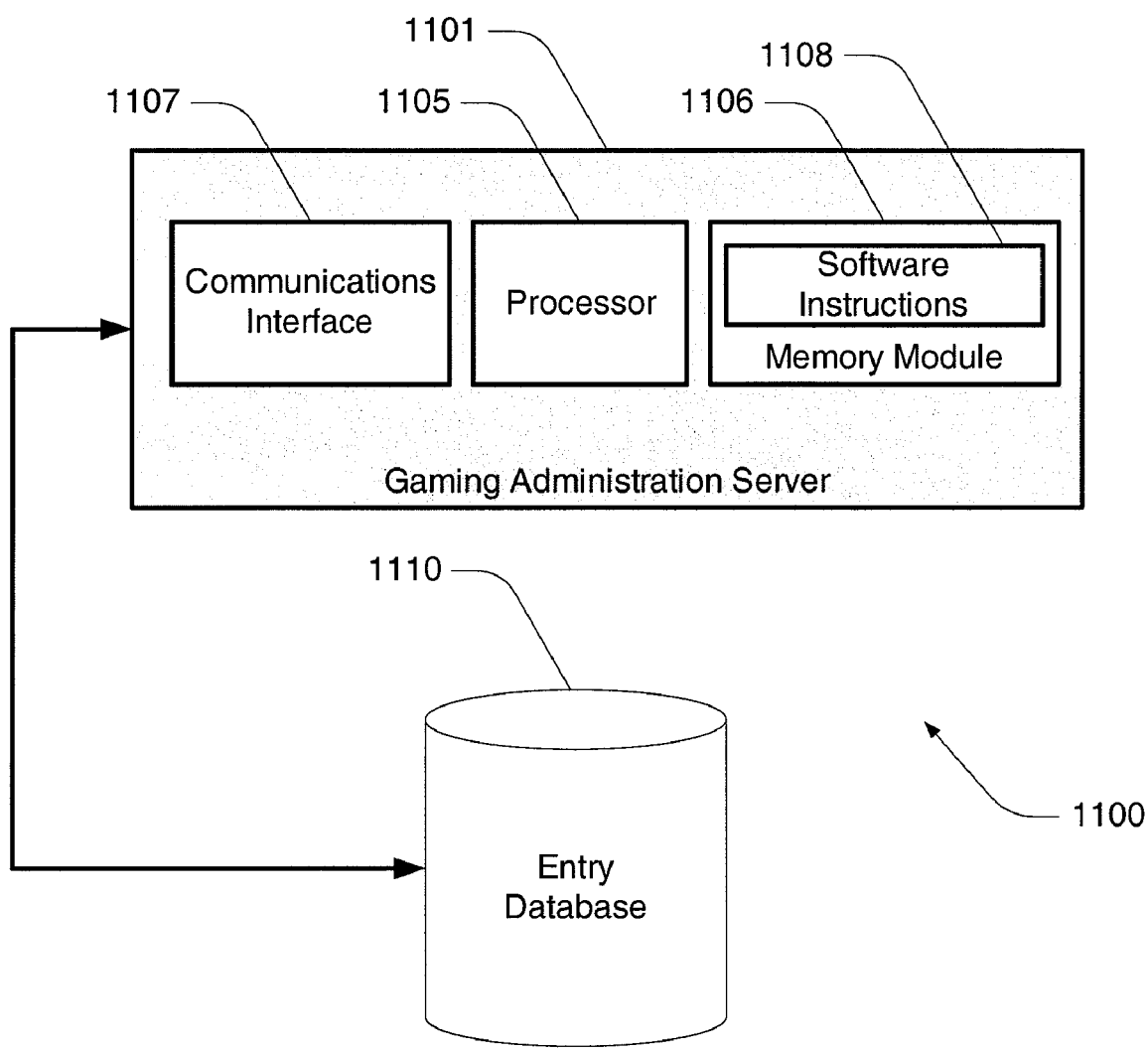
FIG. 11A illustrates system for providing a gaming activity according to one embodiment.

FIG. 11A illustrates a system for providing a gaming activity, in the form of system 1100. System 1100 includes a gaming administration server 1101. This gaming administration server includes a processor 1105 coupled to a memory module 1106 and a communications interface 1107.

Memory module 1106 is configured for maintaining software instructions 1106 which, when executed on processor 1105, allow server 1101 to perform various methods, including but not limited to one or more of the methods described herein.

The term "communications interface" or "interface" should be read broadly to include any component or group of components including one or more of a network interface (such as an Ethernet interface, or other wired/wireless network interface), modem, other interfaces configured to allow communication between server 1101 and another processing platform, ports (such as serial or parallel ports) for receiving data from or providing data to input/output devices such as keyboards, scanners and printers.

As illustrated, server 1101 is coupled to an entry database 1110. Although, in the context of the present illustrations, this database is shown as being a single discrete component, in alternate embodiments it is defined by a plurality of distributed components, optionally including memory modules of one or more servers such as server 1101.

Figure 11B:
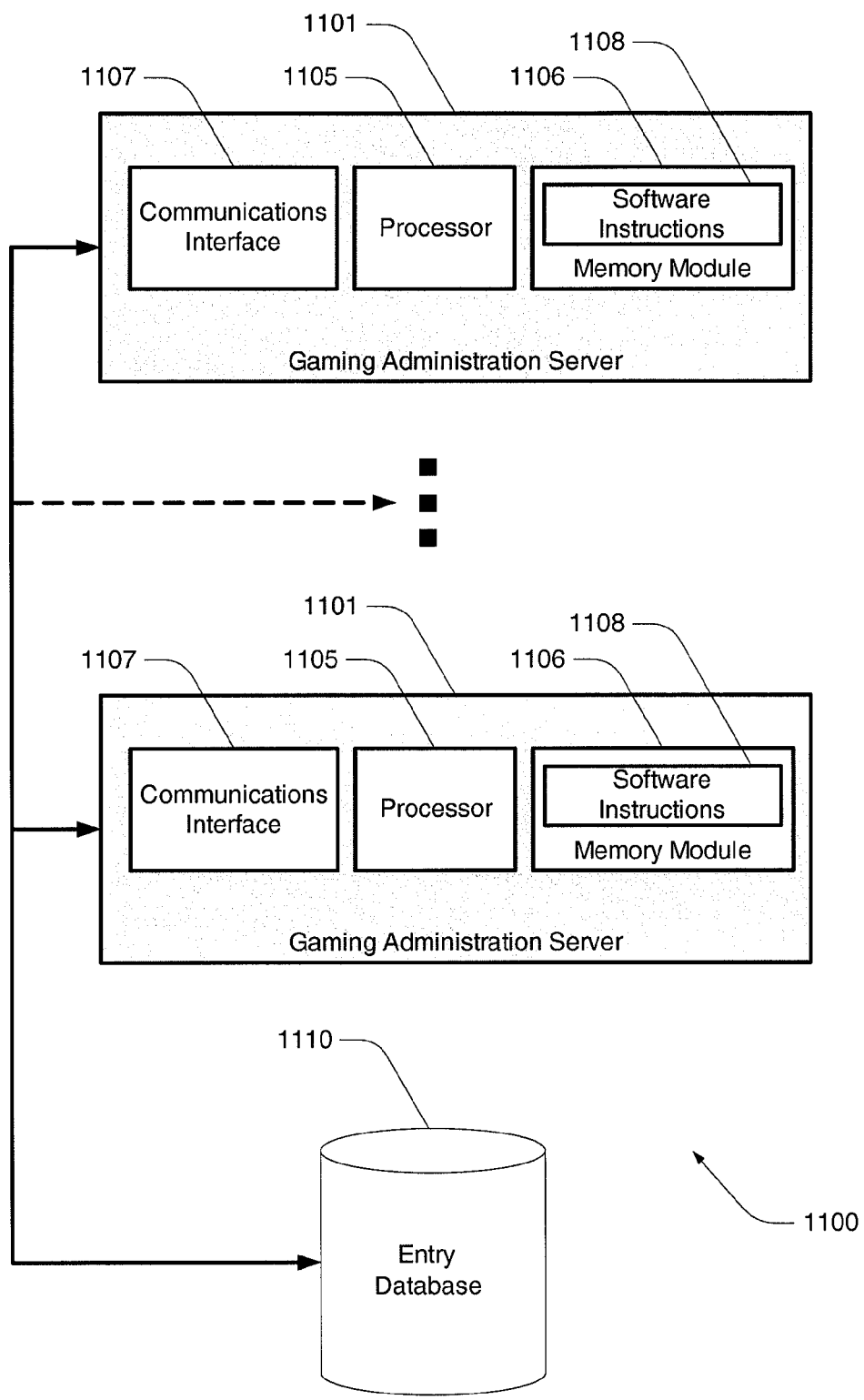
FIG. 11B illustrates a system for providing a gaming activity according to one embodiment.

In some embodiments, such as that of FIG. 11B, a plurality of like or similar servers 1101 are coupled to a common database 1110. For example, servers 1101 are provided at distributed locations, with a database 1110 provided at a centralised location.

Database 1110 maintains data indicative of entry transactions, which includes, in various embodiments, one or more of the following aspects of data:

Data indicative of a received entry fee. This includes data indicative of the value of entry fee, and optionally data indicative of a location at which funds corresponding to that entry fee are stored (for example, a bank account), and/or data indicative of a manner of payment used to provide the entry fee.

Data indicative of a risk profile associated with the entry fee. As discussed above, at least in some embodiments, an entry fee is provided by a player subject to the selection of a risk profile, which defines proportions of the entry fee that are refundable and placed at risk.

Data indicative of a player who provided the entry fee. In some embodiments, a player is assigned an identifier, which is used by that player for gaming related transactions. For example, in one embodiment this identifier is carried by a loyalty card, for example in the form of a barcode or RFID tag.

Data indicative of one or more entries allocated to the player in exchange for the entry fee. In some embodiments each entry is provided with a unique entry identifier (which is optionally used for winning entry determinations in the context of a lottery or raffle type game). In some embodiments the one or more entries allocated to a player in respect of a given entry fee are provided a common identifier—for example, the player is provided a single "ticket", which may be virtual or physical, carrying a ticket identifier. Entry identifiers and/or ticket identifiers are later used by the relevant players to allow the redemption of prizes and/or refunds, as discussed further below.

Data indicative of a particular gaming activity to which the entry fee and/or allocated entries relate.

Various aspects of this data are received via interface 1107 and/or defined by server 1101 (for instance, in response to data received via interface 1107). In some embodiments the allocation of entries occurs at server 1101, whilst in other embodiments the allocation of entries occurs at a remote location, for example a retailer terminal at a location where entries are sold to players.

Figure 11C:
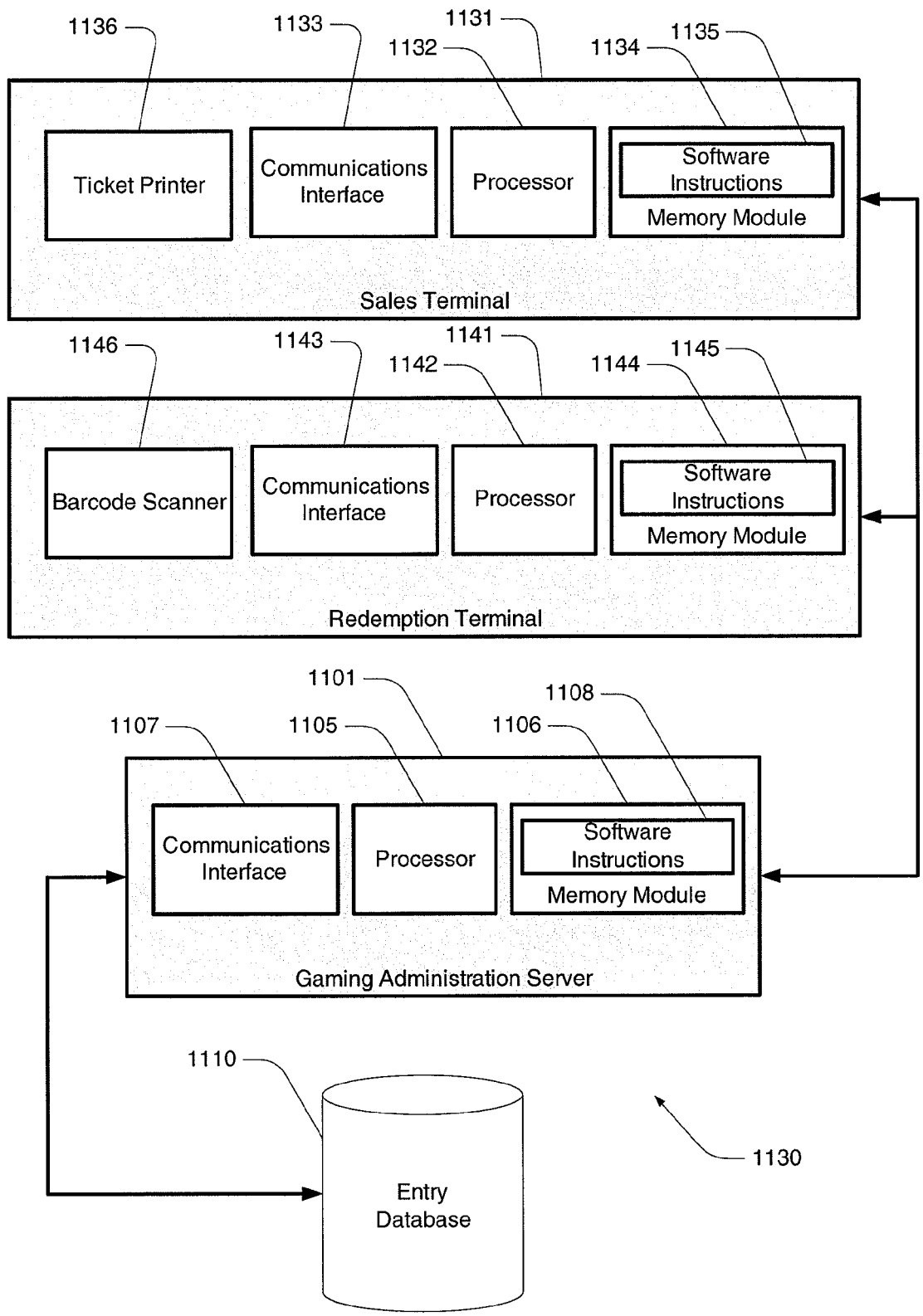
FIG. 11C illustrates a system for providing a gaming activity according to one embodiment.

FIG. 11C illustrates an embodiment where a server 1101 is coupled to a sales terminal 1131 and redemption terminal 1141. In some embodiments these are integrated into a single terminal.

As illustrated, terminal 1131 includes a processor 1132, communications interface 1133 and memory module 1134 (which maintains software instructions 1135). A ticket printer 1136 is also coupled to processor 1132.

In overview, a player interacts with terminal 1132 to purchase one or more entries in relation to a gaming activity. In some embodiments this is a direct interaction, whereas in other embodiments it is an indirect interaction whereby a terminal operator interacts with terminal 1132 on behalf of the player. The player provides information regarding the gaming activity in which entries are to be purchased, risk profiles, and so on. The player also provides an entry fee, optionally in the form of cash or electronic/card payment means. The entry fee is directly or indirectly transferred to an account stipulated by the gaming operator either immediately or at the end of a specified period (daily, for instance). Once the entry fee has been provided, the player is allocated one or more entries on the basis of the quantum of entry fee and risk profile selected. The allocation of entries is, in some cases, based on a process performed at terminal 1131 and, in other cases, based on a process performed at terminal 1101 based on data provided by terminal 1131. In the present example, data indicative of the entries is printed to a ticket (which might include a receipt) via printer 1136. In some embodiments this ticket carries a ticket identifier and/or one or more entry identifiers corresponding to the allocated entries. In the present example, this information is derivable from a barcode (such as a 2-dimensional or 3-dimensional barcode) printed on the ticket.

As illustrated, terminal 1141 includes a processor 1142, communications interface 1143 and memory module 1144 (which maintains software instructions 1145). A barcode scanner 1146 is also coupled to processor 1142. In overview, to redeem one or more entries, a player presents a ticket carrying a barcode from which the relevant identifier (or identifiers) is derivable by scanner 1146. Scanner 1146 then performs a query process to determine whether the read barcode is indicative of any winning entries. This, in some cases, requires communications with server 1101. Prizes and/or refunds are provided to the player where appropriate. In some cases these are provided by cash, and in some cases by way of a further ticket or other indication of entitlement that is redeemable for cash or cheque either upon presentation, or at some predetermined future point in time. In further cases, the player nominates a location to which the prize/refund should be delivered, such as a physical address or bank account. In some cases the player arranges for the prize/refund to be credited to a specified bank/credit card account.

In some embodiments, redemption is automated. For example, a player is invited to create a user account, this account including details of a bank account to which prizes/refunds are to be credited, and this crediting occurs automatically.

In some embodiments some or all of the general functionalities of either or both of terminal 1131 and 1141 are made available to a player via a personal computing platform, such as a desktop computer, laptop computer, cellular telephone, PDA, gaming console, or other platform. In some such embodiments, players access a website over the Internet to purchase entries, for example by selecting risk profiles via a selection interface provided by a web-page viewable through a web-browser application, and providing entry fees by way of an online payment procedure. In other embodiments, players download proprietary software as an alterative to a browser-based approach.

In some embodiments, entries are sold both via online approaches (for example via a website accessible over the Internet) and in-store approaches (for example at a retail location having a sales terminal and/or redemption terminal). In some cases, different rules apply for entries sold online as opposed to entries sold in-store. For example, in one embodiment, in-store entries are sold on the basis of a first minimum spend level, whist online entries are sold on the basis of a second minimum spend level which is lower than the first level. In some cases in-store entries can only be purchased in exchange for entry fees that are integral multiples of the minimum spend level or another predefined value, although such restrictions do not necessarily apply online.

Figure 12A:
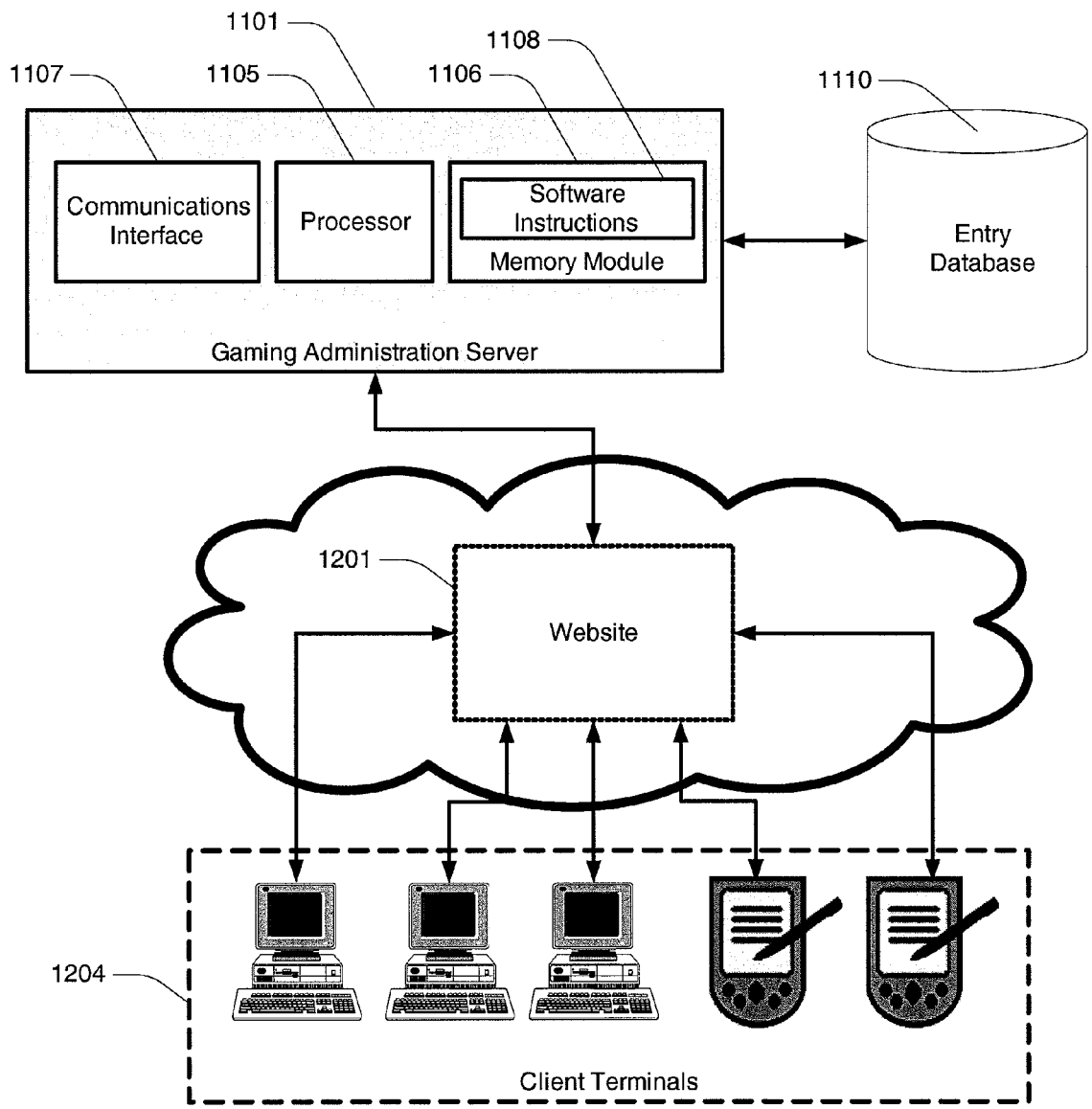
FIG. 12A illustrates system for providing a gaming activity according to one embodiment.
Figure 12B:
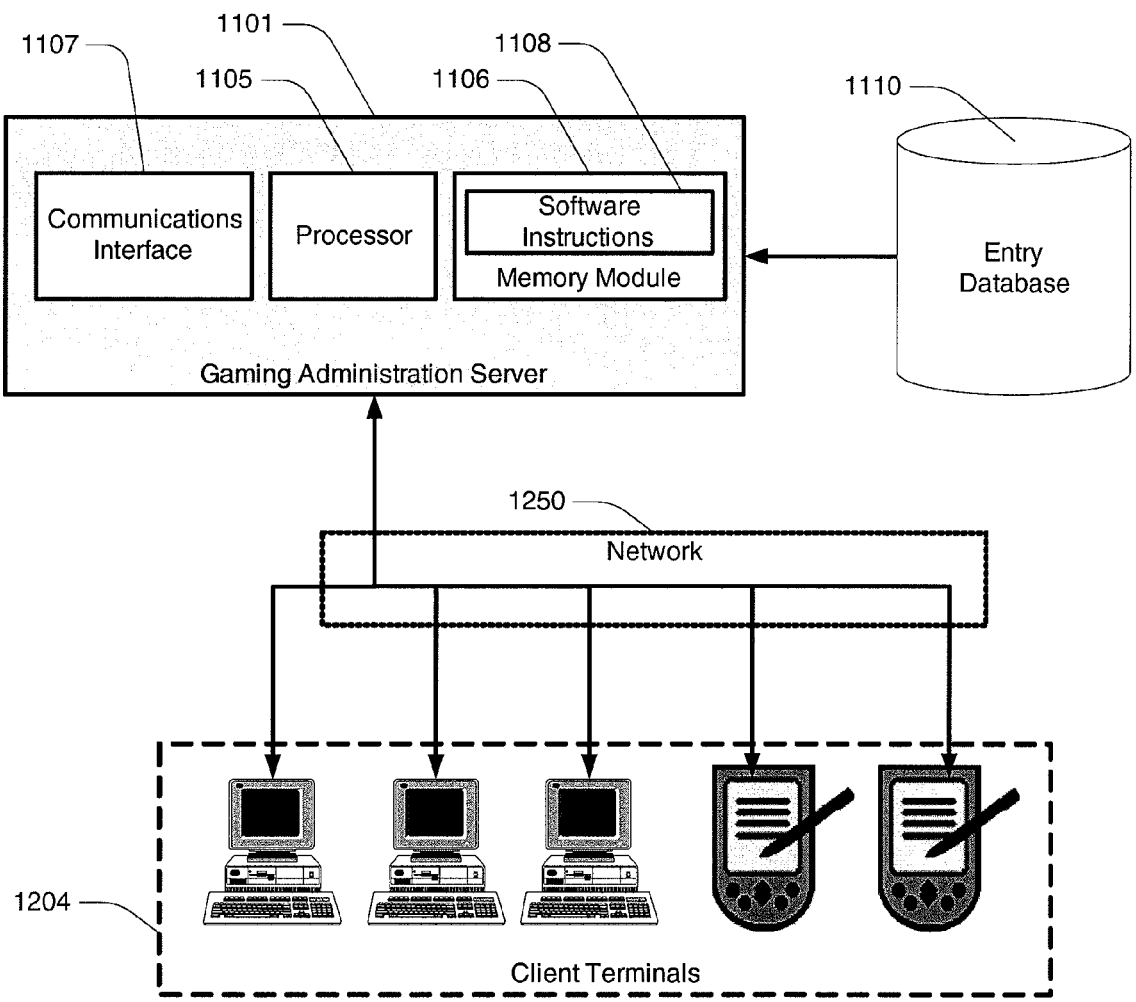
FIG. 12B illustrates a system for providing a gaming activity according to one embodiment.

FIG. 12A and FIG. 12B illustrate two approaches for interfacing gaming administration server 1101 with a plurality of client terminals 1204 (optionally including the likes of players' personal terminals, and terminals provided at entry retail venues). In some embodiments a combination of the two approaches is used.

The approach of FIG. 12A is to provide a website 1201 on the Internet for interfacing the client terminals with the administration server. The approach of FIG. 12B is to provide a connection, such as a VPN connection, over the Internet or another network (such as a LAN or WAN) 1250 for interfacing the client terminals with the administration server.

Unless specifically stated otherwise, it should be appreciated that throughout the specification terms such as "processing," "computing," "calculating," "determining", analyzing" or the like, in some embodiments refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in some embodiments, performable by one or more processors that accept computer-readable (also called machine-readable) code containing a set of instructions that, when executed by one or more of the processors, carry out at least one of the methods described herein, or a variation on at least one of the methods described herein. Any processor capable of executing a set of instructions (sequential or otherwise) that specify actions to be taken should be included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" or "device" shall also be taken to include any collection of machines that individually or jointly execute a set (or multiple sets) of instructions to perform any one or more of the methodologies discussed herein.

At least one embodiment of each of the methods described herein is in the form of a computer-readable carrier medium carrying a set of instructions (such as a computer program) that are for execution on one or more processors, (such as one or more processors that are part of an information system). Thus, as will be appreciated by those skilled in the art, embodiments of the present invention may be embodied as a method, an apparatus such as a special purpose apparatus, an apparatus such as a data processing system, or a computer-readable carrier medium (such as a computer program product). The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (such as a computer program product on a computer-readable storage medium) carrying computer-readable program code embodied in the medium.

The software may further be transmitted or received over a network via a network interface device or other communications interface. While the carrier medium is shown in an exemplary embodiment to be a single medium, the term "carrier medium" should be taken to include a single medium or multiple media (such as a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing system (such as a computer) executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Comments on Local Laws

It is appreciated that various embodiments described herein include or refer to practices or subject matter that may be considered as being contrary to local laws in various jurisdictions. To the extent that the claims below cover subject matter that is contrary to the local laws of a particular jurisdiction, the claims should be interpreted in that jurisdiction in a manner so as to exclude any practices or subject matter that is indeed contrary to those local laws. A particular example presently considered is Sharia law, which may adopt a contrary stance to various aspects of gaming and investment as described herein. However, those skilled in the art will recognize how certain embodiments of the invention may nevertheless be implemented in accordance with Sharia law.

CONCLUSIONS

Traditional gaming activities necessarily involve the customers or players putting their money at risk of loss. The present invention, at least in some of its preferred forms, modifies the traditional ways of operating such activities to give players the option of risk-free participation while retaining the opportunity to win prizes, potentially alongside more risky though still modified participation by other players. Traditional gaming activities, by definition, involve putting money or valuables at risk, and to that extent the present invention, at least in some preferred embodiments, does not resemble the operation of traditional gaming activities. Rather, it modifies traditional gaming and even investing operations and consequently is able to present the customers or players with new products of a risk-free nature, or with altered risk/return, risk/chance or risk/cost characteristics, to produce new outcomes that have not hitherto been available. In these and many other respects, the invention represents a practical and commercially significant improvement over the prior art.

Although the invention has been described with reference to specific examples, it will be appreciated by those skilled in the art that the invention may be embodied in many other forms. While there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulae given above are merely representative of procedures that may be used. Functionality may be added or deleted from the block diagrams and operations may be interchanged among functional blocks. Steps may be added to or deleted from methods described herein whilst remaining within the scope of the present invention.

The invention claimed is:

1. A method for providing a gaming activity wherein a plurality of players provide respective entry fees, the method including the steps of:
    defining a plurality of risk profiles, wherein each risk profile defines a proportion of an entry fee that is refundable on the basis of predetermined refund criteria and a complementary proportion of the entry fee that is placed at risk;
    receiving, for each player, data indicative of the entry fee provided by that player and a risk profile selected by that player;

allocating to each player, on the basis of the entry fee provided by that player and the risk profile selected by that player, one or more entries in relation to the gaming activity, wherein the risk profile selected by a given player affects the relative probability of that player winning a prize in relation to the gaming activity in exchange for the entry fee provided; and updating a database with data indicative of the allocation of one or more entries to each player.

2. A method according to claim 1 wherein the plurality of risk profiles includes a plurality of risk profiles for which X % of the entry fee is refundable and Y % of the entry fee is placed at risk, wherein X+Y=100 and wherein 0<X<100.

3. A method according to claim 1 wherein at least one risk profile is defined in response to data indicative of a player's selective designation of a proportion of an entry fee that is to be refundable and/or a complementary proportion of the entry fee that is to be placed at risk.

4. A method according to claim 1 wherein the number of entries allocated to a given player is determined according to the formula:

$$E_{player} = kA + B$$

wherein Eplayer is the number of entries allocated to a particular player in exchange for the entry fee provided by that player, A is a parameter related to the contribution made by or on behalf of that player to the prize pool, B is an adjustment factor, and k is a proportionality factor selected such that the allocation of entries follows a predetermined risk/chance favouritism protocol, and wherein $0.01 \leq k \leq 100$.

5. A method according to claim 4 wherein $1 \leq k \leq 100$.

6. A method according to claim 4 wherein $k \geq 1$.

7. A method according to claim 4 wherein $k \approx 1$.

8. A method according to claim 1 including the steps of: awarding prizes to the players to whom winning entries were allocated in accordance, wherein awarding the prizes includes making the prizes available for collection by or on behalf to the players to whom winning entries were allocated.

9. A method according to claim 1 wherein, for a given player, refunding the refundable proportion of the entry fee includes making the refundable proportion of the entry fee available for collection by or on behalf of that players.

10. A method according to claim 1 including the steps of: identifying, for each entry fee, a total contribution amount corresponding to that entry fee, the total contribution amount including:
   i. a primary contribution amount comprising the proportion of the entry fee that is placed at risk, less any predefined deductions; and
   ii. a supplementary contribution amount, wherein, for a given entry fee, the supplementary contribution amount corresponds to an amount derived from an investment return derived by subjecting at least a proportion of that entry fee to an investment procedure for a period of time;
combining the total contribution amounts of the respective entry fees to form a prize pool;
identifying one or more winning entries;
distributing the prize pool among the players to whom winning entries were allocated in accordance with a predetermined prize distribution protocol.

11. A method according to claim 10 wherein, for a given entry fee, the supplementary contribution amount corresponds to an amount derived from an investment return derived by subjecting at least a proportion of that entry fee to an investment procedure for a period of time.

12. A method according to claim 1 wherein the step of allocating to each player one or more entries includes, for a given player:
   for the proportion of the entry fee that is placed at risk, allocating to the player a primary entry, whereby in the case that the primary entry is identified as a winning entry a primary prize is awarded to the player;
   for the proportion of the entry fee that is refundable, allocating to the player one or more secondary entries, whereby in the case that one of the secondary entries is identified as a winning entry a secondary prize is awarded to the player.

13. A method according to claim 12 wherein the primary entry has an associated payout ratio, and the primary prize is awarded to the player based on the proportion of the entry fee that is placed at risk and the payout ratio.

14. A method according to claim 12 wherein, in the case that the primary entry is identified as a winning entry, the secondary entry is not identified as a winning entry.

15. A method according to claim 12 wherein, in the case that the primary entry is not identified as a winning entry, the secondary entry is identified as a winning entry, such that a given player for whom a non-zero proportion of the entry fee is refundable wins one of the primary prize or the secondary prize.

16. A method according to claim 12 including the steps of:
   deriving supplementary income;
   adding an amount corresponding to at least a proportion of the supplementary income to a secondary prize pool;
   refunding to each player the proportion of the entry fee that is refundable; distributing the secondary prize pool, in accordance with a predetermined prize distribution protocol, amongst the players to whom winning secondary entries were allocated.

17. A method according to claim 16 wherein deriving supplementary income includes subjecting at least a proportion of the entry fees to an investment procedure to generate supplementary income in the form of an investment return.

18. A method for providing a gaming activity wherein a plurality of players provide respective entry fees, the method including the steps of:
   defining a risk profile, the risk profile defining a non-zero proportion of an entry fee that is refundable on the basis of predetermined refund criteria and a complementary proportion of the entry fee that is placed at risk;
   receiving, for each player, data indicative of the entry fee provided by that player;
   allocating to each player, on the basis of the entry fee provided by that player and the risk profile, one or more entries in relation to the gaming activity wherein the risk profile affects the relative probability of that player winning a prize in relation to the gaming activity in exchange for the entry fee provided; and
   updating a database with data indicative of the allocation of one or more entries to each player.

19. A method according to claim 18 wherein, for the risk profile, X% of the entry fee is refundable and Y% of the entry fee is placed at risk, wherein X+Y=100 and wherein 0<X<100.

20. A method according to claim 18 including the steps of:
   identifying one or more winning entries for the gaming activity;
   awarding prizes to the players to whom winning entries were allocated in accordance with a predetermined prize distribution protocol; and for each player who selected a risk profile for which a non-zero proportion of the entry fee is refundable, refunding the refundable proportion of the entry fee.

21. A method according to claim 20 wherein the step of refunding the refundable proportion of the entry fee includes, for at least one player:
defining the refundable portion of the entry fee as at least part of a subsequent entry fee in relation to a subsequent gaming activity;
allocating to the at least one player one or more entries in relation to the subsequent gaming activity in exchange for the subsequent entry fee.

22. A method according to claim 20 wherein the step of refunding the refundable proportion of the entry fee includes, for at least one player:
defining the refundable portion of the entry fee as a subsequent entry fee in relation to a subsequent gaming activity;
allocating to the at least one player one or more entries in relation to the subsequent gaming activity in exchange for the subsequent entry fee.

23. A method according to claim 21 wherein the subsequent gaming activity is a gaming activity provided by a method according to claim 21.

24. A method according to claim 18 including the steps of:
identifying, for each entry fee, a total contribution amount corresponding to that entry fee, the total contribution amount including:
 i. a primary contribution amount comprising the proportion of the entry fee that is placed at risk, less any predefined deductions; and
 ii. a supplementary contribution amount;
combining the total contribution amounts of the respective entry fees to form a prize pool;
identifying one or more winning entries; distributing the prize pool among the players to whom winning entries were allocated in accordance with a predetermined prize distribution protocol.

25. A method according to claim 24 wherein, for a given entry fee, the supplementary contribution amount corresponds to an amount derived from one or more sources selected from a group comprising:
an investment return derived by subjecting at least a proportion of that entry fee to an investment procedure for a period of time;
an operator contribution; and
a third-party contribution.

26. A method according to claim 24 wherein, for a given entry fee, the supplementary contribution amount corresponds to an amount derived from an investment return derived by subjecting at least a proportion of that entry fee to an investment procedure for a period of time.

27. A method according to claim 18 including the steps of:
identifying one or more winning entries for the gaming activity;
providing a prize pool for distribution in accordance with a predetermined prize distribution protocol amongst the players to whom winning entries were allocated;
identifying an undistributed portion of the prize pool;
investing at least a proportion of the undistributed portion of the prize pool to generate an investment return;
adding an amount having a value corresponding to at least a proportion of the investment return to a subsequent prize pool in relation to a subsequent gaming activity.

28. A method according to claim 27 wherein the subsequent gaming activity is a gaming activity provided by a method according to claim 27.

29. A method according to claim 18 wherein the step of allocating to each player one or more entries includes, for a given player:
for the proportion of the entry fee that is placed at risk, allocating to the player a primary entry, whereby in the case that the primary entry is identified as a winning entry a primary prize is awarded to the player;
for the proportion of the entry fee that is refundable, allocating to the player one or more secondary entries, whereby in the case that one of the secondary entries is identified as a winning entry a secondary prize is awarded to the player.

30. A method according to claim 29 wherein the primary entry has an associated payout ratio, and the primary prize is awarded to the player based on the proportion of the entry fee that is placed at risk and the payout ratio.

31. A method according to claim 18 wherein, in the case that the primary entry is identified as a winning entry, the secondary entry is not identified as a winning entry.

32. A method according to claim 18 wherein, in the case that the primary entry is not identified as a winning entry, the secondary entry is identified as a winning entry, such that a given player for whom a non-zero proportion of the entry fee is refundable wins one of the primary prize or the secondary prize.

33. A method according to claim 29 including the steps of:
deriving supplementary income;
adding an amount having a value corresponding to at least a proportion of the supplementary income to a secondary prize pool;
refunding to each player the proportion of the entry fee that is refundable;
distributing the secondary prize pool, in accordance with a predetermined prize distribution protocol, amongst the players to whom winning secondary entries were allocated.

34. A method according to claim 33 wherein deriving supplementary income includes subjecting at least a proportion of the entry fees to an investment procedure to generate supplementary income in the form of an investment return.

35. A system for providing a gaming activity wherein a plurality of players provide respective entry fees, the system including a processor configured to carry out a method of providing a gaming activity according to claim 1.

36. A system for providing a gaming activity wherein a plurality of players provide respective entry fees, the system including a processor configured to carry out a method of providing a gaming activity according to claim 18.

37. A computer-readable carrier medium carrying a set of instructions that when executed by one or more processors cause the one or more processors to carry out a method of providing a gaming activity according to claim 1.

38. A computer-readable carrier medium carrying a set of instructions that when executed by one or more processors cause the one or more processors to carry out a method of providing a gaming activity according to claim 18.

39. A method for providing a gaming activity wherein a plurality of players provide respective entry fees, the method including the steps of:
defining a plurality of risk profiles, wherein each risk profile defines a proportion of an entry fee that is refundable on the basis of predetermined refund criteria and a complementary proportion of the entry fee that is placed at risk;
receiving, for each player, data indicative of the entry fee provided by that player and a risk profile selected by that player; and allocating to each player, on the basis of the entry fee provided by that player and the risk profile selected by that player, one or more entries in relation to the gaming activity, wherein the risk profile selected by a given player affects the quantum of entry fee in exchange for which a predetermined number of entries is allocated.

40. A method according to claim 39 wherein, for a first risk profile, a given player is allocated a predetermined number of entries in exchange for a predetermined entry fee, and, for a second risk profile, a given player is allocated the same predetermined number of entries for less than the predetermined entry fee, wherein the first risk profile defines a greater proportion of the entry fee that is refundable compared with the second risk profile.

41. A method according to claim 39 wherein the plurality of risk profiles includes a risk profile for which 100% of the entry fee is refundable.

42. A method according to claim 39 wherein the plurality of risk profiles includes a risk profile for which 100% of the entry fee is placed at risk.

43. A method according to claim 39 wherein the plurality of risk profiles includes at least one risk profile for which X% of the entry fee is refundable and Y% of the entry fee is placed at risk, wherein X+Y=100 and wherein 0<X<100.

44. A method according to claim 39 including the steps of:
identifying one or more winning entries for the gaming activity;
awarding prizes to the players to whom winning entries were allocated in accordance with a predetermined prize distribution protocol; and
for each player who selected a risk profile for which a non-zero proportion of the entry fee is refundable, refunding the refundable proportion of the entry fee.

45. A method according to claim 44 wherein awarding the prizes includes making the prizes available for collection by or on behalf to the players to whom winning entries were allocated.

46. A method according to claim 44 wherein, for a given player, refunding the refundable proportion of the entry fee includes making the refundable proportion of the entry fee available for collection by or on behalf of that players.

47. A method according to claim 44 wherein the step of refunding the refundable proportion of the entry fee includes, for at least one player:
defining the refundable portion of the entry fee as at least part of a subsequent entry fee in relation to a subsequent gaming activity; and
allocating to the at least one player one or more entries in relation to the subsequent gaming activity in exchange for the subsequent entry fee.

48. A method according to claim 47 wherein the subsequent gaming activity is a gaming activity provided by a method according to claim 47.

49. A method according to claim 39 including the steps of:
identifying, for each entry fee, a total contribution amount corresponding to that entry fee, the total contribution amount including:
i. a primary contribution amount comprising the proportion of the entry fee that is placed at risk, less any predefined deductions; and
ii. a supplementary contribution amount;
combining the total contribution amounts of the respective entry fees to form a prize pool;
identifying one or more winning entries;
distributing the prize pool among the players to whom winning entries were allocated in accordance with a predetermined prize distribution protocol.

50. A method according to claim 49 wherein, for a given entry fee, the supplementary contribution amount corresponds to an amount derived from one or more sources selected from a group comprising:
an investment return derived by subjecting at least a proportion of that entry fee to an investment procedure for a period of time;
an operator contribution; and
a third-party contribution.

51. A method according to claim 49 wherein, for a given entry fee, the supplementary contribution amount corresponds to an amount derived from an investment return derived by subjecting at least a proportion of that entry fee to an investment procedure for a period of time.

52. A method according to claim 39 including the steps of:
identifying one or more winning entries for the gaming activity;
providing a prize pool for distribution in accordance with a predetermined prize distribution protocol amongst the players to whom winning entries were allocated;
identifying an undistributed portion of the prize pool;
investing at least a proportion of the undistributed portion of the prize pool to generate an investment return;
adding an amount corresponding to at least a proportion of the investment return to a subsequent prize pool in relation to a subsequent gaming activity.

53. A method according to claim 52 wherein the subsequent gaming activity is a gaming activity provided by a method according to claim 52.

54. A system for providing a gaming activity wherein a plurality of players provide respective entry fees, the system including a processor configured to carry out a method of providing a gaming activity according to claim 39.

55. A computer-readable carrier medium carrying a set of instructions that when executed by one or more processors cause the one or more processors to carry out a method of providing a gaming activity according to claim 39.

56. A method for providing a gaming activity wherein a plurality of players provide respective entry fees, the method including the steps of:
defining a plurality of risk profiles, wherein each risk profile defines a proportion of an entry fee that is refundable on the basis of predetermined refund criteria and a complementary proportion of the entry fee that is placed at risk;
receiving, for each player, data indicative of the entry fee provided by that player and a risk profile selected by that player; and
allocating to each player, on the basis of the entry fee provided by that player and the risk profile selected by that player, one or more entries in relation to the gaming activity, wherein the risk profile selected by a given player affects one or more characteristics of a prize winnable by that player in exchange for the entry fee provided.

57. A method according to claim 56 wherein, for a first risk profile, a given player is able to win a prize having a first value in exchange for a predetermined entry fee, and, for a second risk profile, a given player is able to win a prize having a second value in exchange for the same predetermined entry fee, wherein the second value is greater than the first value, and wherein the first risk profile defines a greater proportion of the entry fee that is refundable compared with the second risk profile.

58. A method according to claim 56 wherein the plurality of risk profiles includes a risk profile for which 100% of the entry fee is refundable.

59. A method according to claim 56 wherein the plurality of risk profiles includes a risk profile for which 100% of the entry fee is placed at risk.

60. A method according to claim 56 wherein the plurality of risk profiles includes at least one risk profile for which X% of the entry fee is refundable and Y% of the entry fee is placed at risk, wherein X+Y=100 and wherein 0<X<100.

61. A method according to claim 56 including the steps of:
identifying one or more winning entries for the gaming activity;
awarding prizes to the players to whom winning entries were allocated in accordance with a predetermined prize distribution protocol; and
for each player who selected a risk profile for which a non-zero proportion of the entry fee is refundable, refunding the refundable proportion of the entry fee.

62. A method according to claim 61 wherein awarding the prizes includes making the prizes available for collection by or on behalf to the players to whom winning entries were allocated.

63. A method according to claim 61 wherein, for a given player, refunding the refundable proportion of the entry fee includes making the refundable proportion of the entry fee available for collection by or on behalf of that players.

64. A method according to claim 61 wherein the step of refunding the refundable proportion of the entry fee includes, for at least one player:
defining the refundable portion of the entry fee as at least part of a subsequent entry fee in relation to a subsequent gaming activity; and
allocating to the at least one player one or more entries in relation to the subsequent gaming activity in exchange for the subsequent entry fee.

65. A method according to claim 64 wherein the subsequent gaming activity is a gaming activity provided by a method according to claim 64.

66. A method according to claim 56 including the steps of:
identifying, for each entry fee, a total contribution amount corresponding to that entry fee, the total contribution amount including:
  i. a primary contribution amount comprising the proportion of the entry fee that is placed at risk, less any predefined deductions; and
  ii. a supplementary contribution amount;
combining the total contribution amounts of the respective entry fees to form a prize pool;
identifying one or more winning entries;
distributing the prize pool among the players to whom winning entries were allocated in accordance with a predetermined prize distribution protocol.

67. A method according to claim 66 wherein, for a given entry fee, the supplementary contribution amount corresponds to an amount derived from one or more sources selected from a group comprising:
an investment return derived by subjecting at least a proportion of that entry fee to an investment procedure for a period of time;
an operator contribution; and
a third-party contribution.

68. A method according to claim 66 wherein, for a given entry fee, the supplementary contribution amount corresponds to an amount derived from an investment return derived by subjecting at least a proportion of that entry fee to an investment procedure for a period of time.

69. A method according to claim 56 including the steps of:
identifying one or more winning entries for the gaming activity;
providing a prize pool for distribution in accordance with a predetermined prize distribution protocol amongst the players to whom winning entries were allocated;
identifying an undistributed portion of the prize pool;
investing at least a proportion of the undistributed portion of the prize pool to generate an investment return;
adding an amount corresponding to at least a proportion of the investment return to a subsequent prize pool in relation to a subsequent gaming activity.

70. A method according to claim 69 wherein the subsequent gaming activity is a gaming activity provided by a method according to claim 69.

71. A system for providing a gaming activity wherein a plurality of players provide respective entry fees, the system including a processor configured to carry out a method of providing a gaming activity according to claim 56.

72. A computer-readable carrier medium carrying a set of instructions that when executed by one or more processors cause the one or more processors to carry out a method of providing a gaming activity according to claim 56.

73. A method for providing a gaming activity wherein a plurality of players provide respective entry fees, the method including the steps of:
defining a risk profile, the risk profile defining a non-zero proportion of an entry fee that is refundable on the basis of predetermined refund criteria and a complementary proportion of the entry fee that is placed at risk;
receiving, for each player, data indicative of the entry fee provided by that player; and
allocating to each player, on the basis of the entry fee provided by that player and the risk profile, one or more entries in relation to the gaming activity, wherein the risk profile affects the quantum of entry fee in exchange for which a predetermined number of entries is allocated.

74. A method according to claim 73 including the steps of:
identifying, for each entry fee, a total contribution amount corresponding to that entry fee, the total contribution amount including:
  i. a primary contribution amount comprising the proportion of the entry fee that is placed at risk, less any predefined deductions; and
  ii. a supplementary contribution amount;
combining the total contribution amounts of the respective entry fees to form a prize pool; and
identifying one or more winning entries; distributing the prize pool among the players to whom winning entries were allocated in accordance with a predetermined prize distribution protocol.

75. A system for providing a gaming activity wherein a plurality of players provide respective entry fees, the system including a processor configured to carry out a method of providing a gaming activity according to claim 73.

76. A computer-readable carrier medium carrying a set of instructions that when executed by one or more processors cause the one or more processors to carry out a method of providing a gaming activity according to claim 73.

77. A method for providing a gaming activity wherein a plurality of players provide respective entry fees, the method including the steps of:
defining a risk profile, the risk profile defining a non-zero proportion of an entry fee that is refundable on the basis of predetermined refund criteria and a complementary proportion of the entry fee that is placed at risk;
receiving, for each player, data indicative of the entry fee provided by that player; and
allocating to each player, on the basis of the entry fee provided by that player and the risk profile, one or more entries in relation to the gaming activity, wherein the risk profile affects one or more characteristics of a prize winnable by that player in exchange for the entry fee provided.

78. A method according to claim 77 including the steps of:
identifying, for each entry fee, a total contribution amount corresponding to that entry fee, the total contribution amount including:
   i. a primary contribution amount comprising the proportion of the entry fee that is placed at risk, less any predefined deductions; and
   ii. a supplementary contribution amount;
combining the total contribution amounts of the respective entry fees to form a prize pool; and
identifying one or more winning entries; distributing the prize pool among the players to whom winning entries were allocated in accordance with a predetermined prize distribution protocol.

79. A system for providing a gaming activity wherein a plurality of players provide respective entry fees, the system including a processor configured to carry out a method of providing a gaming activity according to claim 77.

80. A computer-readable carrier medium carrying a set of instructions that when executed by one or more processors cause the one or more processors to carry out a method of providing a gaming activity according to claim 77.

* * * * *